United States Patent
Shimada et al.

(10) Patent No.: US 8,576,765 B2
(45) Date of Patent: Nov. 5, 2013

(54) MULTI-HOP WIRELESS COMMUNICATION SYSTEM

(75) Inventors: Shusaku Shimada, Tokyo (JP); Fumie Ono, Kanagawa (JP); Kei Sakaguchi, Tokyo (JP); Gia Khanh Tran, Tokyo (JP)

(73) Assignees: Yokohama National University, Kanagawa (JP); Tokyo Institute of Technology, Tokyo (JP)

( * ) Notice: Subject to any disclaimer, the term of this patent is extended or adjusted under 35 U.S.C. 154(b) by 339 days.

(21) Appl. No.: 12/919,281

(22) PCT Filed: Dec. 18, 2008

(86) PCT No.: PCT/JP2008/073676
§ 371 (c)(1),
(2), (4) Date: Nov. 29, 2010

(87) PCT Pub. No.: WO2009/107314
PCT Pub. Date: Sep. 3, 2009

(65) Prior Publication Data
US 2011/0149835 A1 Jun. 23, 2011

(30) Foreign Application Priority Data

Feb. 26, 2008 (JP) ................................ 2008-045318
Oct. 14, 2008 (JP) ................................ 2008-265807

(51) Int. Cl.
*H04B 7/14* (2006.01)
(52) U.S. Cl.
USPC ........................................................ 370/315
(58) Field of Classification Search
USPC ............. 257/22; 372/46.01, 46.012; 438/357; 27/13; 370/254–340
See application file for complete search history.

(56) References Cited

U.S. PATENT DOCUMENTS

| 7,920,501 | B2* | 4/2011 | Larsson et al. | 370/315 |
|---|---|---|---|---|
| 8,023,524 | B2* | 9/2011 | Doppler et al. | 370/431 |
| 8,165,059 | B2* | 4/2012 | Fujii et al. | 370/315 |
| 8,228,835 | B2* | 7/2012 | Yuan et al. | 370/315 |
| 2009/0067533 | A1* | 3/2009 | Yuan et al. | 375/267 |
| 2009/0268662 | A1* | 10/2009 | Larsson et al. | 370/328 |
| 2011/0164697 | A1* | 7/2011 | Liao et al. | 375/260 |

OTHER PUBLICATIONS

International Search Report issued Jan. 27, 2009 in International (PCT) Application No. PCT/JP2008/073676.

(Continued)

*Primary Examiner* — Ayaz Sheikh
*Assistant Examiner* — Debebe Asefa
(74) *Attorney, Agent, or Firm* — Wenderoth, Lind & Ponack, L.L.P.

(57) ABSTRACT

The present invention provides multi-hop wireless communication systems that easily realize a highly-efficient and highly reliable bi-directional wireless relay transmission by using MIMO network coding.
A multi-hop wireless communication system with multiple node devices having a relay function in which each node device is equipped with multiple MIMO antennas and a wireless communication system is constructed by setting up wireless links between the node devices, the multi-hop wireless communication system characterized in that a multiple input multiple output (MIMO) scheme is applied to a transmission/reception scheme of network coding and a space time block coding (STBC) scheme is further applied, concretely, by combining STBC broadcast and MIMO multiple access into network coding, a bi-directional wireless relay transmission that multiplexes a forward link and a backward link in all wireless links is easily realized, each node device performs transmission/reception processing and the relay transmission of data.

31 Claims, 28 Drawing Sheets

(56) References Cited

OTHER PUBLICATIONS

F. Ono and K. Sakaguchi, "Bi-Directional Link Multiplexing for MIMO Mesh Network", Information, Communications & Signal Processing, 2007 $6^{th}$ International Conference on, Dec. 13, 2007, pp. 1-5.

Fukaya et al., "A Distributed Relaying Algorithm for Multi-hop Wireless Network Coding Based on Amplify-and-Forward", IEICE Technical Report, Jan. 17, 2008, vol. 107, No. 438, pp. 121-126.

M. Dohler et al., "Near-Optimum Transmit Power Allocation for Space-Time Block Encoded Wireless Communication Systems", Communications, IEE Proceedings, vol. 153, No. 3, Jun. 2, 2006, pp. 459-463.

I. F. Akyildiz and Xudong Wang, "A Survey on Wireless Mesh Networks", IEEE Communications Magazine, vol. 43, pp. S23-S30, Sep. 2005.

E. Van Der Meulen, "A Survey of Multi-Way Channels in Information Theory: 1961-1976", IEEE Trans. Inf. Theory; vol. IT-23, No. 1, pp. 1-37, Jan. 1977.

R. Ahlswede, N. Cai, Shuo—Yen Robert Li and R. W. Yeung, "Network Information Flow", IEEE Trans. Inf. Theory, vol. 46, No. 4, pp. 1204-1216, Jul. 2000.

P. Popovski and H. Yomo, "Physical Network Coding in Two-Way Wireless Relay Channels", IEEE International Conference on Communications (ICC'07), pp. 707-712, Jun. 2007.

V. Tarokh, H. Jafarkhani and A. R. Calderbank, "Space-Time Block Codes from Orthogonal Designs", IEEE Trans. Inf. Theory, vol. 45, No. 5, pp. 1456-1467, Jul. 1999.

F. Ono and K. Sakaguchi, "MIMO Spatial Spectrum Sharing for High Efficiency Mesh Network", IEICE Trans. Commun., vol. E91-B, No. 1, pp. 62-69, Jan. 2008.

S. M. Alamouti, "A Simple Transmit Diversity Technique for Wireless Communications", IEEE Journal on Select Areas in Communications, vol. 16, No. 8, pp. 1451-1458, Oct. 1998.

Hamid Jafarkhani, "A Quasi-Orthogonal Space-Time Block Code", IEEE Transactions on Communications, vol. 49, No. 1, pp. 1-4, Jan. 2001.

Ning Yang and Masoud Salehi, "A New Full Rate Space Time Block Code for Three Transmit Antenna Systems", Vehicular Technology Conference, 2006. VTC-2006 Fall 2006 IEEE 64th, pp. 1-5, Sep. 2006.

Arogyaswami Paulraj, Rohit Nabar and Dhananjay Gore, "Introduction to Space-Time Wireless Communications", Cambridge University Press, 2003.

* cited by examiner

FIG.3
(A) TRANSMISSION PROCESSING IN THE K-TH NODE
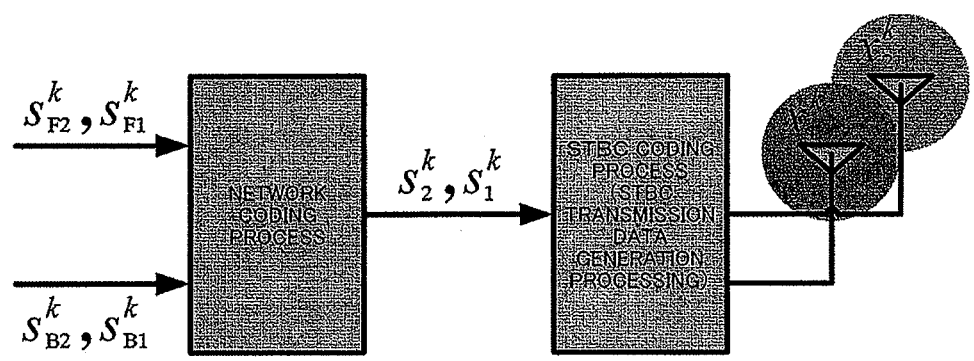
(B) RECEPTION PROCESSING IN THE K-TH NODE
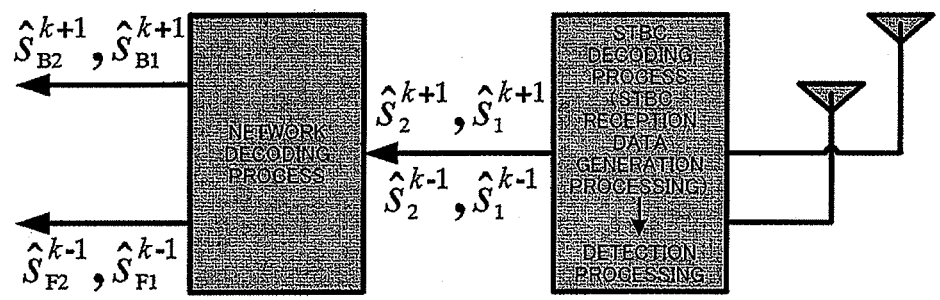

FIG.10

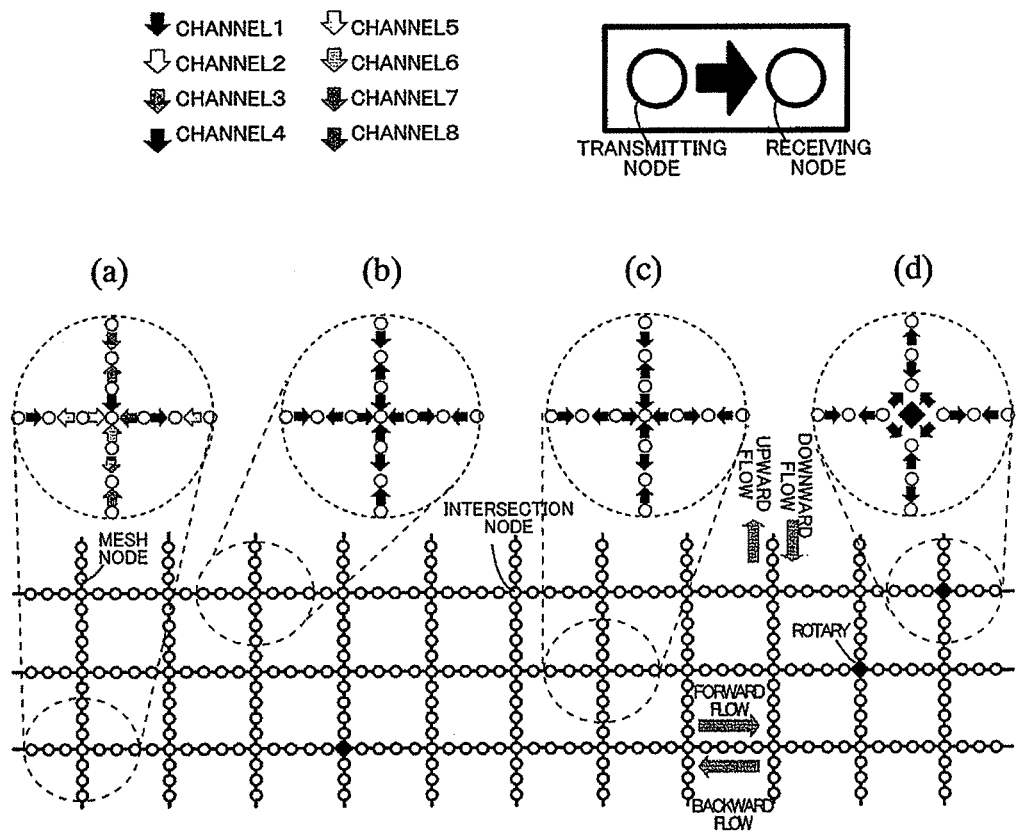

(a) A CONVENTIONAL MULTICHANNEL SINGLE DIRECTIONAL SISO MESH NETWORK USING 8 CHANNELS (b) A BI-DIRECTIONAL MIMO MESH NETWORK EMPLOYING 1-D MIMO NETWORK CODING USING 2 CHANNELS (c) A BI-DIRECTIONAL MIMO MESH NETWORK EMPLOYING 2-D MIMO NETWORK CODING USING A SINGLE CHANNEL (CROSS AT AN INTERSECTION NODE)

(d) A BI-DIRECTIONAL MIMO MESH NETWORK EMPLOYING 2-D MIMO NETWORK CODING USING A SINGLE CHANNEL (CROSS AT A ROTARY)

FIG.11
(A) 2DMNC1
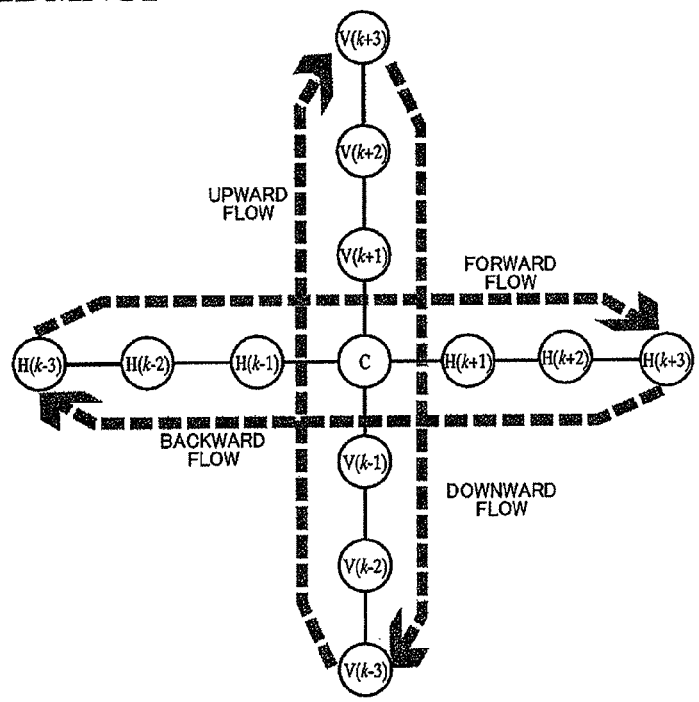
(B) 2DMNC2
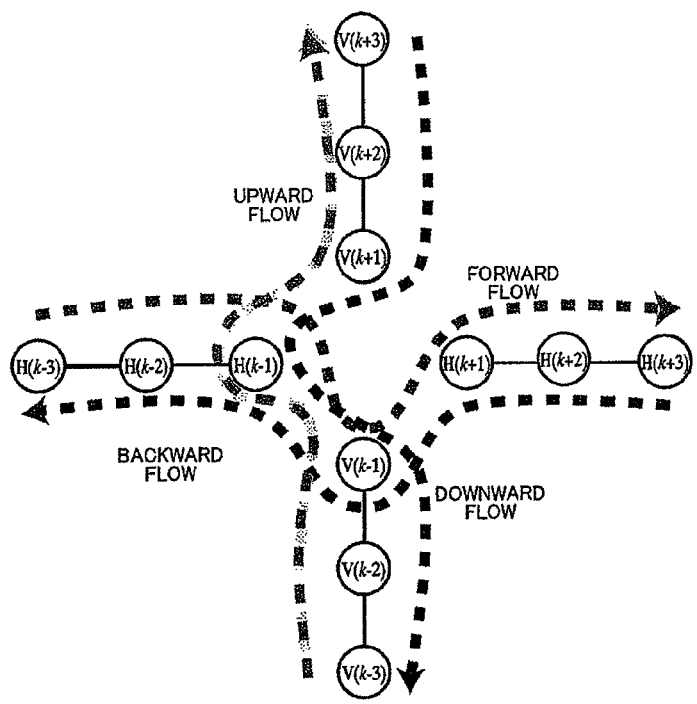

MULTI-HOP WIRELESS COMMUNICATION SYSTEM

TECHNICAL FIELD

The present invention relates to multi-hop wireless communication technologies that performs wireless transmission of information (data) between a source node and a destination node via other relay nodes.

BACKGROUND TECHNIQUE

Expectation about a ubiquitous network society that it is possible to obtain all sorts of information about social life without being restricted by when and where, swells out. In order to realize the ubiquitous network society, it is necessary to construct both public wireless networks provided by communication common carriers and wireless networks (private wireless networks) that are set up in private space such as families and offices and operated by users, and complements each other. As one of schemes that realize networks in environments where various wireless nodes (hereinafter simply referred as to "nodes") are ubiquitous, multi-hop wireless communication systems (multi-hop wireless networks) that perform not only direct communications between nodes but also information transmission (data transmission) via other nodes attract attention.

Multi-hop wireless networks are characterized in that it is possible to flexibly configure the network topology, and the transmission of broad-based information is allowed without depending on infrastructure such as base station and backbone line.

By the way, relay methods of relay nodes in multi-hop wireless network, can be classified broadly into two kinds, that is, the Amplify-and-forward scheme and the Decode-and-forward scheme. In addition, the Decode-and-forward scheme is a method that the relay node decodes the received signal, and then relays (retransmits) after performing coding again on the received signal that is already decoded.

In multi-hop wireless networks, the data transmitted from the source node is relayed by the adjacent node and transmitted to the destination node, wireless links for transmission and reception are constructed between nodes, broadcast traffic, multicast traffic and unicast traffic occur based on traffic and the network configuration (see Non-Patent Document 1). Therefore, by simultaneously using all the wireless links, the transmission characteristic (the throughput characteristic) is improved (see Non-Patent Document 2).

However, in multi-hop wireless networks, since it is different to construct wireless links between nodes that simultaneously uses the same channel for transmission, both one problem that the rate of wireless link building and the occupancy rate of wireless link are low and another problem that the interferences from adjacent nodes occur by simultaneously using the wireless link of the same channel, happen, it is impossible to realize a highly-efficient multi-hop wireless network.

In order to solve the above-described problems, the inventors of the present invention proposed a MIMO multi-hop/mesh network that performs a bi-directional transmission as a wireless network that not only improves the rate of wireless link building and the occupancy rate of wireless link but also realizes the transmitting-interference avoidance and the receiving-interference avoidance of adjacent nodes (see Non-Patent Document 6).

The MIMO multi-hop/mesh network disclosed in Non-Patent Document 6 is a network that the transmitting node and the receiving node exist alternately, each node has a relay function, and the transmission/reception of the forward link and the backward link are simultaneously performed. The MIMO multi-hop/mesh network disclosed in Non-Patent Document 6 realizes the interference avoidance of adjacent nodes by spatially multiplexing signals of the forward link and the backward link and the transmitting/receiving weights of antennas.

It is clear from the analysis based on the numerical simulation by computer that the MIMO multi-hop/mesh network disclosed in Non-Patent Document 6 can improve the transmission capacity than multi-hop wireless networks employing conventional MIMO algorithm.

Here, the MIMO multi-hop/mesh network disclosed in Non-Patent Document 6 will be described briefly.

FIG. 1 conceptually shows a model of the MIMO multi-hop/mesh network disclosed in Non-Patent Document 6. The lower part within FIG. 1, shows a signal model of the network that focuses attention on adjacent links.

In the model of the MIMO multi-hop/mesh network shown in FIG. 1, a 3-element MIMO antenna is used, the multiplexing of one stream for the forward link and one stream for the backward link is performed, and the number of the total streams (K) which a certain node transmits/receives, becomes two streams (K=2). Therefore, with respect to one desired signal, there are three interference signals.

Here, in the case of setting $K^F$ as the number of streams in the forward link and setting $K^B$ as the number of streams in the backward link, in the MIMO multi-hop/mesh network shown in FIG. 1, when a condition represented by the following Expression 1 is satisfied, it is possible to apply the linear algorithm and the nonlinear algorithm to a general topology.

$$M \geq K + \max(K^F, K^B) \qquad \text{[Expression 1]}$$

In other words, in the MIMO multi-hop/mesh network shown in FIG. 1, a 3-element MIMO antenna (M=3, i.e., at least three antennas) will be needed for a bi-directional transmission that perform the multiplexing of one stream for the forward link and one stream for the backward link.

By the way, in recent years, the network coding is studied. The network coding has an advantage that it becomes possible to save resources of the network by performing the coding of transmission data (see Non-Patent Document 3 and Non-Patent Document 4). For example, the transmitting node codes transmitting signals for the forward link and the backward link as one transmitting signal by using the network coding, and it becomes possible to simultaneously transmit as the same data (the same transmission data), thus it is possible to realize the transmitting-interference avoidance from the same transmitting node.

As described above, according to the MIMO multi-hop/mesh network disclosed in Non-Patent Document 6, it is possible to realize the link multiplexing and the interference avoidance of adjacent nodes.

However, the MIMO multi-hop/mesh network disclosed in Non-Patent Document 6 has the following problems.

Problem (A)

In order to realize the link multiplexing and the interference avoidance of adjacent nodes, the necessary number of antennas per node is at least three, thus there is a problem that the number of antennas is more than the number of the multiplexing links.

Problem (B)

In order to decide the transmitting/receiving weights of antennas of each node, both the transmitting node and the receiving node need channel information, thus there is a problem that the processing becomes complex.

DISCLOSURE OF THE INVENTION

The present invention has been developed in view of the above described circumstances, and an object of the present invention is to provide multi-hop wireless communication systems that easily realize a highly-efficient and highly reliable bi-directional wireless relay transmission by using MIMO network coding technique (one-dimensional MIMO network coding and two-dimensional MIMO network coding) for solving the above-described problem (A) and problem (B).

The present invention relates to a multi-hop wireless communication system with multiple node devices having a relay function in which said each node device is equipped with multiple MIMO antennas and a wireless communication system is constructed by setting up wireless links between said node devices. The above object of the present invention is effectively achieved by the construction that a multiple input multiple output (MIMO) scheme is applied to a transmission/reception scheme of network coding and a space time block coding (STBC) scheme is further applied, concretely, by combining STBC broadcast and MIMO multiple access into network coding, a bi-directional wireless relay transmission that multiplexes a forward link and a backward link in all wireless links is easily realized, said each node device performs transmission/reception processing and the relay transmission of data. Further, the above object of the present invention is also effectively achieved by the construction that by applying a multiple input multiple output (MIMO) scheme to a transmission/reception scheme of network coding, a bi-directional wireless relay transmission that multiplexes a forward link and a backward link in all wireless links is easily realized, said each node device performs transmission/reception processing and the relay transmission of data.

Further, the above object of the present invention is also effectively achieved by the construction that a multi-hop wireless communication system with multiple node devices having a relay function in which said each node device is equipped with multiple MIMO antennas and a wireless communication system is constructed by setting up forward links and backward links between said node devices, said multi-hop wireless communication system characterized in that a multiple input multiple output (MIMO) scheme is applied to a transmission/reception scheme of network coding and a space time block coding (STBC) scheme is further applied, said node device comprises a STBC reception data generating means that performs a STBC reception data generating process to generate STBC reception data from the received wireless signals that are wirelessly received with said antennas; a STBC channel matrix generating means that performs a STBC channel matrix generating process to generate a STBC equivalent channel matrix from channel information estimated from training signals that are wirelessly received with said antennas; a MIMO detecting means that performs a MIMO detecting process to estimate estimation symbols from said generated STBC equivalent channel matrix and said generated STBC reception data; a network decoding means that performs a network decoding process to generate relay signals that are two consecutive symbols to said forward link and said backward link from said estimated estimation symbols; a relay control means that performs a destination control process; a network coding means that performs a network coding process of two consecutive transmitting symbols to generate two consecutive transmitting signals from said generated relay signals; a STBC transmission data generating means that performs a STBC transmission data generating process to generate STBC transmission data from said transmitting signals generated by said network coding means; and a training signal adding means that adds said training signals to said generated STBC transmission data and performs a training signal adding process, said STBC transmission data that said training signals are added to is transmitted as transmitted wireless signals.

Further, the above object of the present invention is also effectively achieved by the construction that said relay control means performs said destination control process that determines either said generated relay signals are signals for a local node device or said generated relay signals are signals for another node device, in the case that said relay control means determined that said generated relay signals are signals for said local node device, the processing of said node device is finished, on the other hand, in the case that said relay control means determined that said relay signals are signals for said another node device, in order to perform a network decoding process at next time slot, said relay control means stores said generated relay signals as the transmitted data of previous time slot.

Further, the above object of the present invention is also effectively achieved by the construction that said MIMO detecting process uses the ZF algorithm or the MMSE algorithm in MIMO reception.

Further, the above object of the present invention is also effectively achieved by the construction that with respect to said multi-hop wireless communication system, in the case that the (k−1)-th node and the (k+1)-th node are transmitting nodes, two consecutive transmitting signals $s_1^{k-1}, s_2^{k-1}$ of the (k−1)-th node are modeled respectively by using the following two expressions, $$s_1^{k-1} = s_{F1}^{k-1} + s_{B1}^{k-1} \bmod q$$

$$s_2^{k-1} = s_{F2}^{k-1} + s_{B2}^{k-1} \bmod q$$

furthermore, two consecutive transmitting signals $s_1^{k+1}, s_2^{k+1}$ of the (k+1)-th node are modeled respectively by using the following two expressions, $$s_1^{k+1} = s_{F1}^{k+1} + s_{B1}^{k+1} \bmod q$$

$$s_2^{k+1} = s_{F2}^{k+1} + s_{B2}^{k+1} \bmod q$$

where $s_{F1}^{k-1}, s_{F2}^{k-1}$ are two consecutive transmitting symbols for the forward link of the (k−1)-th node, $s_{B1}^{k-1}, s_{B1}^{k-1}$ are two consecutive transmitting symbols for the backward link of the (k−1)-th node, $s_{F1}^{k+1}, s_{F2}^{k+1}$ are two consecutive transmitting symbols for the forward link of the (k+1)-th node, $s_{B1}^{k+1}, s_{B2}^{k+1}$ are two consecutive transmitting symbols (transmitting signal) for the backward link of the (k+1)-th node, q is the lattice size of the lattice coding.

Further, the above object of the present invention is also effectively achieved by the construction that in said STBC transmission data generating means, with respect to the (k−1)-th node, by using two consecutive transmitting signals $s_1^{k-1}, s_2^{k-1}$, based on $$X^{k-1} = \begin{bmatrix} s_1^{k-1} & -(s_2^{k-1})^* \\ s_2^{k-1} & (s_1^{k-1})^* \end{bmatrix},$$

STBC transmission data (a transmitting signal matrix $X^{k-1}$ for the first time slot and the second time slot) including four transmitting symbols for two time slots is generated, further, with respect to the (k+1)-th node, by using two consecutive transmitting signals $s_1^{k+1}, s_2^{k+1}$, based on $$X^{k+1} = \begin{bmatrix} s_1^{k+1} & -(s_2^{k+1})^* \\ s_2^{k+1} & (s_1^{k+1})^* \end{bmatrix},$$

STBC transmission data (a transmitting signal matrix $X^{k+1}$ for the first time slot and the second time slot) including four transmitting symbols for two time slots is generated.

Further, the above object of the present invention is also effectively achieved by the construction that in the case that the k-th node is a receiving node, said STBC reception data generating means receives STBC transmission data of the (k−1)-th node and the (k+1)-th node with said antennas, and generates STBC reception data based on y=H$_e$s+n, where y∈C$^4$ is an equivalent receiving signal vector of the k-th node for the first time slot and the second time slot and represented by y=[y$_{11}$,y$_{12}$*,y$_{21}$,y$_{22}$*]$^T$, s∈C$^4$ is a transmitting signal vector and represented by s=[s$_1^{k-1}$,s$_2^{k-1}$,s$_1^{k+1}$,s$_2^{k+1}$]$^T$, n∈C$^4$ is an equivalent additive noises vector for the first time slot and the second time slot and represented by n=[n$_{11}$,n$_{12}$*,n$_{21}$,n$_{22}$*]$^T$, furthermore, H$_e$∈C$^{4\cdot4}$ is a STBC equivalent channel matrix of the k-th node that is a block orthogonal matrix.

Further, the above object of the present invention is also effectively achieved by the construction that said MIMO detecting means performs said MIMO detecting process that estimates an estimation symbol ŝ by MIMO reception based on ŝ=[ŝ$_1^{k-1}$,ŝ$_2^{k-1}$,ŝ$_1^{k+1}$,ŝ$_2^{k+1}$]$^T$=W$_k^H$y with respect to the k-th node, where W$_k$∈C$^{4\cdot4}$ is a receiving weight matrix of the k-th node, y is the STBC reception data of the k-th node, in the case of using the ZF algorithm in MIMO reception, the receiving weight matrix W$_k$ of the k-th node is computed based on W$_k$=H$_e$(H$_e^H$H$_e$)$^{-1}$, where H$_e$ is the STBC equivalent channel matrix of the k-th node, furthermore, in the case of using the MMSE algorithm in MIMO reception, the receiving weight matrix W$_k$ of the k-th node is computed based on $$W_k = H_e \left( H_e^H H_e + \frac{2\sigma^2}{P} I \right)^{-1},$$

where P is the total transmission power per node, σ$^2$ is the noise power per receiving antenna.

Further, the above object of the present invention is also effectively achieved by the construction that a multi-hop wireless communication system with multiple node devices having a relay function in which said each node device is equipped with multiple MIMO antennas and a wireless communication system is constructed by setting up forward links and backward links between said node devices, said multi-hop wireless communication system characterized in that said node device comprises a MIMO detecting means that performs a MIMO detecting process to estimate estimation symbols from channel information estimated from training signals that are wirelessly received with said antennas and the received wireless signals that are wirelessly received with said antennas; a network decoding means that performs a network decoding process to generate relay signals from said estimated estimation symbols; a relay control means that performs a destination control process; a network coding means that performs a network coding process to generate transmitting signals from said generated relay signals; and a training signal adding means that adds said training signals to said transmitting signals generated by said network coding means and performs a training signal adding process, said transmitting signals that said training signals are added to is transmitted as transmitted wireless signals.

Further, the above object of the present invention is also effectively achieved by the construction that a multi-hop wireless communication system with multiple node devices having a relay function in which said each node device is equipped with multiple MIMO antennas and a two-dimensional multi-hop communication system with a cross type topology where two routes intersect at one node device is constructed by setting up wireless links between said node devices, said multi-hop wireless communication system characterized in that said each node device repeats the receiving state and the transmitting state alternately, performs transmission/reception processing and the relay transmission of data, by applying two-dimension MIMO network coding to an intersection node device and adjacent node devices adjacent to said intersection node device, the multi-hop relay of the two-dimension bi-directional flow with a single channel is realized.

Further, the above object of the present invention is also effectively achieved by the construction that a multi-hop wireless communication system with multiple node devices having a relay function in which said each node device is equipped with multiple MIMO antennas and a two-dimensional multi-hop communication system with a rotary type topology where two routes intersect via four node devices is constructed by setting up wireless links between said node devices, said multi-hop wireless communication system characterized in that said each node device repeats the receiving state and the transmitting state alternately, performs transmission/reception processing and the relay transmission of data, by applying two-dimension MIMO network coding to rotary node devices and adjacent node devices adjacent to said rotary node devices, the multi-hop relay of the two-dimension rotary type bi-directional flow with a single channel is realized.

Further, the above object of the present invention is also effectively achieved by the construction that a multi-hop wireless communication system with multiple node devices having a relay function in which said each node device is equipped with multiple MIMO antennas and a two-dimensional multi-hop communication system with a tree type topology where two routes are partially combined and the partially-combined route configures a common route is constructed by setting up wireless links between said node devices, said multi-hop wireless communication system characterized in that said each node device repeats the receiving state and the transmitting state alternately, performs transmission/reception processing and the relay transmission of data, by applying two-dimension MIMO network coding to node devices on said common route and adjacent node devices adjacent to said node devices on said common route, the multi-hop relay of the two-dimension tree type bi-directional flow with a single channel is realized.

Further, the above object of the present invention is also effectively achieved by the construction that said two routes are route H and route V, a node device that said two-dimension MIMO network coding is applied, comprises a MIMO detecting means that performs a MIMO detecting process to estimate estimation symbols from channel information estimated from training signals that are wirelessly received with said antennas and the received wireless signals that are wirelessly received with said antennas; a network decoding means in route H that performs a network decoding process in route H to generate relay signals of route H from said estimation symbols for the forward link and the backward link that are estimated by said MIMO detecting means; a relay control means in route H that performs a destination control process in route H; a network coding means in route H that performs a network coding process in route H to generate transmitting signals of route H from said generated relay signals of route H; a training signal adding means in route H that adds training signals of route H to said transmitting signals of route H generated by said network coding means in route H and performs a training signal adding process in route H; a network decoding means in route V that performs a network decoding process in route V to generate relay signals of route V from said estimation symbols for the upward link and the downward link that are estimated by said MIMO detecting means; a relay control means in route V that performs a destination control process in route V; a network coding means in route V that performs a network coding process in route V to generate transmitting signals of route V from said generated relay signals of route V; and a training signal adding means in route V that adds training signals of route V to said transmitting signals of route V generated by said network coding means in route V and performs a training signal adding process in route V, said node device performs a MIMO spatial multiplexing process with respect to the network-coded transmission data in route H that the training signals of route H are added to and the network-coded transmission data in route V that the training signals of route V are added to, and then transmits as the transmitted wireless signals.

Further, the above object of the present invention is also effectively achieved by the construction that with respect to remaining node devices except node devices that said two-dimension MIMO network coding is applied from said multiple node devices, one-dimension MIMO network coding is applied.

Further, the above object of the present invention is also effectively achieved by the construction that a multi-hop wireless communication system with multiple node devices having a relay function in which said each node device is equipped with multiple MIMO antennas and a two-dimensional multi-hop communication system with a cross type topology where two routes intersect at one node device is constructed by setting up wireless links between said node devices, said multi-hop wireless communication system characterized in that said each node device repeats the receiving state and the transmitting state alternately, performs transmission/reception processing and the relay transmission of data, by applying two-dimension STBC-MIMO network coding to an intersection node device and adjacent node devices adjacent to said intersection node device, the multi-hop relay of the two-dimension STBC-processed bi-directional flow with a single channel is realized.

Further, the above object of the present invention is also effectively achieved by the construction that a multi-hop wireless communication system with multiple node devices having a relay function in which said each node device is equipped with multiple MIMO antennas and a two-dimensional multi-hop communication system with a rotary type topology where two routes intersect via four node devices is constructed by setting up wireless links between said node devices, said multi-hop wireless communication system characterized in that said each node device repeats the receiving state and the transmitting state alternately, performs transmission/reception processing and the relay transmission of data, by applying two-dimension STBC-MIMO network coding to rotary node devices and adjacent node devices adjacent to said rotary node devices, the multi-hop relay of the two-dimension rotary type STBC-processed bi-directional flow with a single channel is realized.

Further, the above object of the present invention is also effectively achieved by the construction that a multi-hop wireless communication system with multiple node devices having a relay function in which said each node device is equipped with multiple MIMO antennas and a two-dimensional multi-hop communication system with a tree type topology where two routes are partially combined and the partially-combined route configures a common route is constructed by setting up wireless links between said node devices, said multi-hop wireless communication system characterized in that said each node device repeats the receiving state and the transmitting state alternately, performs transmission/reception processing and the relay transmission of data, by applying two-dimension STBC-MIMO network coding to node devices on said common route and adjacent node devices adjacent to said node devices on said common route, the multi-hop relay of the two-dimension tree type STBC-processed bi-directional flow with a single channel is realized.

Further, the above object of the present invention is also effectively achieved by the construction that said two routes are route H and route V, a node device that said two-dimension STBC-MIMO network coding is applied, comprises a STBC reception data generating means that performs a STBC reception data generating process to generate STBC reception data from the received wireless signals that are wirelessly received with said antennas; a STBC channel matrix generating means that performs a STBC channel matrix generating process to generate a STBC equivalent channel matrix from channel information estimated from training signals that are wirelessly received with said antennas; a MIMO detecting means that performs a MIMO detecting process to estimate estimation symbols from said generated STBC equivalent channel matrix and said generated STBC reception data; a network decoding means in route H that performs a network decoding process in route H to generate relay signals of route H that are two consecutive symbols to the forward link and the backward link from said estimation symbols for the forward link and the backward link that are estimated by said MIMO detecting means; a relay control means in route H that performs a destination control process in route H; a network coding means in route H that performs a network coding process in route H of two consecutive transmitting symbols to generate two consecutive transmitting signals of route H from said generated relay signals of route H; a STBC transmission data generating means in route H that performs a STBC transmission data generating process in route H to generate STBC transmission data in route H from said transmitting signals of route H generated by said network coding means in route H; a training signal adding means in route H that adds training signals of route H to said generated STBC transmission data in route H and performs a training signal adding process in route H; a network decoding means in route V that performs a network decoding process in route V to generate relay signals of route V that are two consecutive symbols to the upward link and the downward link from said estimation symbols for the upward link and the downward link that are estimated by said MIMO detecting means; a relay control means in route V that performs a destination control process in route V; a network coding means in route V that performs a network coding process in route V of two consecutive transmitting symbols to generate two consecutive transmitting signals of route V from said generated relay signals of route V; a STBC transmission data generating means in route V that performs a STBC transmission data generating process in route V to generate STBC transmission data in route V from said transmitting signals of route V generated by said network coding means in route V; a training signal adding means in route V that adds training signals of route V to said generated STBC transmission data in route V and performs a training signal adding process in route V; said node device performs a MIMO spatial multiplexing process with respect to the STBC transmission data in route H that the training signals of route H are added to and the STBC transmission data in route V that the training signals of route V are added to, and then transmits as the transmitted wireless signals.

Further, the above object of the present invention is also effectively achieved by the construction that with respect to remaining node devices except node devices that said two-dimension STBC-MIMO network coding is applied from said multiple node devices, one-dimension STBC-MIMO network coding is applied.

BRIEF DESCRIPTION OF THE DRAWINGS

FIG. 3 is a conceptual diagram illustrating the transmission/reception processing in the k-th node that is performed in a multi-hop wireless communication system of the present invention using MIMO network coding which applied space-time block codes;

FIG. 10 is a conceptual diagram illustrating a wireless mesh network having a cross type topology and a rotary type topology, and information flow within this wireless mesh network;

FIG. 11 is a conceptual diagram illustrating 2DMNC1 and 2DMNC2 of the present invention;

DESCRIPTION OF THE NUMERALS

Figure 1:
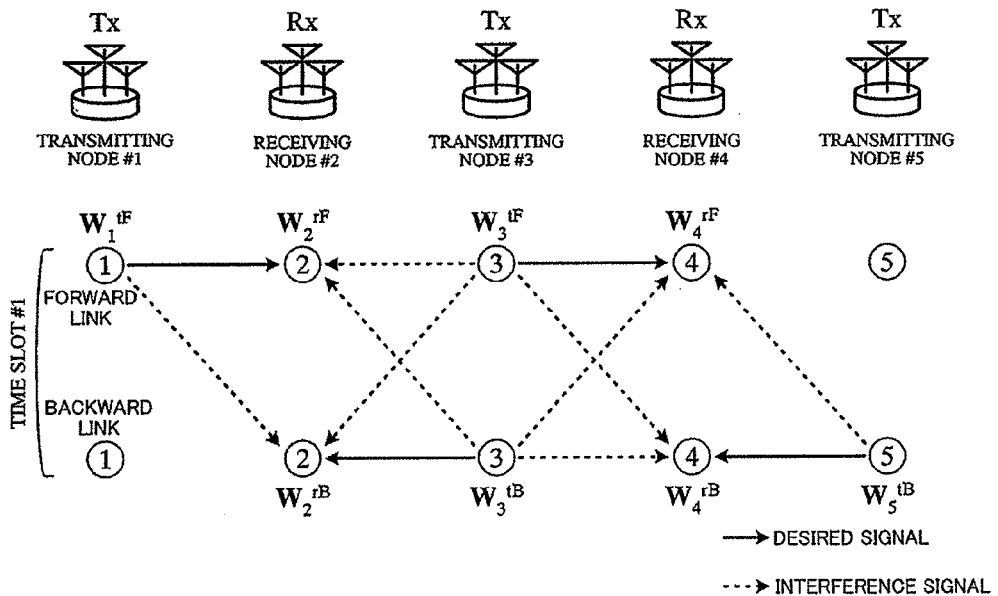
FIG. 1 is a conceptual diagram illustrating an existing MIMO multi-hop/mesh network.

| | |
|---|---|
| 1, 2, 3, 4, 5 | node device |
| 10, 100 | RF transceiver |
| 15, 150 | frame processing unit |
| 20, 200 | STBC reception data generating unit |
| 30, 300 | channel estimation unit |
| 40, 400 | MIMO detecting unit |
| 50, 500 | STBC channel matrix generating unit |
| 60 | network decoding unit |
| 70 | relay control unit |
| 90 | network coding unit |
| 100 | STBC transmission data generating unit |
| 110 | training signal adding unit |
| 350 | null beam weight generating unit |
| 410 | MIMO detecting unit having a reception null beamforming function |
| 601 | network decoding unit in route H |

-continued

| 602 | network decoding unit in route V |
| 701 | relay control unit in route H |
| 702 | relay control unit in route V |
| 901 | network coding unit in route H |
| 902 | network coding unit in route V |
| 951 | transmission null beamforming unit in route H |
| 952 | transmission null beamforming unit in route V |
| 1001 | STBC transmission data generating unit in route H |
| 1002 | STBC transmission data generating unit in route V |
| 1101 | training signal adding unit in route H |
| 1102 | training signal adding unit in route V |

THE BEST MODE FOR CARRYING OUT THE INVENTION

A multi-hop wireless communication system according to the present invention is a communication system that performs wireless transmission of information (data) between a source node (hereinafter also referred to as "a source node device") and a destination node (hereinafter also referred to as "a destination node device") via at least one node (hereinafter also referred to as "anode device"). In the multi-hop wireless communication system according to the present invention, each node has a relay function and is equipped with M MIMO antennas (a M-element array antenna), and a multi-hop wireless communication system is constructed by setting up wireless links between nodes.

In the multi-hop wireless communication system of the present invention, as the relaying method of nodes, the decode-and-forward relaying scheme is used.

The multi-hop wireless communication system according to the present invention, easily realizes a highly-efficient and highly reliable bi-directional wireless relay transmission that multiplexes a forward link and a backward link and/or an upward link and a downward link in all links by using MIMO network coding technologies <one dimensional MIMO network coding and two dimensional MIMO network coding> (as will hereinafter be described in detail).

"One dimensional MIMO network coding" defined by the present invention can be divided into two classes.

One class applied multiple input multiple output (MIMO) scheme to transmission/reception scheme of network coding and furthermore applied space time block coding (STBC) scheme. Hereinafter this class is also referred to as "MIMO network coding which applied STBC" or "STBC-MIMO network coding".

Particularly, "MIMO network coding which applied STBC" applied STBC broadcast and MIMO multiple access into network coding.

Another class applied MIMO scheme to transmission/reception scheme of network coding. Hereinafter this class is also referred to as "MIMO network coding which does not apply STBC".

In addition, the space time block coding (STBC) scheme is a scheme proposed by Siavash M. Alamouti and Vahid Tarokh et al. (see Non-Patent Document 5). The space time block coding (STBC) scheme is one of transmission diversity techniques, and is characterized in that the transmitting node codes the same transmission symbol to be temporally orthogonal and transmits them with multiple antennas, and then the receiving node separates and combines the received signals by the channel estimation value to obtain the diversity gain.

The following is a description of preferred embodiments for carrying out the present invention, with reference to the accompanying drawings and expressions.

In addition, here, in order to explain a multi-hop wireless communication system according to the first embodiment of the present invention and a multi-hop wireless communication system according to the second embodiment of the present invention, we explain the mathematical symbols that are used in the mathematical expressions described below. $[\bullet]^*$ represents a complex conjugate matrix of $[\bullet]$. $[\bullet]^{-1}$ represents a generalized inverse matrix of $[\bullet]$. $[\bullet]^H$ represents a complex conjugate transposed matrix of $[\bullet]$. $[\bullet]^T$ represents a transposed matrix of $[\bullet]$.

<1> Multi-Hop Wireless Communication System According to the First Embodiment of the Present Invention At first, we explain a multi-hop wireless communication system according to the first embodiment of the present invention. The multi-hop wireless communication system according to the first embodiment of the present invention, uses "MIMO network coding which does not apply STBC".

<1-1> Signal Model

Figure 2:
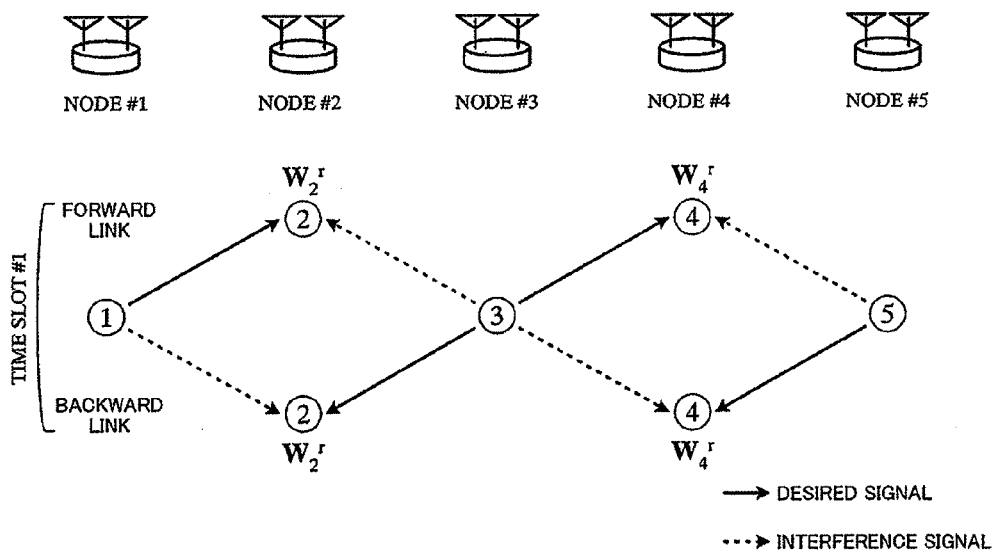
FIG. 2 is a conceptual diagram illustrating a multi-hop wireless communication system according to the present invention.

FIG. 2 conceptually shows a model of the multi-hop wireless communication system according to the first embodiment of the present invention. The lower part within FIG. 2, shows a signal model of the wireless communication system that focuses attention on adjacent links. As shown in FIG. 2, each node performs transmission/reception (transmission/reception processing) and the relay transmission of data.

Next, in the multi-hop wireless communication system according to the first embodiment of the present invention, attention is focused on two links adjacent to a certain node (a forward link and a backward link) and we formulate a signal model in the case that each node is equipped with multiple MIMO antennas.

At first, with respect to the multi-hop wireless communication system according to the first embodiment of the present invention, in the case that the (k−1)-th node and the (k+1)-th node are transmitting nodes, transmitting signals $s^{k-1}, s^{k+1}$ can be modeled respectively by using the following Expression 2 and Expression 3.

$$s^{k-1} = s_F^{k-1} + s_B^{k-1} \bmod q \qquad \text{[Expression 2]}$$

$$s^{k+1} = s_F^{k+1} + s_B^{k+1} \bmod q \qquad \text{[Expression 3]}$$

Where $s_F^{k-1}, s_B^{k-1}$ are transmitting symbols (transmitting signal) for the forward link and the backward link of the (k−1)-th node. $s_F^{k+1}, s_B^{k+1}$ are transmitting symbols (transmitting signal) for the forward link and the backward link of the (k+1)-th node. Furthermore, q is the lattice size of the lattice coding.

That is to say, with respect to the multi-hop wireless communication system according to the first embodiment of the present invention, in the case that the (k−1)-th node and the (k+1)-th node are transmitting nodes, based on the above Expression 2 and Expression 3, network coding processes (network encoding processes) are performed respectively and one transmitting signal including two transmitting symbols for the forward link and the backward link, is generated with respect to both the (k−1)-th node and the (k+1)-th node.

Next, with respect to the multi-hop wireless communication system according to the first embodiment of the present invention, in the case that the k-th node is a receiving node, a receiving signal $y^k$ of the k-th node that receives the transmitting signals $s^{k-1}, s^{k+1}$ of the (k−1)-th node and the (k+1)-th node, can be modeled by using the following Expression 4.

$$y^k = h^{k(k-1)} s^{k-1} + h^{k(k+1)} s^{k+1} + \qquad \text{[Expression 4]}$$

$$n = [h^{k(k-1)} h^{k(k+1)}] \begin{bmatrix} s^{k-1} \\ s^{k+1} \end{bmatrix} + n = Hs + n$$

Where $h^{k(k-1)} \in C^2$ is a channel vector from the (k−1)-th node to the k-th node. $h^{k(k+1)} \in C^2$ is a channel vector from the (k+1)-th node to the k-th node. Furthermore, $n \in C^2$ is an additive noises vector.

That is to say, with respect to the multi-hop wireless communication system according to the first embodiment of the present invention that uses "MIMO network coding which does not apply STBC", in the case that the k-th node is a receiving node, in the forward link of the k-th node, $s^{k-1}$ is a desired signal and $s^{k+1}$ is an interference signal, furthermore, in the backward link of the k-th node, $s^{k+1}$ is a desired signal and $s^{k-1}$ is an interference signal.

And the present invention performs the interference avoidance, and simultaneously receives and decodes signals of the forward link and the backward link by using "MIMO receiving scheme" that will be described in <1-2> in detail.

<1-2> MIMO Receiving Scheme in MIMO Detecting Process

As described in <1-1>, in the multi-hop wireless communication system according to the first embodiment of the present invention that uses "MIMO network coding which does not apply STBC", with respect to a certain node, one interference signal occurs from transmitting signals from adjacent nodes.

In general, a linear algorithm using a M-element array antenna (M MIMO antennas) can cancel (M−1) interference signals.

Therefore, the multi-hop wireless communication system according to the present invention that uses MIMO network coding which does not apply STBC, cancel interference signals by using only receiving weights.

In the multi-hop wireless communication system according to the first embodiment of the present invention, based on the following Expression 5, the k-th node that receives the transmitting signals of the (k−1)-th node and the (k+1)-th node, performs a MIMO detecting process that estimates an estimation symbol $\hat{s}^k$ by MIMO reception.

$$\hat{s}^k = \begin{bmatrix} \hat{s}^{k-1} \\ \hat{s}^{k+1} \end{bmatrix} = W_k^H y^k \quad \text{[Expression 5]}$$

Where $W_k \in C^{2 \cdot 2}$ is a receiving weight matrix of the k-th node. Further, $\hat{s}^{k-1}$ is an estimation value of the transmitting signal $s^{k-1}$ of the (k−1)-th node. $\hat{s}^{k+1}$ is an estimation value of the transmitting signal $s^{k+1}$ of the (k+1)-th node. Moreover, $y^k$ is the receiving signal of the k-th node.

For example, in the case of using the Zero Forcing (ZF) algorithm in MIMO reception, the receiving weight matrix $W_k$ of the k-th node is computed based on the following Expression 6.

$$W_k = H(H^H H)^{-1} \quad \text{[Expression 6]}$$

Where H is a channel matrix that puts together the channel vector $h^{k(k-1)}$ from the (k−1)-th node to the k-th node and the channel vector $h^{k(k+1)}$ from the (k+1)-th node to the k-th node.

Further, for example, in the case of using the MMSE algorithm in MIMO reception, the receiving weight matrix $W_k$ of the k-th node is computed based on the following Expression 7.

$$W_k = H\left(H^H H + \frac{\sigma^2}{P}I\right)^{-1} \quad \text{[Expression 7]}$$

Where P is the total transmission power per node. Further, $\sigma^2$ is the noise power per receiving antenna.

It is clear from the above Expression 6 and Expression 7 that with respect to the multi-hop wireless communication system according to the present invention that uses MIMO network coding which does not apply STBC, in the case that a certain node is a receiving node (for example, the k-th node is a receiving node), in order to compute the receiving weight (the receiving weight matrix) of the said certain node, channel information (the channel matrix) between adjacent nodes is needed.

<1-3> Network Decoding Process and Relay Control Process

With respect to the multi-hop wireless communication system according to the first embodiment of the present invention, as described in <1-1> and <1-2>, in the case that the k-th node is a receiving node, by using MIMO receiving scheme, the interference avoidance is performed while the backward link of the k-th node receives and decodes the transmitting signal of the (k+1)-th node, at the same time the forward link of the k-th node receives and decodes the transmitting signal of the (k−1)-th node.

Based on the estimation symbols $\hat{s}^{k-1}$, $\hat{s}^{k+1}$ obtained by the MIMO detecting process, the k-th node performs a network decoding process and generates a relay signal, and then performs "a relay (destination) control process" that determines either the generated relay signal is a signal (data) for a local node or the generated relay signal is a signal (data) for another node. That is to say, the k-th node became the relay state, hereinafter the k-th node that is in the relay state, is also referred to as a relay node.

With respect to the k-th node that is a relay node, the following Expression 8 and Expression 9 hold.

$$s_B^{k-1}(n) = s_B^k(n-1) \equiv s_B^k \quad \text{[Expression 8]}$$

$$s_F^{k+1}(n) = s_F^k(n-1) \equiv s_F^k \quad \text{[Expression 9]}$$

Where $s_F^k(n-1), s_B^k(n-1)$ are signal (symbols) that are transmitted to the forward link and the backward link of the k-th node at previous time slot (n−1). $s_B^{k-1}(n)$ is a signal (a symbol) that is transmitted to the backward link of the (k−1)-th node at time slot n. $s_F^{k+1}(n)$ is a signal (a symbol) that is transmitted to the forward link of the (k+1)-th node at time slot n. Furthermore, $s_F^k, s_B^k$ are transmitting signals that are transmitted to the forward link and the backward link at previous time slot by the k-th node for the network decoding process and stored in a memory.

In the multi-hop wireless communication system according to the first embodiment of the present invention, based on the following Expression 10 and Expression 11, the k-th node performs the network decoding process and generates relay signals $s_F^{k-1}, s_B^{k+1}$.

$$s_F^{k-1} = \hat{s}^{k-1} - s_B^k \mod q \quad \text{[Expression 10]}$$

$$s_B^{k+1} = \hat{s}^{k+1} - s_F^k \mod q \quad \text{[Expression 11]}$$

In conventional wireless communication systems using network coding that are described in Non-Patent Document 3 and Non-Patent Document 4, each node receives the signal by one antenna and decodes the received signal.

On the other hand, the multi-hop wireless communication system according to the first embodiment of the present invention that uses MIMO network coding which does not apply STBC, each node receives signals by multiple antennas (multiple MIMO antennas) and decodes the received signals.

In this way, in the present invention, by using multiple antennas (multiple MIMO antennas), with respect to a multi-hop wireless communication system according to the second embodiment of the present invention that will be described in <2> in detail, it will be possible to furthermore apply the space time block coding (STBC) scheme, therefore it is possible to further improve the performance of the wireless communication system.

<2> Multi-Hop Wireless Communication System According to the Second Embodiment of the Present Invention Next, we explain a multi-hop wireless communication system according to the second embodiment of the present invention. The multi-hop wireless communication system according to the second embodiment of the present invention, uses "MIMO network coding which applied STBC".

That is to say, in order to further improve communication quality of the multi-hop wireless communication system according to the first embodiment of the present invention, inventors of the present invention invented the multi-hop wireless communication system according to the second embodiment of the present invention that uses "MIMO network coding which applied STBC" by further applying the space time block coding (STBC) scheme to the multi-hop wireless communication system according to the first embodiment of the present invention.

<2-1> Signal Model

It is possible to conceptually shows a model of the multi-hop wireless communication system according to the second embodiment of the present invention by using FIG. 2. The lower part within FIG. 2, shows a signal model of the wireless communication system that focuses attention on adjacent links. As shown in FIG. 2, each node performs transmission/reception (transmission/reception processing) and the relay transmission of data.

Furthermore, FIG. 3 is a conceptual diagram illustrating main flow of the transmission/reception processing in the k-th node that is performed in the multi-hop wireless communication system according to the second embodiment of the present invention.

Next, in the multi-hop wireless communication system according to the second embodiment of the present invention, attention is focused on two links adjacent to a certain node (a forward link and a backward link) and we formulate a signal model in the case that each node is equipped with multiple MIMO antennas and then Alamouti code is used in the space time block coding (STBC). Moreover, the detail of the Alamouti code is described in Non-Patent Document 7.

At first, with respect to the multi-hop wireless communication system according to the second embodiment of the present invention, in the case that the (k−1)-th node and the (k+1)-th node are transmitting nodes, two consecutive transmitting signals $s_1^{k-1}, s_2^{k-1}$ of the (k−1)-th node can be modeled respectively by using the following Expression 12 and Expression 13. Furthermore, two consecutive transmitting signals $s_1^{k+1}, s_2^{k+1}$ of the (k+1)-th node can be modeled respectively by using the following Expression 14 and Expression 15.

$$s_1^{k-1} = s_{F1}^{k-1} + s_{B1}^{k-1} \bmod q \qquad \text{[Expression 12]}$$

$$s_2^{k-1} = s_{F2}^{k-1} + s_{B2}^{k-1} \bmod q \qquad \text{[Expression 13]}$$

$$s_1^{k+1} = s_{F1}^{k+1} + s_{B1}^{k+1} \bmod q \qquad \text{[Expression 14]}$$

$$s_2^{k+1} = s_{F2}^{k+1} + s_{B2}^{k+1} \bmod q \qquad \text{[Expression 15]}$$

Where $s_{F1}^{k-1}, s_{F2}^{k-1}$ are two consecutive transmitting symbols (transmitting signal) for the forward link of the (k−1)-th node. $s_{B1}^{k-1}, s_{B2}^{k-1}$ are two consecutive transmitting symbols (transmitting signal) for the backward link of the (k−1)-th node. $s_{F1}^{k+1}, s_{F2}^{k+1}$ are two consecutive transmitting symbols (transmitting signal) for the forward link of the (k+1)-th node. $s_{B1}^{k+1}, s_{B2}^{k+1}$ are two consecutive transmitting symbols (transmitting signal) for the backward link of the (k+1)-th node. Furthermore, q is the lattice size of the lattice coding.

That is to say, with respect to the multi-hop wireless communication system according to the second embodiment of the present invention, in the case that the (k−1)-th node and the (k+1)-th node are transmitting nodes, based on the above Expression 12, Expression 13, Expression 14 and Expression 15, network coding processes (network encoding processes) for two consecutive transmitting symbols are performed respectively and two consecutive transmitting signals $s_1^{k-1}, s_2^{k-1}$ including two consecutive transmitting symbols for the forward link and two consecutive transmitting symbols for the backward link, are generated with respect to the (k−1)-th node, furthermore, two consecutive transmitting signals $s_1^{k+1}, s_2^{k+1}$ including two consecutive transmitting symbols for the forward link and two consecutive transmitting symbols for the backward link, are generated also with respect to the (k−1)-th node.

Next, in the multi-hop wireless communication system according to the second embodiment of the present invention, based on the following Expression 16, the (k−1)-th node performs a STBC coding process (a STBC transmission data generation processing) and generates STBC transmission data (a transmitting signal matrix $X^{k-1}$ for the first time slot and the second time slot) including four transmitting symbols for two time slots, by using two consecutive transmitting signals $s_1^{k-1}, s_2^{k-1}$ generated by the above Expression 12 and Expression 13.

$$X^{k-1} = \begin{bmatrix} s_1^{k-1} & -(s_2^{k-1})^* \\ s_2^{k-1} & (s_1^{k-1})^* \end{bmatrix} \qquad \text{[Expression 16]}$$

Furthermore, based on the following Expression 17, the (k+1)-th node performs the STBC coding process (the STBC transmission data generation processing) and generates STBC transmission data (a transmitting signal matrix $X^{k+1}$ for the first time slot and the second time slot) including four transmitting symbols for two time slots, by using two consecutive transmitting signals $s_1^{k+1}, s_2^{k+1}$ generated by the above Expression 14 and Expression 15.

$$X^{k+1} = \begin{bmatrix} s_1^{k+1} & -(s_2^{k+1})^* \\ s_2^{k+1} & (s_1^{k+1})^* \end{bmatrix} \qquad \text{[Expression 17]}$$

It is clear from the above Expression 16 and Expression 17 that "MIMO network coding which applied STBC" of the present invention is different from conventional space time block coding (STBC) scheme described in Non-Patent Document 5 and Non-Patent Document 7.

That is to say, in the multi-hop wireless communication system according to the second embodiment of the present invention that uses "MIMO network coding which applied STBC", each node transmits four transmitting symbols to the forward link and the backward link at two time slots (at time slot n and time slot (n+1)).

Next, with respect to the multi-hop wireless communication system according to the second embodiment of the present invention, in the case that the k-th node is a receiving node, a receiving signal (a receiving signal matrix for two time slots) of the k-th node that receives the STBC transmission data (two transmitting signal matrices for two time slots) of the (k−1)-th node and the (k+1)-th node, can be modeled by using the following Expression 18.

$$Y = H^{k(k-1)} X^{k-1} + H^{k(k+1)} X^{k+1} + N \qquad \text{[Expression 18]}$$

Where $Y \in C^{2 \cdot 2}$ is the receiving signal matrix of the k-th node for time slot n and time slot (n+1). $N \in C^{2 \cdot 2}$ is an additive noises matrix for time slot n and time slot (n+1). Furthermore, $H^{k(k-1)} \in C^{2 \cdot 2}$ is a channel matrix from the (k−1)-th node to the k-th node. $H^{k(k-1)} \in C^{2 \cdot 2}$ is a channel matrix from the (k+1)-th node to the k-th node. $X^{k-1} \in C^{2 \cdot 2}$ is the transmitting signal matrix of the (k−1)-th node in which the space time block coding is performed, i.e., the STBC transmission data of the (k−1)-th node. $X^{k+1} \in C^{2 \cdot 2}$ is the transmitting signal matrix of the (k+1)-th node in which the space time block coding is performed, i.e., the STBC transmission data of the (k+1)-th node.

Here, by vectorizing the receiving signal matrix $Y \in C^{2 \cdot 2}$ of the k-th node for two time slots, the following Expression 19 that is the equivalent expression of the above Expression 18 holds.

$$y = H_e s + n \qquad \text{[Expression 19]}$$

Where $y \in C^4$ is an equivalent receiving signal vector of the k-th node for the first time slot and the second time slot and represented by the following Expression 20. $s \in C^4$ is a transmitting signal vector and represented by the following Expression 21. $n \in C^4$ is an equivalent additive noises vector for the first time slot and the second time slot and represented by the following Expression 22. Furthermore, $H_e \in C^{4 \cdot 4}$ is a STBC equivalent channel matrix of the k-th node that is a block orthogonal matrix and represented by the following Expression 23.

$$y = [y_{11}, y_{12}^*, y_{21}, y_{22}^*]^T \qquad \text{[Expression 20]}$$

$$s = [s_1^{k-1}, s_2^{k-1}, s_1^{k+1}, s_2^{k+1}]^T \qquad \text{[Expression 21]}$$

$$n = [n_{11}, n_{12}^*, n_{21}, n_{22}^*]^T \qquad \text{[Expression 22]}$$

$$H_e = \begin{bmatrix} H_{11}^{k-1} & H_{12}^{k-1} & H_{11}^{k+1} & H_{12}^{k+1} \\ (H_{12}^{k-1})^* & -(H_{11}^{k-1})^* & (H_{12}^{k+1})^* & -(H_{11}^{k+1})^* \\ H_{21}^{k-1} & H_{22}^{k-1} & H_{21}^{k+1} & H_{22}^{k+1} \\ (H_{22}^{k-1})^* & -(H_{21}^{k-1})^* & (H_{22}^{k+1})^* & -(H_{21}^{k+1})^* \end{bmatrix} \qquad \text{[Expression 23]}$$

Where $H_{11}^{k-1}$ is a channel coefficient from the first transmitting antenna of the (k−1)-th node to the first receiving antenna of the k-th node. $H_{11}^{k+1}$ is a channel coefficient from the first transmitting antenna of the (k+1)-th node to the first receiving antenna of the k-th node. $H_{12}^{k-1}$ is a channel coefficient from the second transmitting antenna of the (k−1)-th node to the first receiving antenna of the k-th node. $H_{12}^{k+1}$ is a channel coefficient from the second transmitting antenna of the (k+1)-th node to the first receiving antenna of the k-th node. $H_{21}^{k-1}$ is a channel coefficient from the first transmitting antenna of the (k−1)-th node to the second receiving antenna of the k-th node. $H_{21}^{k+1}$ is a channel coefficient from the first transmitting antenna of the (k+1)-th node to the second receiving antenna of the k-th node. $H_{22}^{k-1}$ is a channel coefficient from the second transmitting antenna of the (k−1)-th node to the second receiving antenna of the k-th node. $H_{22}^{k+1}$ is a channel coefficient from the second transmitting antenna of the (k+1)-th node to the second receiving antenna of the k-th node.

<2-2> STBC Decoding Process (STBC Reception Data Generating Process) and MIMO Detecting Process With respect to the multi-hop wireless communication system according to the second embodiment of the present invention, in the case that the k-th node is a receiving node, the k-th node receives the STBC transmission data of the (k−1)-th node and the (k+1)-th node, and performs a STBC decoding process (a STBC reception data generating process) based on the above Expression 19 to generate the STBC reception data.

Next, after the STBC reception data of the k-th node is generated by the STBC decoding process (the STBC reception data generating process), based on the following Expression 24, the k-th node performs a MIMO detecting process that estimates an estimation symbol ŝ by MIMO reception.

$$\hat{s} = [\hat{s}_1^{k-1}, \hat{s}_2^{k-1}, \hat{s}_1^{k+1}, \hat{s}_2^{k+1}]^T = W_k^H y \qquad \text{[Expression 24]}$$

Where $W_k \in C^{4 \cdot 4}$ is a receiving weight matrix of the k-th node. Furthermore, y is the STBC reception data of the k-th node.

For example, in the case of using the Zero Forcing (ZF) algorithm in MIMO reception, the receiving weight matrix $W_k$ of the k-th node is computed based on the following Expression 25.

$$W_k = H_e (H_e^H H_e)^{-1} \qquad \text{[Expression 25]}$$

Where $H_e$ is the STBC equivalent channel matrix of the k-th node that is generated by the above Expression 23.

Furthermore, for example, in the case of using the MMSE algorithm in MIMO reception, the receiving weight matrix $W_k$ of the k-th node is computed based on the following Expression 26.

$$W_k = H_e \left( H_e^H H_e + \frac{2\sigma^2}{P} I \right)^{-1} \qquad \text{[Expression 26]}$$

Where P is the total transmission power per node. Further, $\sigma^2$ is the noise power per receiving antenna.

<2-3> Network Decoding Process and Relay Control Process

In the multi-hop wireless communication system according to the second embodiment of the present invention, based on the estimation symbol ŝ obtained by the MIMO detecting process described in <2-2>, the k-th node performs a network decoding process and generates a relay signal, and then performs "a relay (destination) control process" that determines either the generated relay signal is a signal (data) for a local node or the generated relay signal is a signal (data) for another node. That is to say, the k-th node became the relay state, hereinafter the k-th node that is in the relay state, is also referred to as a relay node.

In the multi-hop wireless communication system according to the second embodiment of the present invention that uses "MIMO network coding which applied STBC", with respect to the k-th node that is a relay node, the following Expression 27, Expression 28, Expression 29 and Expression 30 hold.

$$s_{B1}^{k-1}(n) = s_{B1}^k(n-1) \equiv s_{B1}^k \qquad \text{[Expression 27]}$$

$$s_{B2}^{k-1}(n) = s_{B2}^k(n-1) \equiv s_{B2}^k \qquad \text{[Expression 28]}$$

$$s_{F1}^{k+1}(n) = s_{F1}^k(n-1) \equiv s_{F1}^k \qquad \text{[Expression 29]}$$

$$s_{F2}^{k+1}(n) = s_{F2}^k(n-1) \equiv s_{F2}^k \qquad \text{[Expression 30]}$$

Where $s_{F1}^k(n-1), s_{F2}^k(n-1), s_{B1}^k(n-1), s_{B2}^k(n-1)$ are two consecutive signals (symbols) that are transmitted to the forward link and the backward link of the k-th node at previous time slot (n−1). $s_{B1}^{k-1}(n), s_{B2}^{k-1}(n)$ are two consecutive signals (symbols) that are transmitted to the backward link of the (k−1)-th node at time slot n. $s_{F1}^{k+1}(n), s_{F2}^{k+1}(n)$ are two consecutive signals (symbols) that are transmitted to the forward link of the (k+1)-th node at time slot n. Furthermore, $s_{F1}^k, s_{F2}^k, s_{B1}^k, s_{B2}^k$ are two consecutive transmitting symbols that are transmitted to the forward link and the backward link at previous time slot by the k-th node for the network decoding process and stored in a memory.

In the multi-hop wireless communication system according to the second embodiment of the present invention, based on the following Expression 31, Expression 32, Expression 33 and Expression 34, the k-th node performs the network decoding process and generates relay signals (the network-decoded data) $s_{F1}^{k-1}, s_{F2}^{k-1}, s_{B1}^{k+1}, s_{B2}^{k+1}$ that are two consecutive symbols to the forward link and the backward link.

$$s_{F1}^{k-1} = \hat{s}_1^{k-1} - s_{B1}^k \bmod q \quad \text{[Expression 31]}$$

$$s_{F2}^{k-1} = \hat{s}_2^{k-1} - s_{B2}^k \bmod q \quad \text{[Expression 32]}$$

$$s_{B1}^{k+1} = \hat{s}_1^{k+1} - s_{F1}^k \bmod q \quad \text{[Expression 33]}$$

$$s_{B2}^{k+1} = \hat{s}_2^{k+1} - s_{F2}^k \bmod q \quad \text{[Expression 34]}$$

<2-4> Channel Estimation Process

With respect to both the multi-hop wireless communication system according to the first embodiment of the present invention and the multi-hop wireless communication system according to the second embodiment of the present invention, in the case that a certain node is a receiving node, the said certain node needs to perform a channel estimation process that estimates channel information.

Here, we show a concrete example of the channel estimation process that is performed in the present invention.

As represented by the following Expression 35, the (k−1)-th node transmits a training signal matrix $\tilde{S}^{k-1}$ to the k-th node. Where each row (corresponding to each transmitting antenna) of $\tilde{S}^{k-1}$ is orthogonal to each other.

$$Y^{k(k-1)} = H^{k(k-1)} \tilde{S}^{k-1} + N^k \quad \text{[Expression 35]}$$

Where $Y^{k(k-1)}$ is a receiving signal matrix of the k-th node that corresponds to the training signal from the (k−1)-th node. $H^{k(k-1)}$ is a channel matrix from the (k−1)-th node to the k-th node. Furthermore, W is an additive noises matrix of the k-th node.

Next, in the present invention, an equivalent channel vector is estimated based on the following Expression 36.

$$\hat{H}^{k(k-1)} = [\tilde{S}^{k-1}]^{-1} Y^{k(k-1)} \quad \text{[Expression 36]}$$

Where $\hat{H}^{k(k-1)}$ is an estimation value of the channel matrix from the (k−1)-th node to the k-th node.

<3> Node Device in the Multi-Hop Wireless Communication System According to the Second Embodiment of the Present Invention Here, we explain a node device in the multi-hop wireless communication system according to the second embodiment of the present invention.

Figure 4:
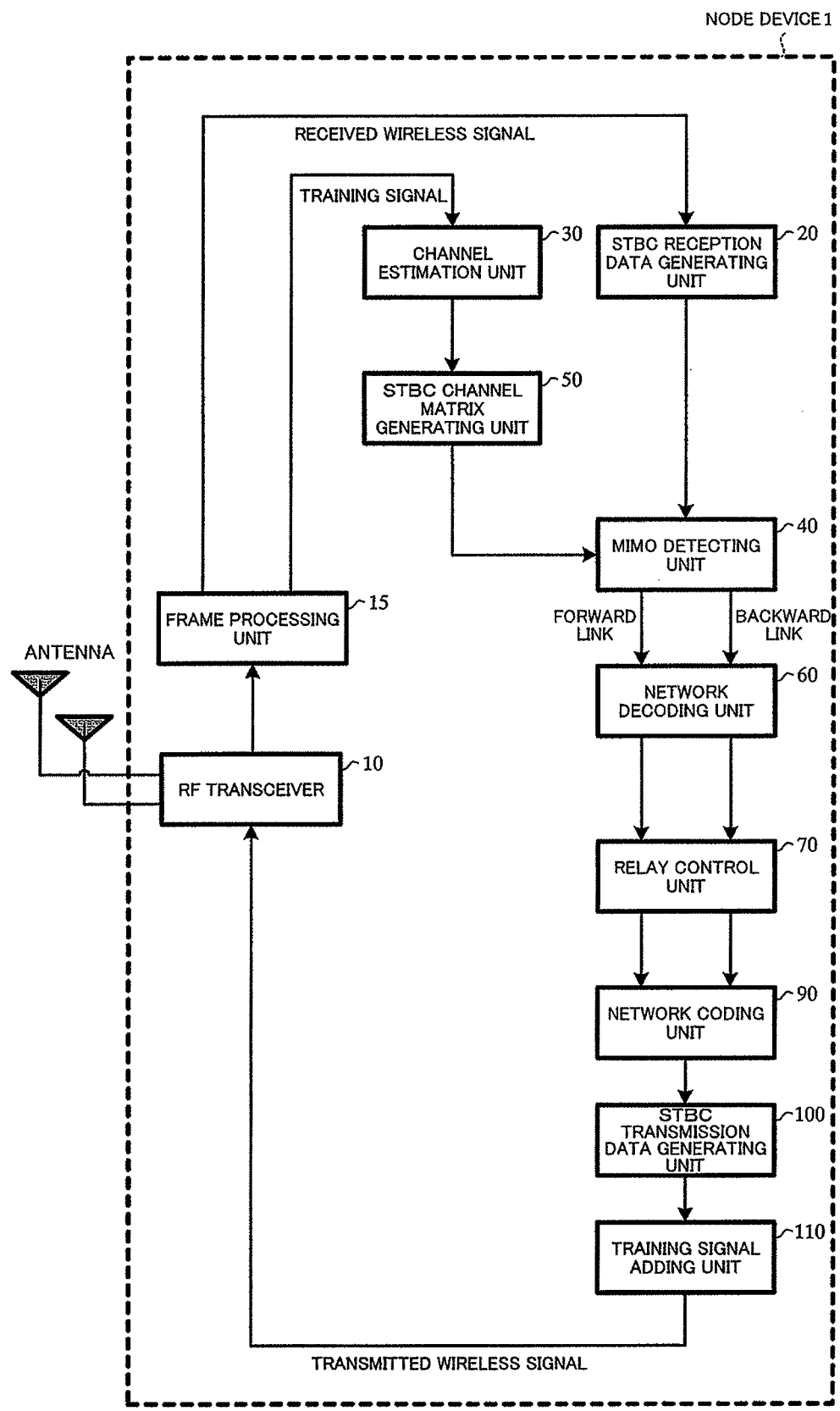
FIG. 4 is a block diagram showing the configuration of a node device in a multi-hop wireless communication system according to the second embodiment of the present invention (i.e., a node device 1)
Figure 5:
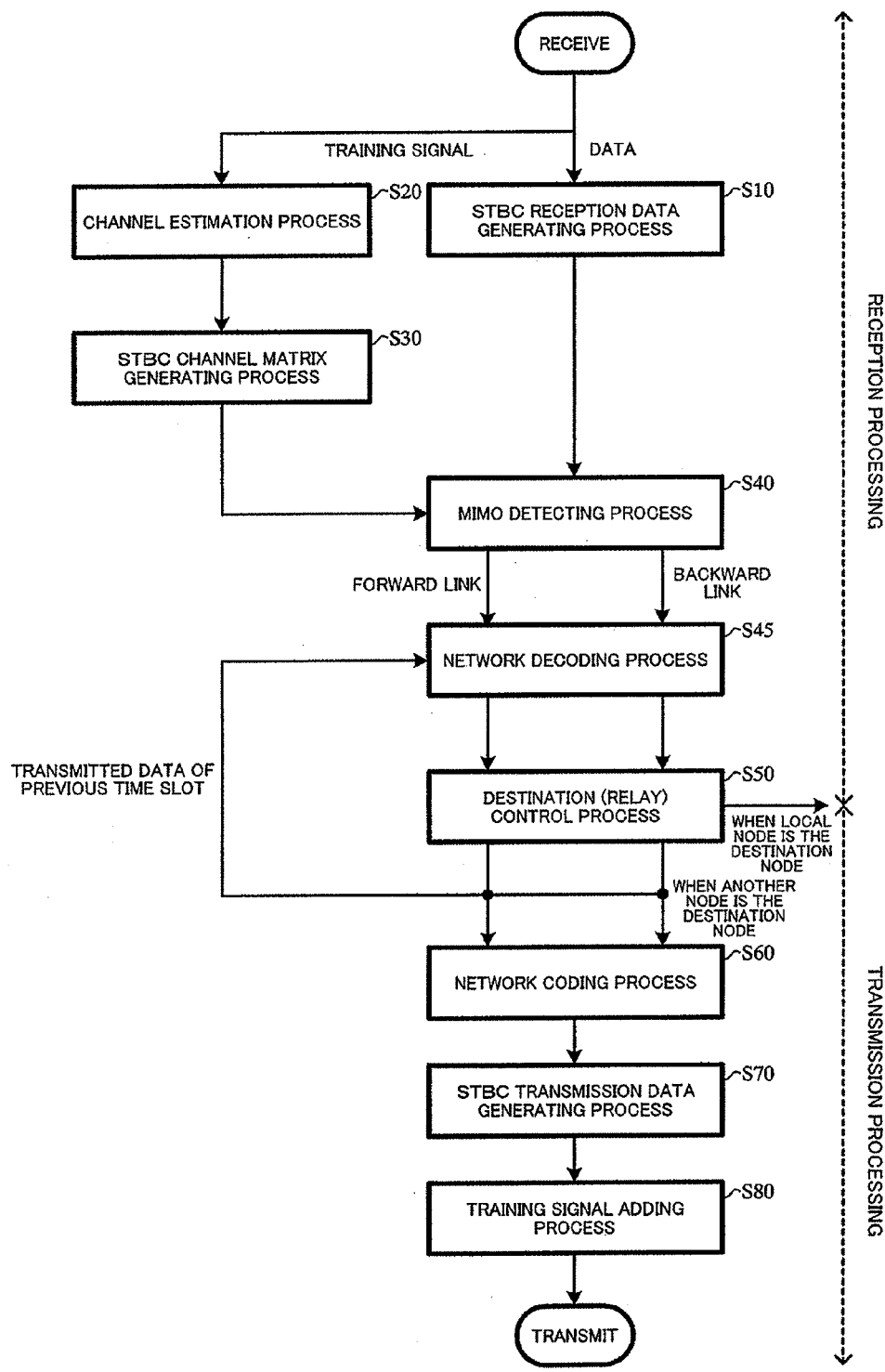
FIG. 5 is a flowchart showing a processing sequence of the node device 1 shown in FIG. 4.

FIG. 4 is a block diagram showing one configuration example of a node device in the multi-hop wireless communication system according to the second embodiment of the present invention (hereinafter also referred to as "a node device 1"). FIG. 5 is a flowchart showing a processing sequence of the node device 1 shown in FIG. 4.

As shown in FIG. 4, the node device 1 comprises multiple MIMO antennas, a RF transceiver 10, a frame processing unit 15, a STBC reception data generating unit 20 that performs a STBC reception data generating process (S10), a channel estimation unit 30 that performs a channel estimation process (S20), a STBC channel matrix generating unit 50 that performs a STBC channel matrix generating process (S30), a MIMO detecting unit 40 that performs a MIMO detecting process (S40), a network decoding unit 60 that performs a network decoding process (S45), a relay control unit 70 that performs a destination (relay) control process (S50), a network coding unit 90 that performs a network coding process (S60), a STBC transmission data generating unit 100 that performs a STBC transmission data generating process (S70), and a training signal adding unit 110 that performs a training signal adding process (S80). Moreover, although not shown in the figure, the node device 1 comprises a storage means (a memory) for storing data signals etc.

As shown in FIG. 4, the node device 1 wirelessly transmits transmitted wireless signals that are output from the training signal adding unit 110 via the RF transceiver 10 by the MIMO antennas, inputs received wireless signals that are wirelessly received via the RF transceiver 10 and the frame processing unit 15 by the MIMO antennas to the STBC reception data generating unit 20, and inputs training signals that are wirelessly received to the channel estimation unit 30.

As shown in FIG. 4, the RF transceiver 10 has a function that when the node device 1 is in the receiving state, the RF transceiver 10 down-converts analog signals that are received by antennas and outputs the down-converted signals to the reception processing unit (the frame processing unit 15) as digital signals, on the other hand, when the node device 1 is in the transmitting state, the RF transceiver 10 up-converts transmitted digital signals (the transmitted wireless signals that are output from the training signal adding unit 110), and outputs (transmits) the up-converted signals as analog signals by antennas. Furthermore, from the reception processing unit (the frame processing unit 15), the received wireless signals and the training signals that are digital signal are output.

As shown in FIG. 5, from the received wireless signals that are wirelessly received, based on the above Expression 19, the node device 1 performs the STBC reception data generating process to generate the STBC reception data (S10). From the training signals that are wirelessly received, based on the above Expression 36, the node device 1 performs the channel estimation process to estimate the channel information (S20). From the channel information that is estimated in S20, based on the above Expression 23, the node device 1 performs the STBC channel matrix generating process to generate a STBC equivalent channel matrix (S30).

From the STBC equivalent channel matrix generated in S30 and the STBC reception data generated in S10, for example, in the case of using the Zero Forcing (ZF) algorithm in MIMO reception, based on the above Expression 24 and Expression 25, or in the case of using the MMSE algorithm in MIMO reception, based on the above Expression 24 and Expression 26, the node device 1 performs the MIMO detecting process to estimate estimation symbols (S40).

From the estimation symbols estimated in S40, based on the above Expression 31, Expression 32, Expression 33 and Expression 34, the node device 1 performs the network decoding process to generate relay signals that are two consecutive symbols to the forward link and the backward link (S45). And then, the node device 1 performs the relay (destination) control process (S50) that determines either the generated relay signals (the network-decoded data) are signals (data) for a local node or the generated relay signals are signals (data) for another node. In the case that the node device 1 determined that the generated relay signals are signals for the local node, that is to say, since the node device 1 itself (the local node) is the destination node, the processing of the node device 1 is finished.

On the other hand, in the case that the node device 1 determined that the relay signals generated in S50 are signals for another node, that is to say, in the case that the local node is a relay node, as shown in the above Expression 27, Expression 28, Expression 29 and Expression 30, in order to perform the network decoding process at next time slot, the node device 1 stores the generated relay signals (the network-decoded data) in the memory as the transmitted data of previous time slot.

Next, in the transmission processing, from the relay signals generated in S50, based on the above Expression 11, Expression 12, Expression 13 and Expression 14, the node device 1 performs the network coding process of two consecutive transmitting symbols to generate two consecutive transmitting signals (S60).

From the transmitting signals (the network-coded transmission data) generated in S60, based on the above Expression 16 and Expression 17, the node device 1 performs the STBC transmission data generating process to generate the STBC transmission data (S70). The node device 1 adds the training signals for the channel estimation process based on the above Expression 36 to the STBC transmission data generated in S70, and performs the training signal adding process (S80). Finally, the node device 1 transmits the STBC transmission data that the training signals are added to in S80 as the transmitted wireless signals.

As described above, the node device 1 performs the transmission/reception processing and the relay transmission of data (signals).

<4> Node Device in the Multi-Hop Wireless Communication System According to the First Embodiment of the Present Invention Here, we explain a node device in the multi-hop wireless communication system according to the first embodiment of the present invention.

Figure 6:
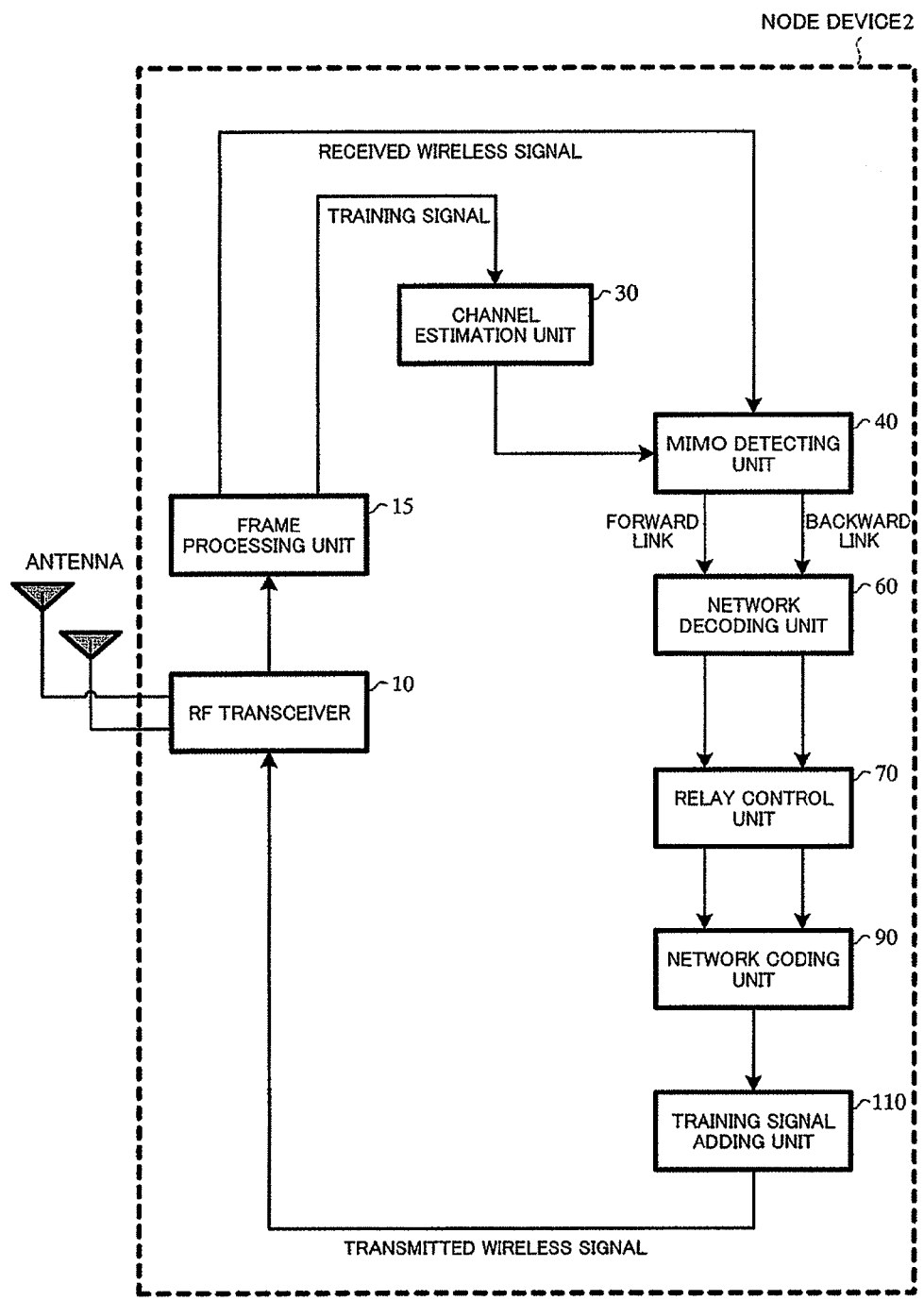
FIG. 6 is a block diagram showing the configuration of a node device in a multi-hop wireless communication system according to the first embodiment of the present invention (i.e., a node device 2)
Figure 7:
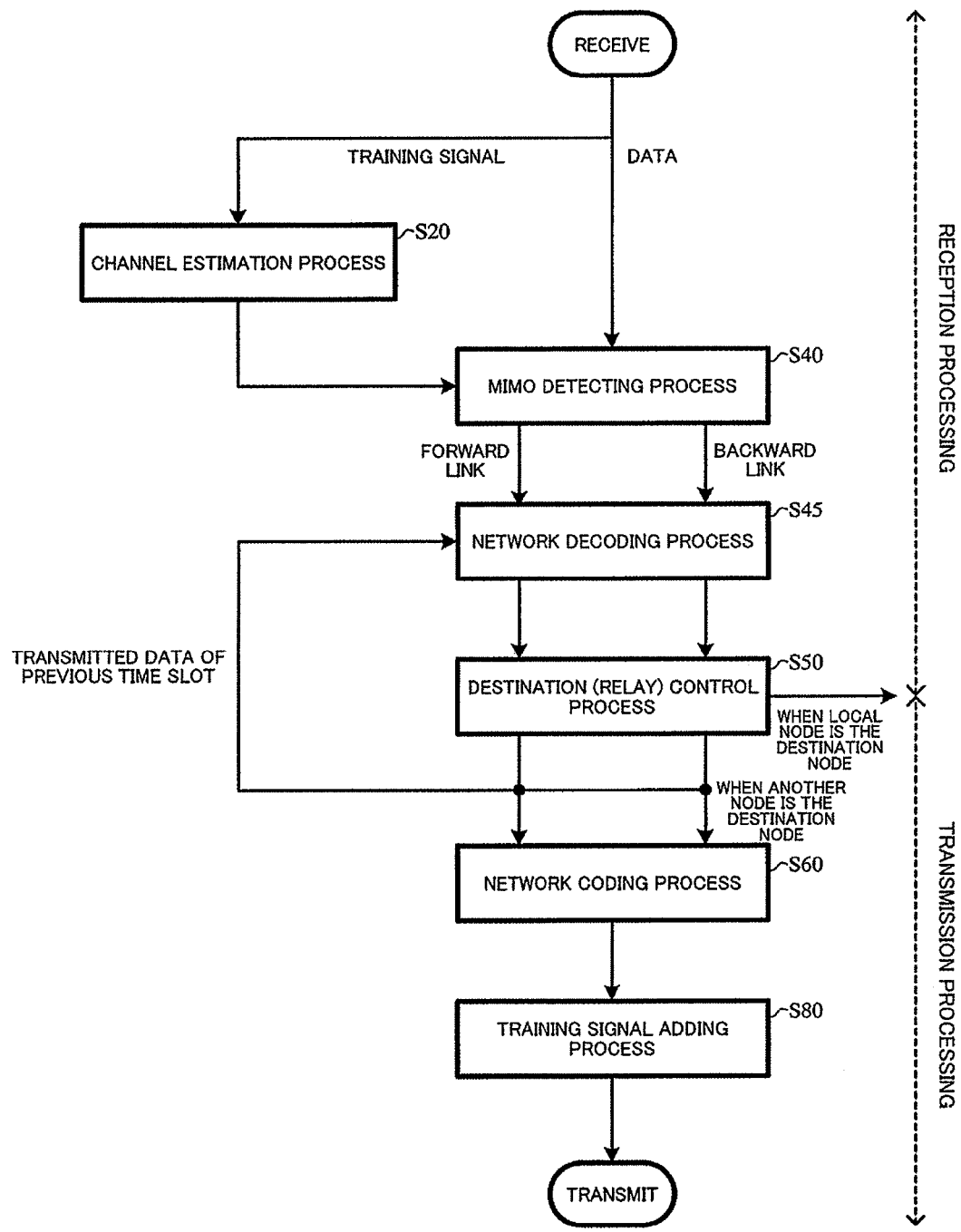
FIG. 7 is a flowchart showing a processing sequence of the node device 2 shown in FIG. 6.

FIG. 6 is a block diagram showing one configuration example of a node device in the multi-hop wireless communication system according to the first embodiment of the present invention (hereinafter also referred to as "a node device 2"). FIG. 7 is a flowchart showing a processing sequence of the node device 2 shown in FIG. 6.

As shown in FIG. 6, the node device 2 comprises multiple MIMO antennas, a RF transceiver 10, a frame processing unit 15, a channel estimation unit 30 that performs a channel estimation process (S20), a MIMO detecting unit 40 that performs a MIMO detecting process (S40), a network decoding unit 60 that performs a network decoding process (S45), a relay control unit 70 that performs a destination (relay) control process (S50), a network coding unit 90 that performs a network coding process (S60), and a training signal adding unit 110 that performs a training signal adding process (S80). Moreover, although not shown in the figure, the node device 2 comprises a storage means (a memory) for storing data signals etc.

As shown in FIG. 6, the node device 2 wirelessly transmits transmitted wireless signals that are output from the training signal adding unit 110 via the RF transceiver 10 by the MIMO antennas, inputs received wireless signals that are wirelessly received via the RF transceiver 10 and the frame processing unit 15 by the MIMO antennas to the MIMO detecting unit 40, and inputs training signals that are wirelessly received to the channel estimation unit 30.

As shown in FIG. 6, the RF transceiver 10 has a function that when the node device 2 is in the receiving state, the RF transceiver 10 down-converts analog signals that are received by antennas and outputs the down-converted signals to the reception processing unit (the frame processing unit 15) as digital signals, on the other hand, when the node device 2 is in the transmitting state, the RF transceiver 10 up-converts transmitted digital signals (the transmitted wireless signals that are output from the training signal adding unit 110), and outputs (transmits) the up-converted signals as analog signals by antennas. Furthermore, from the reception processing unit (the frame processing unit 15), the received wireless signals and the training signals that are digital signal are output.

As shown in FIG. 7, from the training signals that are wirelessly received, based on the above Expression 36, the node device 2 performs the channel estimation process to estimate the channel information (S20). From the channel information estimated in S20 and the received wireless signals that are wirelessly received, for example, in the case of using the Zero Forcing (ZF) algorithm in MIMO reception, based on the above Expression 5 and Expression 6, or in the case of using the MMSE algorithm in MIMO reception, based on the above Expression 5 and Expression 7, the node device 2 performs the MIMO detecting process to estimate estimation symbols (S40).

From the estimation symbols estimated in S40, based on the above Expression 10 and Expression 11, the node device 2 performs the network decoding process to generate relay signals (S45). And then, the node device 2 performs the relay (destination) control process (S50) that determines either the generated relay signals (the network-decoded data) are signals (data) for a local node or the generated relay signals are signals (data) for another node. In the case that the node device 2 determined that the generated relay signals are signals for the local node, that is to say, since the node device 2 itself (the local node) is the destination node, the processing of the node device 2 is finished.

On the other hand, in the case that the node device 2 determined that the relay signals generated in S50 are signals for another node, that is to say, in the case that the local node is a relay node, as shown in the above Expression 8 and Expression 9, in order to perform the network decoding process at next time slot, the node device 2 stores the generated relay signals (the network-decoded data) in the memory as the transmitted data of previous time slot.

Next, in the transmission processing, from the relay signals generated in S50, based on the above Expression 2 and Expression 3, the node device 2 performs the network coding process to generate transmitting signals (S60).

The node device 2 adds the training signals for the channel estimation process based on the above Expression 36 to the transmitting signals (the network-coded transmission data) generated in S60, and performs the training signal adding process (S80). Finally, the node device 2 transmits the network-coded transmission data that the training signals are added to in S80 as the transmitted wireless signals.

As described above, the node device 2 performs the transmission/reception processing and the relay transmission of data (signals).

Although we explained the multi-hop wireless communication systems according to the first embodiment and the second embodiment of the present invention as described above, the present invention is not limited to these embodiments. In the present invention, in the case that the number of transmitting antennas of each node is two, the Alamoti-STBC is used, on the other hand, in the case that the number of transmitting antennas of each node is three or more (in the case that each node is equipped with an array antenna having three or more elements), it is possible to apply any space time block coding (STBC) schemes such as schemes described in Non-Patent Document 8 and Non-Patent Document 9 to the present invention.

Furthermore, in the embodiments of the present invention as described above, with respect to the MIMO detecting process, although the Zero Forcing (ZF) algorithm and the MMSE algorithm are used in MIMO reception as concrete examples, the present invention is not limited to these algorithms, it is also possible to apply any MIMO detecting scheme (any MIMO detecting process) such as a scheme described in Non-Patent Document 10.

Moreover, in the embodiments of the present invention as described above, although the network coding process is performed based on Expression 12, Expression 13, Expression 14 and Expression 15, or based on Expression 2 and Expression 3, the network coding process of the present invention is not limited to the arithmetic processing based on these expressions, of course it is also possible to apply the network coding process based on other arithmetic processes to the present invention.

Moreover, in the embodiments of the present invention as described above, although the network decoding process is performed based on Expression 31, Expression 32, Expression 33 and Expression 34, or based on Expression 10 and Expression 11, the network decoding process of the present invention is not limited to the arithmetic processing based on these expressions, of course it is also possible to apply the network decoding process based on other arithmetic processes to the present invention.

Moreover, it is possible to constitute "MIMO-OFDM network coding" by applying OFDM scheme to two kinds of "One dimensional MIMO network coding" of the present invention as described above, and use the "MIMO-OFDM network coding" in the multi-hop wireless communication system according to the present invention.

Concretely, for example, with respect to FIG. 4 and FIG. 6, it is possible to constitute a node device of the multi-hop wireless communication system according to the present invention that uses the "MIMO-OFDM network coding" by comprising a "OFDM modulation unit" after the training signal adding unit 110, that is, between the training signal adding unit 110 and the RF transceiver 10, and comprising a "OFDM demodulation unit" before the frame processing unit 15 (the reception processing unit), that is, between the RF transceiver 10 and the frame processing unit 15.

In a node device of the multi-hop wireless communication system according to the present invention that uses such a "MIMO-OFDM network coding", the above-described "MIMO scheme", "network coding transmission/reception scheme" and "STBC scheme" are processed with respect to each subcarrier of OFDM.

<5> Performance Evaluation Based on Computer Simulation

Here, in order to verify the effectiveness (the performance) of the present invention, we performed the numerical analysis of transmission capacity with respect to the multi-hop wireless network that is a concrete embodiment of the multi-hop wireless communication system according to the present invention by the theoretical analysis based on computer simulation, and confirmed that the performance of the multi-hop wireless communication system according to the present invention was improved than conventional wireless networks.

<5-1> Simulation Conditions

Conditions for performing the numerical simulation by computer are as follows.

Condition 1:

A one-dimensional multi-hop wireless network is constituted. And then the number of nodes within the constituted one-dimensional multi-hop wireless network is eight nodes.

Figure 8:
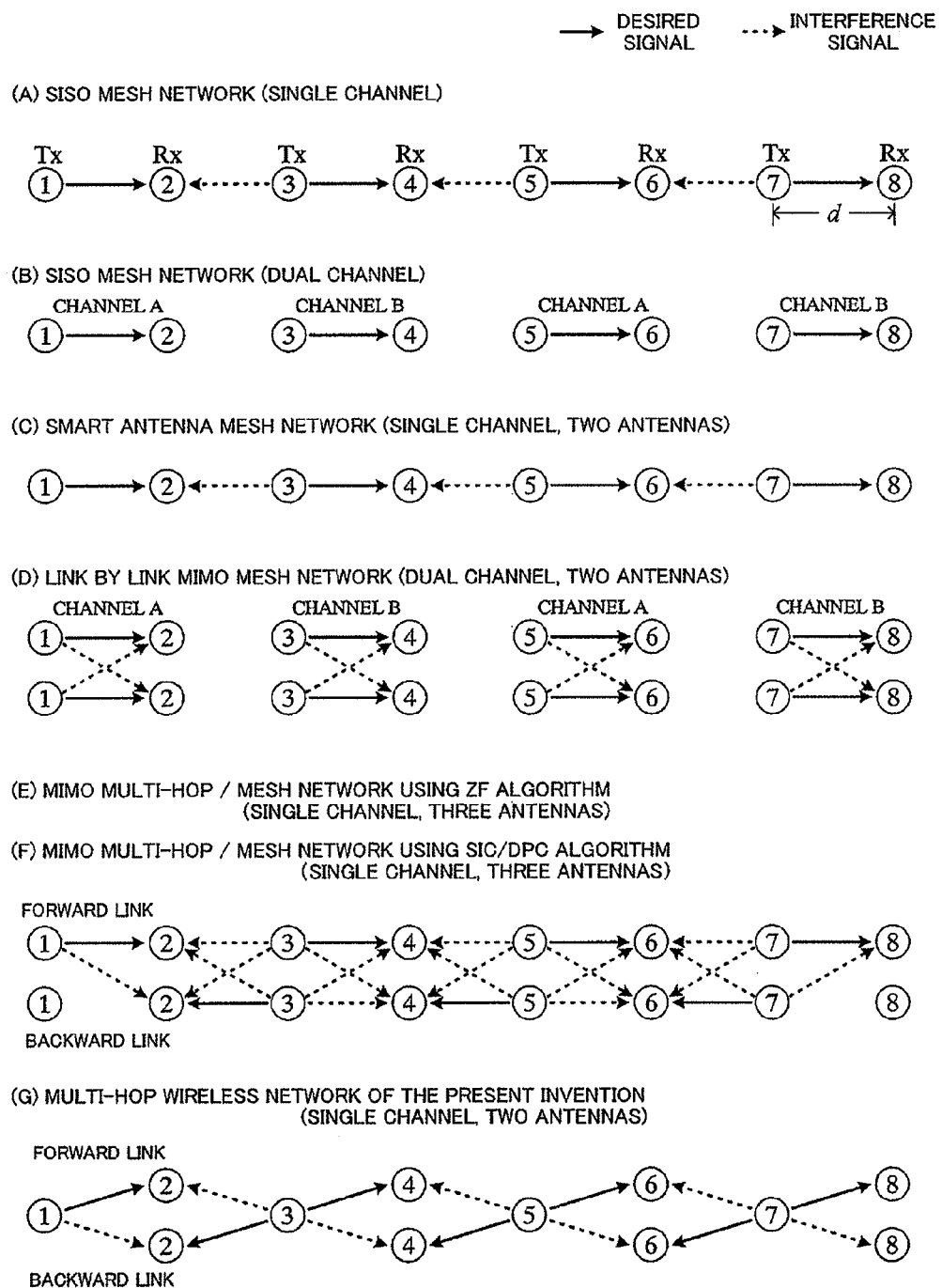
FIG. 8 is a conceptual diagram illustrating the scenarios (A), (B), (C), (D), (E), (F) and (G) for numerical simulation.

Condition 2:

FIG. 8 shows scenarios for the numerical simulation. Seven ways of scenarios, i.e. scenarios (A), (B), (C), (D), (E), (F) and (G) are shown in FIG. 8.

Condition 3:

The number of antennas of each node in MIMO multi-hop/mesh networks is three. Furthermore, in the smart antenna mesh network and the link by link MIMO mesh network, the number of antennas of each node is two.

Condition 4:

All distances between adjacent nodes are equally assumed as "d".

Condition 5:

Channels between arbitrary transmitting antenna and arbitrary receiving antenna of arbitrary adjacent nodes, are assumed to independent identically distributed flat Rayleigh fading channels. Further, those power are assumed to decay with distance, and the path loss constant is 3.5. All the channels are artificial environments that assumed Non Line of Sight (NLOS) environment.

Condition 6:

With respect to scenario (D), i.e. with respect to the link by link MIMO mesh network, in each link, the Singular Value Decomposition (SVD) MIMO transmission is performed. In the Singular Value Decomposition MIMO transmission, the right singular matrix and the left singular matrix of the channel matrix of each link, are used as the transmitting weight and the receiving weight respectively.

Condition 7:

As a value that represents the network channel capacity, the sum channel capacity of the fourth node is evaluated.

Condition 8:

The total transmission power per node is P and the noise power per receiving antenna is $\sigma^2$. Therefore, in the case that it is assumed that the channel gain is 1, $P/\sigma^2$ of each channel is the Signal to Noise Ratio (SNR) per antenna of each link.

<5-2> Results of the Numerical Analysis

Figure 9:
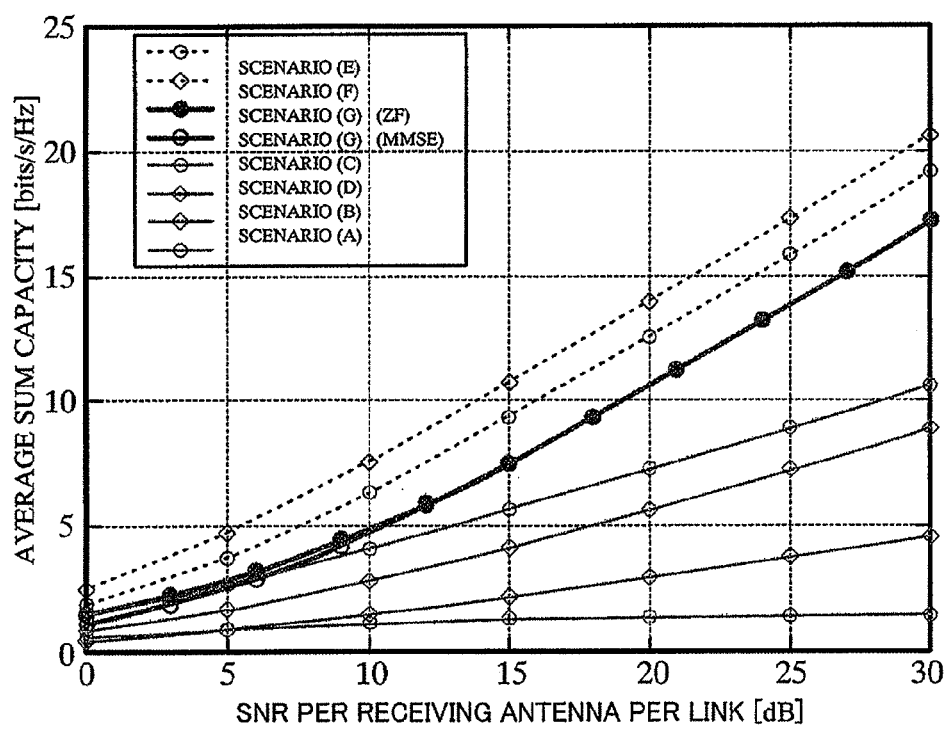
FIG. 9 is a graph showing the relation between the average sum capacity and the SNR of each scenario computed by Monte Carlo simulation.

FIG. 9 shows the relation between the average sum capacity and the SNR of each scenario computed by Monte Carlo simulation. In order to perform a basic analysis of the multi-hop wireless communication system according to the present invention (the multi-hop wireless network), FIG. 9 neglects the interference signals from nodes with the distance greater or equal to 3d.

From FIG. 9, it is clear that since the multiplexing gain in each link can be obtained by transmitting two streams, scenario (D), i.e. the link by link MIMO mesh network has about two times the characteristic of the SISO mesh network with dual channel, and further, since the interference avoidance is possible even by single channel, the smart antenna mesh network has more than twice the characteristic of the SISO mesh network with dual channel.

On the other hand, since the link multiplexing and the interference cancellation are simultaneously realized, and the array gain and the diversity gain are obtained by maximization weights, the MIMO multi-hop/mesh network that is realized by three antennas, can achieve four times the characteristic of the SISO mesh network with dual channel. Even the multi-hop wireless network according to the present invention that obtains only the transmission diversity gain, can achieve about 3.5 times the characteristic of the SISO mesh network with dual channel.

We explained the multi-hop wireless communication system according to the first embodiment of the present invention and the multi-hop wireless communication system according to the second embodiment of the present invention that use "one dimensional MIMO network coding" in detail as described above.

Since the above-described multi-hop wireless communication systems of the present invention (the first embodiment and the second embodiment), realize the bi-directional multi-hop relay by single channel with high efficiency by using one dimensional MIMO network coding, hereinafter, the multi-hop wireless communication system according to the first embodiment of the present invention and the multi-hop wireless communication system according to the second embodiment of the present invention are also referred to as "a bi-directional MIMO mesh network employing one-dimensional MIMO network coding using a single channel (1DMNC)".

In general, in a two-dimensional mesh network having a two-dimensional topology, since multiple data flows exist, it is very important to expand the one-dimensional MIMO network coding (1DMNC) technique to two-dimension. In the case of applying the one-dimensional MIMO network coding technique to a two-dimensional mesh network that includes a topology in which some crossing routes exist (see FIG. 10(b)), since multiple routes where the one-dimensional MIMO network coding is performed, are two-dimensionally deployed and intersect each other, in order to avoid co-channel interference, each route has to be assigned a different channel.

Therefore, as an achievement of their research, inventors of the present invention invented two-dimensional bi-directional MIMO mesh networks using a single channel (multi-hop wireless communication systems from the third embodiment to the eighth embodiment of the present invention that are described below) (for example, see FIG. 10(c) and FIG. 10(d)) by using two-dimensional MIMO network coding that is obtained by expanding the one-dimensional MIMO network coding technique. Each node of the two-dimensional bi-directional MIMO mesh network using a single channel according to the present invention has four antennas.

"Two-dimensional MIMO network coding" defined by the present invention can be divided into two classes. One class is two-dimensional MIMO network coding which applied STBC. Hereinafter this class is also referred to as "two-dimensional STBC-MIMO network coding".

Another class is two-dimensional MIMO network coding which does not apply STBC. Hereinafter this class is also referred to as "two-dimensional MIMO network coding".

In addition, here, in order to explain multi-hop wireless communication systems from the third embodiment to the eighth embodiment of the present invention, we explain the mathematical symbols that are used in the mathematical expressions described below. x represents a scalar variable. x represents a vector variable. X represents a matrix variable. $[\bullet]^T$ represents a transpose of $[\bullet]$. $[\bullet]^H$ represents a Hermitian transpose of $[\bullet]$. $E[\bullet]$ represents a sample average of a random process. $X^{(i)}$ represents the i-th column of X. $x^{(i)}$ represents the i-th component of x. Furthermore, symbol Σ means adding the component of (k+1) and the component of (k−1).

<6> Multi-Hop Wireless Communication System According to the Third Embodiment of the Present Invention (Cross Type Two-Dimensional Multi-Hop Communication System Employing Two-Dimensional MIMO Network Coding (2DMNC1))

The two-dimensional MIMO network coding of the present invention is applied to a wireless mesh network that has a network topology where two routes intersect as shown in FIG. 10 and FIG. 11.

In the present invention, with respect to such a wireless mesh network, two intersectant routes are defined as route V and route H. A node existing in the position where two routes intersect is defined as an intersection node C. There are k∈{1, . . . ,k−1,k,k+1, . . . ,K} nodes including the intersection node in route V and route H respectively.

In the present invention, nodes are denoted by adding symbol (H, V) to distinguish the route to the number of node. For example, the (k−1)-th node on route V is represented by V(k−1). The multi-hop wireless communication system employing two-dimensional MIMO network coding according to the present invention, assumes that each node is equipped with four MIMO antennas (M=4). Furthermore, in the cross type two-dimensional MOMO mesh network (2DMNC1) shown in FIG. 11(A), C=V(k)=H(k) holds.

Within the wireless mesh network that has a topology shown in FIG. 10 and FIG. 11, there are four flows of information, i.e., the forward flow, the backward flow, the upward flow and the downward flow. The forward flow (F) is a flow that flows from node H(1) on route H to node H(K) on route H. The backward flow (B) is a flow that flows from node H(K) on route H to node H(1) on route H. The downward flow (D) is a flow that flows from node V(K) on route V to node V(1) on route V. The upward flow (D) is a flow that flows from node V(1) on route V to node V(K) on route V.

By using two-dimensional MIMO network coding of the present invention, it is possible to realize an information transmission scheme which allows these four flows of information to be transported through the network simultaneously by using only a single channel.

Figure 12:
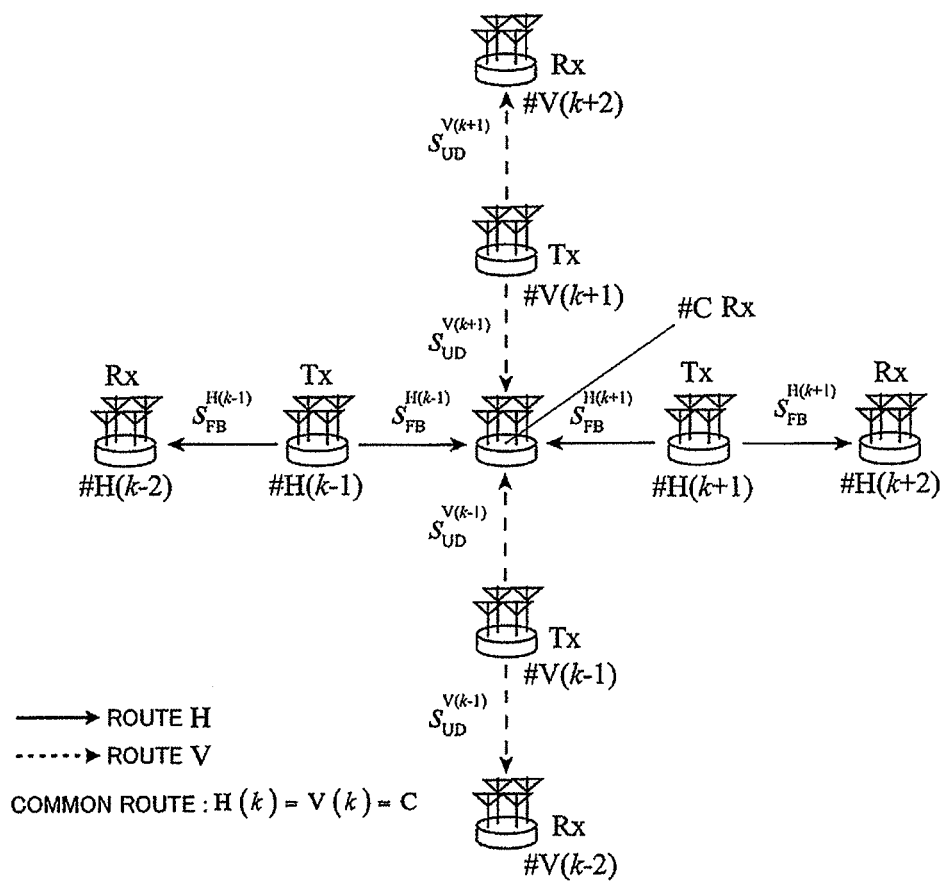
FIG. 12 is a conceptual diagram illustrating information transmission of a multi-hop wireless communication system according to the third embodiment of the present invention (i.e., a cross type two-dimensional multi-hop communication system) at time slot n.
Figure 13:
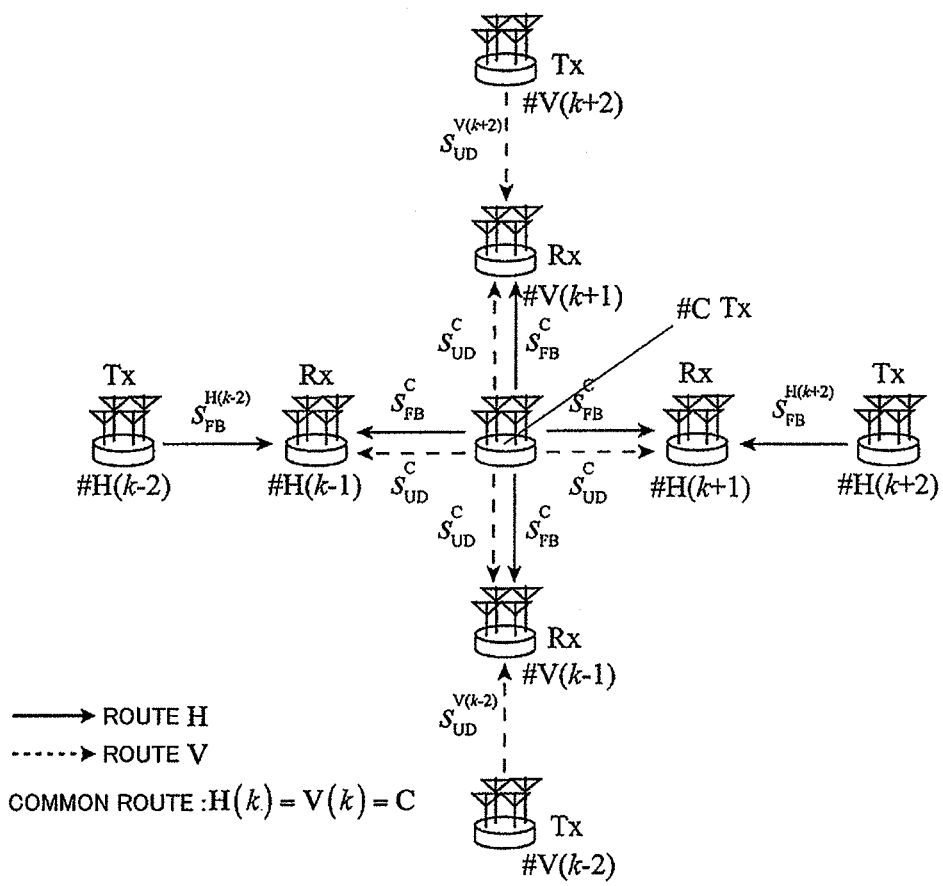
FIG. 13 is a conceptual diagram illustrating information transmission of the multi-hop wireless communication system according to the third embodiment of the present invention (i.e., the cross type two-dimensional multi-hop communication system) at time slot (n+1)

As shown in FIG. 12 and FIG. 13, in the present invention, a node within the network repeats the receiving state (Rx) and the transmitting state (Tx) alternately.

For example, as shown in FIG. 12, at time slot n, nodes H(k±1) on route H and nodes V(k±1) on route V are in the transmitting state, other nodes are in the receiving state. Furthermore, at time slot n+1, the intersection node C, nodes H(k±2) on route H and nodes V(k±2) on route V are in the transmitting state, other nodes are in the receiving state.

In the present invention, nodes other than the intersection node C and its adjacent nodes, perform one-dimensional MIMO network coding that is described in the first embodiment and the second embodiment in detail.

Therefore, we explain the transmitting/receiving algorithm of the intersection node and its adjacent nodes (that is, two-dimensional MIMO network coding) as follows.

In the present invention, the following denotations are used. A flow L at a node W at time slot n is represented by $s_L^W(n)$. For example, the forward flow at a node C at time slot n is represented by $s_F^C(n)$, the backward flow at the node C at time slot n is represented by $s_B^C(n)$, the downward flow at the node C at time slot n is represented by $s_D^C(n)$, and the upward flow at the node C at time slot n is represented by $s_U^C(n)$.

Furthermore, in the case that a transmitting node transmits signals with one antenna (two antennas), a channel response vector (a channel response matrix) between the transmitting node (T) and the receiving node (R) is represented by $h^{RT} \in C^M$ ($H^{RT} \in C^{M \cdot 2}$) Moreover, the noise vector with zero mean and co-variance $\sigma^2 I$ at node R is represented by $n^R \in C^m$.

Furthermore, with respect to a set of nodes $\Omega_L = \{W(1), W(2), \ldots, W(N)\}$ on the information flow L, since information flows from node W(k−1) to node W(k), the following Expression 37 holds.

$$s_L^{W(k)}(n) = s_L^{W(k-1)}(n-1) \quad \text{[Expression 37]}$$

In the present invention, the relation represented by the above Expression 37 is referred to as "the law of flow conservation". Flows and their corresponding sets of nodes are summarized in Table 1.

TABLE 1

| モデル | 2DMNC1 | 2DMNC2 |
|---|---|---|
| $\Omega_F$ | H(k − 2), H(k − 1), C, H(k + 1), H(k + 2), H(k + 3) | H(k − 2), H(k − 1), V(k − 1), H(k + 1), H(k + 2), H(k + 3) |
| $\Omega_B$ | H(k + 2), H(k + 1), C, H(k − 1), H(k − 2), H(k − 3) | H(k + 2), H(k + 1), V(k − 1), H(k − 1), H(k − 2), H(k − 3) |
| $\Omega_D$ | V(k + 2), V(k + 1), C, V(k − 1), V(k − 2), V(k − 3) | V(k + 2), V(k + 1), H(k − 1), V(k − 1), V(k − 2), V(k − 3) |
| $\Omega_U$ | V(k − 2), V(k − 1), C, V(k + 1), V(k + 2), V(k + 3) | V(k − 2), V(k − 1), H(k − 1), V(k + 1), V(k + 2), V(k + 3) |

Hereinafter, a multi-hop wireless communication system according to the third embodiment of the present invention will be concretely described. The multi-hop wireless communication system according to the third embodiment of the present invention is a cross type two-dimensional multi-hop communication system employing two-dimensional MIMO network coding (2DMNC1).

FIG. 12 shows a conceptual diagram illustrating information transmission of a cross type two-dimensional multi-hop communication system (2DMNC1) according to the third embodiment of the present invention at time slot n. FIG. 13 shows a conceptual diagram illustrating information transmission of the cross type two-dimensional multi-hop communication system (2DMNC1) according to the third embodiment of the present invention at time slot (n+1).

Figure 14:
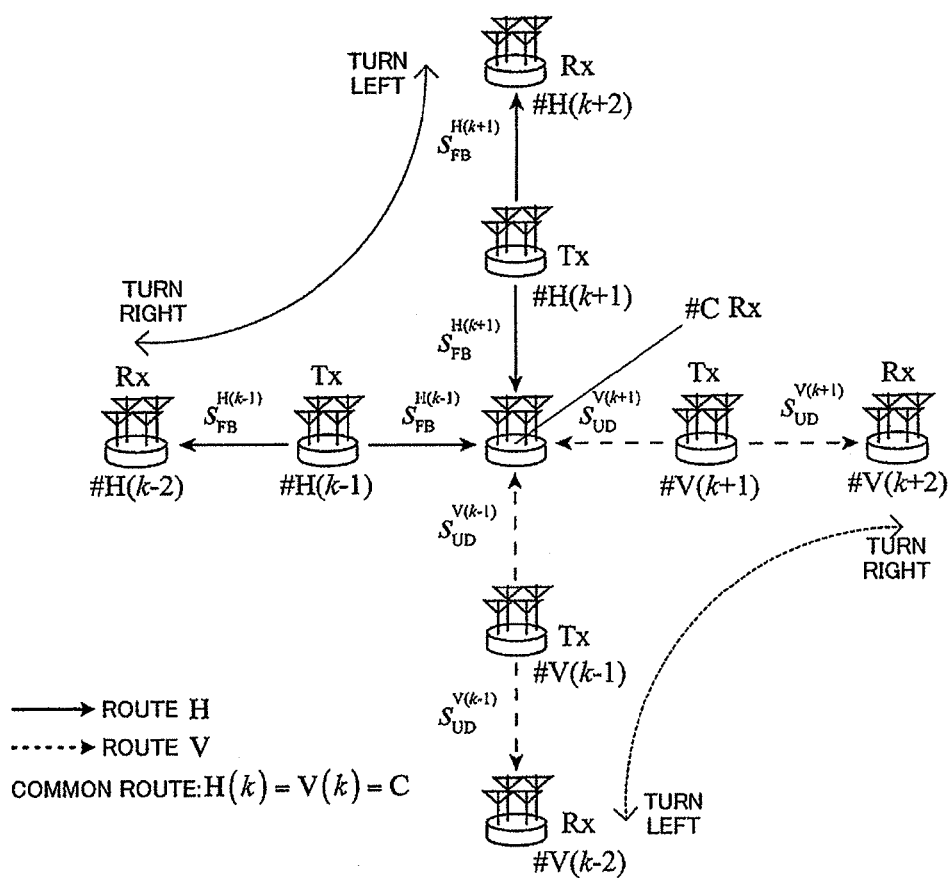
FIG. 14 is a conceptual diagram illustrating information transmission of a multi-hop wireless communication system according to the third embodiment of the present invention (i.e., a cross (turn left and turn right) type two-dimensional multi-hop communication system) at time slot n.
Figure 15:
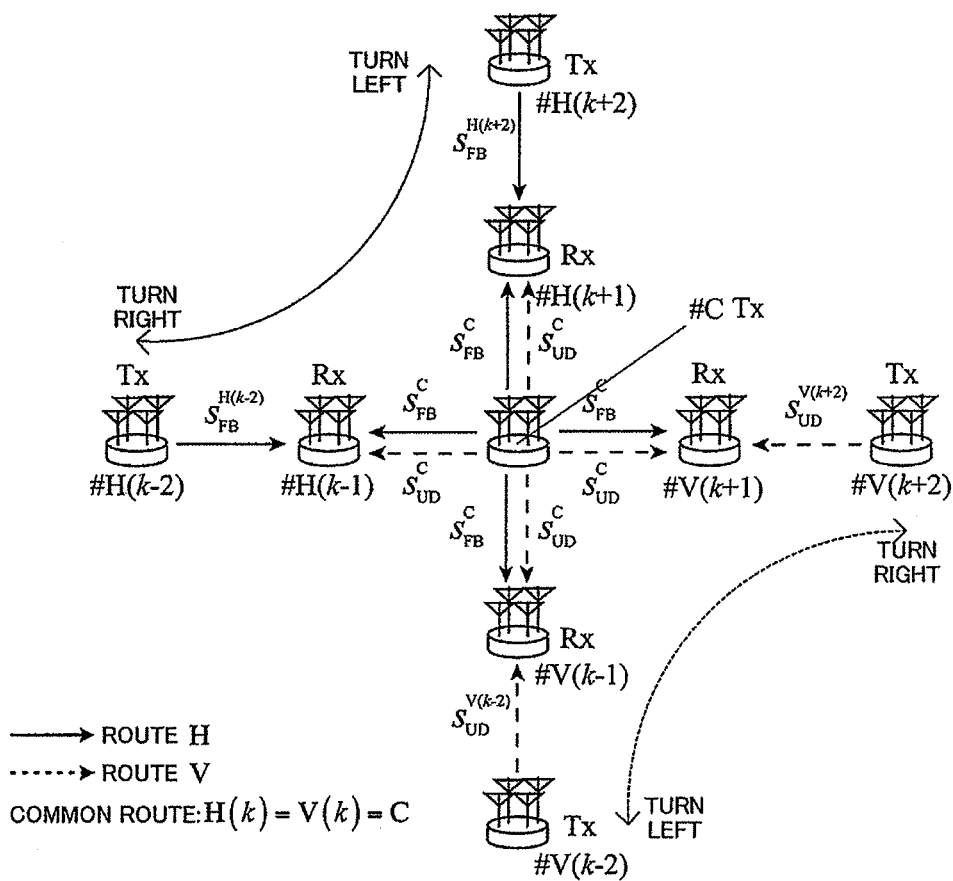
FIG. 15 is a conceptual diagram illustrating information transmission of the multi-hop wireless communication system according to the third embodiment of the present invention (i.e., the cross (turn left and turn right) type two-dimensional multi-hop communication system) at time slot (n+1)

Furthermore, FIG. 14 shows a conceptual diagram illustrating information transmission of a cross (turn left and turn right) type two-dimensional multi-hop communication system according to the third embodiment of the present invention at time slot n. FIG. 15 shows a conceptual diagram illustrating information transmission of the cross (turn left and turn right) type two-dimensional multi-hop communication system according to the third embodiment of the present invention at time slot (n+1).

Figure 16:
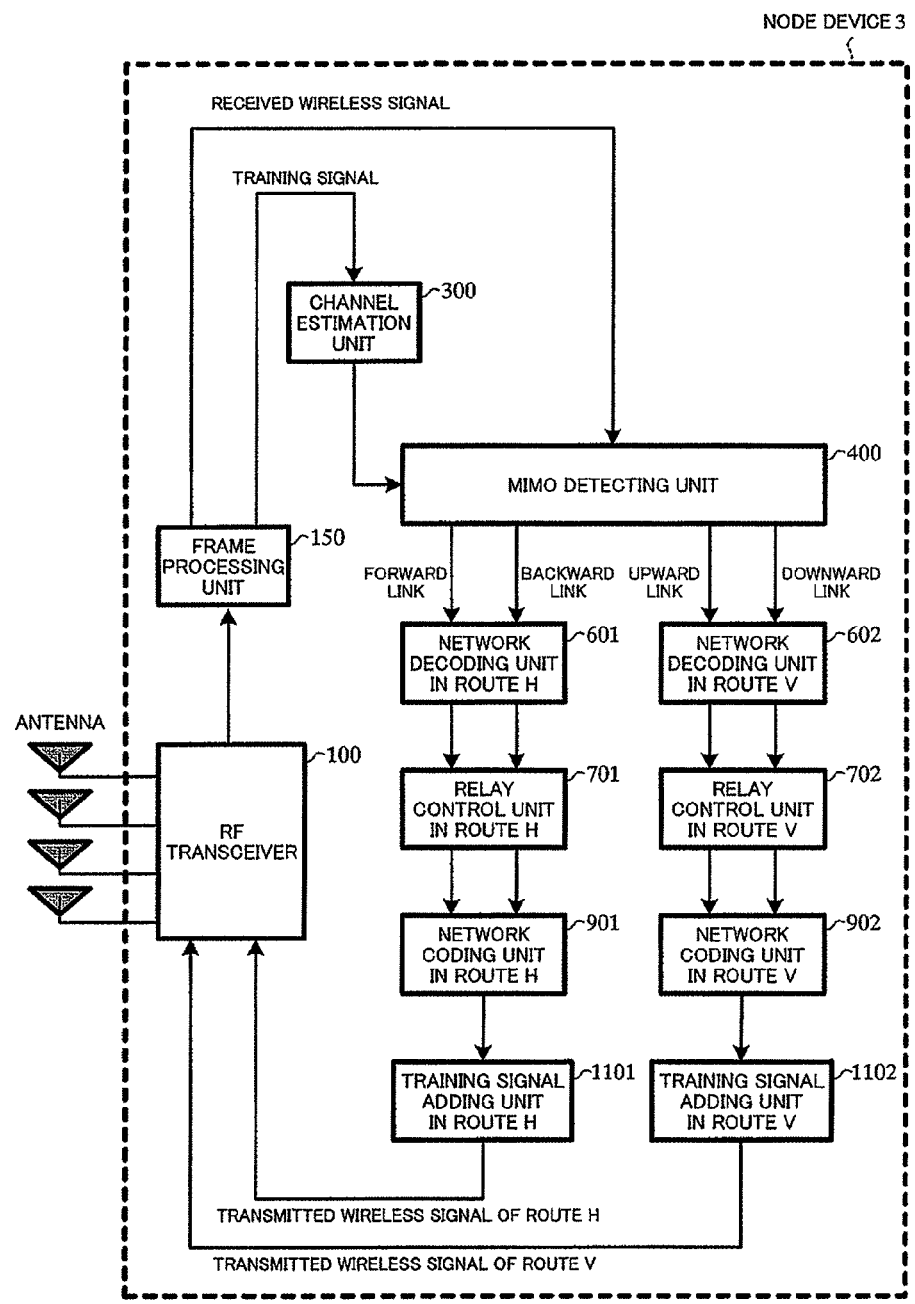
FIG. 16 is a block diagram showing one configuration example of a node device in a two-dimensional multi-hop communication system using two-dimensional MIMO network coding according to the present invention.
Figure 17:
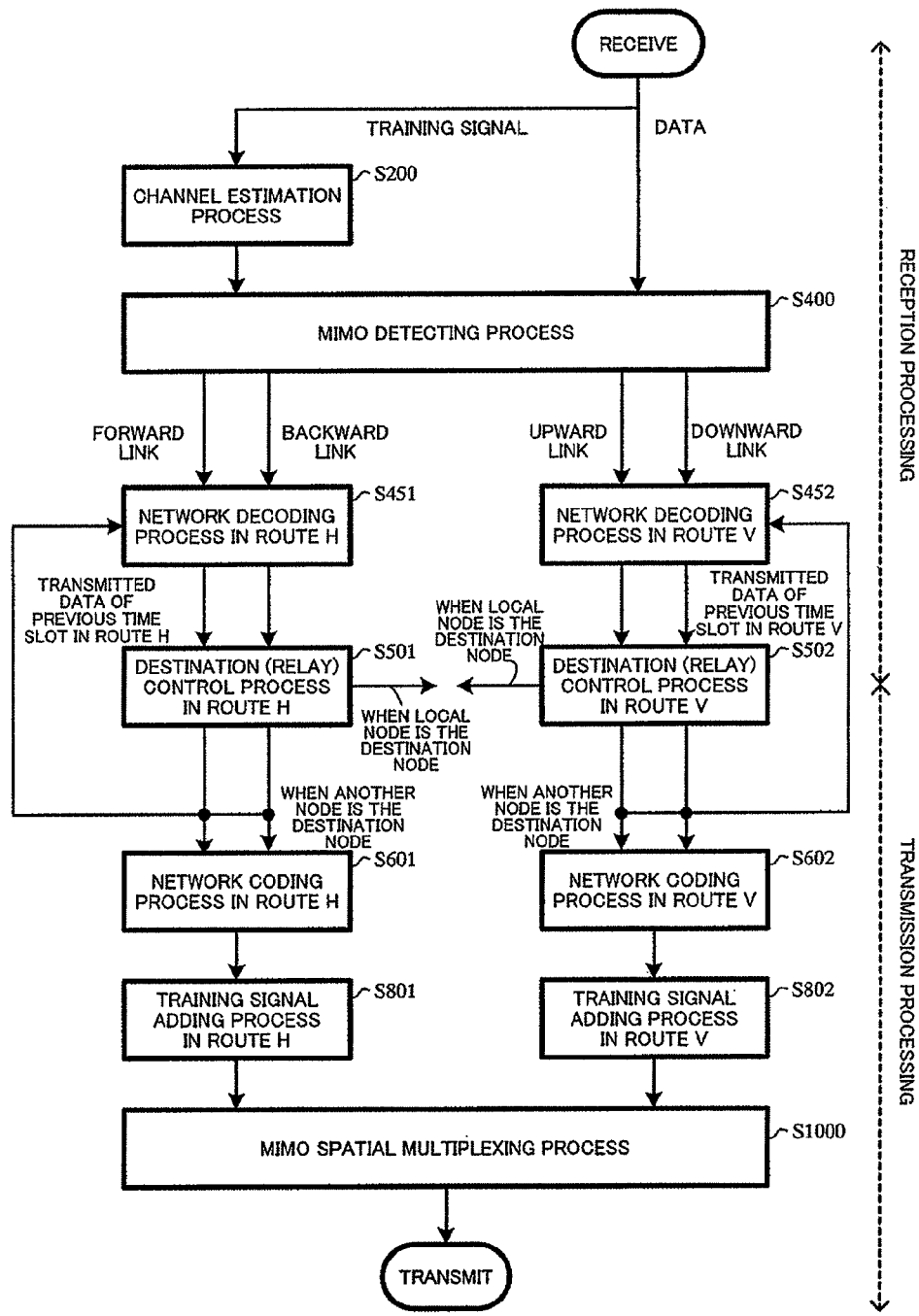
FIG. 17 is a flowchart showing a processing sequence of the node device shown in FIG. 16.

FIG. 16 is a block diagram showing one configuration example of a node device in a two-dimensional multi-hop communication system using two-dimensional MIMO network coding according to the present invention (hereinafter also referred to as "a node device 3"). FIG. 17 is a flowchart showing a processing sequence of the node device 3 shown in FIG. 16.

Hereinafter, with respect to the cross type multi-hop communication system shown in FIG. 12 and FIG. 13, the transmitting/receiving algorithm (two-dimensional MIMO network coding) of a node (a node device) in 2DMNC1 will be concretely described with referent to FIG. 16 and FIG. 17.

In addition, with respect to the cross (turn left and turn right) type multi-hop communication system shown in FIG. 14 and FIG. 15, it is possible to perform two-dimensional MIMO network coding by the same process (the same transmitting/receiving algorithm) as the process performed in the cross (line) type multi-hop communication system shown in FIG. 12 and FIG. 13. Therefore, although that description for the cross (turn left and turn right) type multi-hop communication system shown in FIG. 14 and FIG. 15 is omitted, with respect to the cross type multi-hop communication system of the present invention, since there are three kinds of cross forms, i.e. a cross form to intersect linearly, a cross form to make a left turn and a cross form to make a right turn, it is clear that it is possible to constitute a multi-hop communication system by properly using and changing these three kinds of cross forms depending on the situation.

As shown in FIG. 16, the node device 3 comprises multiple (four) MIMO antennas, a RF transceiver 100, a frame processing unit 150, a channel estimation unit 300 that performs a channel estimation process (S200), a MIMO detecting unit 400 that performs a MIMO detecting process (S400), a network decoding unit in route H 601 that performs a network decoding process in route H (S451), a relay control unit in route H 701 that performs a destination (relay) control process in route H (S501), a network coding unit in route H 901 that performs a network coding process in route H (S601), a training signal adding unit in route H 1101 that performs a training signal adding process in route H (S801), a network decoding unit in route V 602 that performs a network decoding process in route V (S452), a relay control unit in route V 702 that performs a destination (relay) control process in route V (S502), a network coding unit in route V 902 that performs a network coding process in route V (S602), and a training signal adding unit in route V 1102 that performs a training signal adding process in route V (S802). Moreover, although not shown in the figure, the node device 3 comprises a storage means (a memory) for storing data signals etc.

As shown in FIG. 16, the node device 3 wirelessly transmits transmitted wireless signals of route H that are output from the training signal adding unit in route H 1101 and transmitted wireless signals of route V that are output from the training signal adding unit in route V 1102 via the RF transceiver 100 by the MIMO antennas, inputs received wireless signals that are wirelessly received via the RF transceiver 100 and the frame processing unit 150 by the MIMO antennas to the MIMO detecting unit 400, and inputs training signals that are wirelessly received to the channel estimation unit 300.

As shown in FIG. 16, the RF transceiver 100 has a function that when the node device 3 is in the receiving state, the RF transceiver 10 down-converts analog signals that are received by antennas and outputs the down-converted signals to the reception processing unit (the frame processing unit 150) as digital signals, on the other hand, when the node device 3 is in the transmitting state, the RF transceiver 100 up-converts transmitted digital signals (the transmitted wireless signals of route H that are output from the training signal adding unit in route H 1101 and the transmitted wireless signals of route V that are output from the training signal adding unit in route V 1102), and outputs (transmits) the up-converted signals as analog signals by antennas. Furthermore, from the reception processing unit (the frame processing unit 150), the received wireless signals and the training signals that are digital signal are output.

As shown in FIG. 17, from the training signals that are wirelessly received, the node device 3 performs the channel estimation process to estimate the channel information (S200). From the channel information estimated in S200 and the received wireless signals (data) that are wirelessly received, the node device 3 performs the MIMO detecting process to estimate estimation symbols (S400).

From the estimation symbols for the forward link and the backward link that are estimated in S400, the node device 3 performs the network decoding process in route H to generate relay signals of route H (S451). And then, the node device 3 performs the relay (destination) control process in route H (S501) that determines either the generated relay signals of route H (the network-decoded data) are signals for a local node or the generated relay signals of route H are signals for another node. In the case that the node device 3 determined that the generated relay signals of route H are signals for the local node, that is to say, since the node device 3 itself (the local node) is the destination node, the processing of the node device 3 is finished.

On the other hand, in the case that the node device 3 determined that the relay signals of route H generated in S501 are signals for another node, that is to say, in the case that the local node is a relay node, in order to perform the network decoding process in route H at next time slot, the node device 3 stores the generated relay signals (the network-decoded data) in the memory as the transmitted data of previous time slot in route H.

Furthermore, from the estimation symbols for the upward link and the downward link that are estimated in S400, the node device 3 performs the network decoding process in route V to generate relay signals of route V (S452). And then, the node device 3 performs the relay (destination) control process in route V (S502) that determines either the generated relay signals of route V (the network-decoded data) are signals for a local node or the generated relay signals of route V are signals for another node. In the case that the node device 3 determined that the generated relay signals of route V are signals for the local node, that is to say, since the node device 3 itself (the local node) is the destination node, the processing of the node device 3 is finished.

On the other hand, in the case that the node device 3 determined that the relay signals of route V generated in S502 are signals for another node, that is to say, in the case that the local node is a relay node, in order to perform the network decoding process in route V at next time slot, the node device 3 stores the generated relay signals (the network-decoded data) in the memory as the transmitted data of previous time slot in route V.

Next, in the transmission processing, from the relay signals of route H generated in S501, the node device 3 performs the network coding process in route H to generate transmitting signals of route H (S601).

The node device 3 adds the training signals of route H for the channel estimation process to the transmitting signals of route H (the network-coded transmission data in route H) generated in S601, and performs the training signal adding process in route H (S801).

Furthermore, in the transmission processing, from the relay signals of route V generated in S502, the node device 3 performs the network coding process in route V to generate transmitting signals of route v (S602).

The node device 3 adds the training signals of route V for the channel estimation process to the transmitting signals of route V (the network-coded transmission data in route V) generated in S602, and performs the training signal adding process in route V (S802).

Finally, the node device 3 performs a MIMO spatial multiplexing process (S1000) with respect to the network-coded transmission data in route H that the training signals are added to in S801 and the network-coded transmission data in route V that the training signals are added to in S802, and then transmits as the transmitted wireless signals.

As described above, the node device 3 performs the transmission/reception processing and the relay transmission of data (signals).

<6-1> Time Slot n

As shown in FIG. 12, at time slot n, nodes H(k±1) and nodes V(k±1) are transmitting nodes, their transmitting signals $s_{FB}^{H(k\pm1)}$, $s_{UD}^{V(k\pm1)}$ are represented by the following expressions.

That is to say, the network coding process in route H is performed based on the following Expression 38.

$$s_{FB}^{H(k\pm1)} = s_B^{H(k\pm1)}(n) + s_F^{H(k\pm1)}(n) \bmod q \quad \text{[Expression 38]}$$

Furthermore, the network coding process in route V is performed based on the following Expression 39.

$$s_{UD}^{V(k\pm1)} = s_D^{V(k\pm1)}(n) + s_U^{V(k\pm1)}(n) \bmod q \quad \text{[Expression 39]}$$

Where q is the lattice size of the lattice coding for limiting the transmission power.

These transmitting signals are transmitted by using one of four antennas of the transmitting node. Further, a receiving signal $y^C$ in the intersection node C, is represented by the following Expression 40.

That is to say, the receiving signal that has four streams, is represented by the following Expression 40.

$$y^C = \Sigma h^{CH(k\pm1)} s^{H(k\pm1)} + \Sigma h^{CV(k\pm1)} s^{V(k\pm1)} + n^C = H^C s^C + n^C \quad \text{[Expression 40]}$$

$$H^C = [h^{CH(k-1)} h^{CH(k+1)} h^{CV(k-1)} h^{CV(k+1)}] \quad \text{[Expression 41]}$$

$$s^C = [s_{FB}^{H(k-1)} s_{FB}^{H(k+1)} s_{UD}^{V(k-1)} s_{UD}^{V(k+1)}]^T \quad \text{[Expression 42]}$$

Since the node C has four antennas, four signals that are transmitted, can be estimated by the following linear algorithms.

That is to say, a MIMO detecting process for four streams is performed based on the following Expression 43.

$$\hat{s}^C = [\hat{s}_{FB}^{H(k-1)} \hat{s}_{FB}^{H(k+1)} \hat{s}_{UD}^{V(k-1)} \hat{s}_{UD}^{V(k+1)}]^T = (W_r^C)^H y^C \quad \text{[Expression 43]}$$

Where the MMSE receiving weight $W_r^C$ becomes the following Expression 44.

$$W_r^C = \Gamma_{MMSE}(H^C) \quad \text{[Expression 44]}$$

$$\Gamma_{MMSE}(H) = H\left(H^H H + \frac{\sigma^2}{P} I\right)^{-1} \quad \text{[Expression 45]}$$

Furthermore, the ZF receiving weight becomes the following Expression 46.

$$W_r^C = \Gamma_{ZF}(H^C) \quad \text{[Expression 46]}$$

$$\Gamma_{ZF}(H) = H(H^H H)^{-1} \quad \text{[Expression 47]}$$

Where P is the total transmission power per node. Further, $\sigma^2$ is the noise power per receiving antenna.

Based on the network decoding and the law of flow conservation, $s_F^{H(k-1)}(n)$, $s_B^{H(k-1)}(n)$, $S_D^{H(k-1)}$ and $s_U^{H(k-1)}(n)$ can be estimated as shown in the following Expression 48 to Expression 51.

That is to say, the network decoding process in route H is performed based on the following Expression 48 and Expression 49.

$$\hat{s}_F^{H(k-1)}(n) = \hat{s}_{FB}^{H(k-1)} - \hat{s}_B^C(n-1) \bmod q \quad \text{[Expression 48]}$$

$$\hat{s}_B^{H(k+1)}(n) = \hat{s}_{FB}^{H(k+1)} - s_F^C(n-1) \bmod q \quad \text{[Expression 49]}$$

Furthermore, the network decoding process in route V is performed based on the following Expression 50 and Expression 51.

$$\hat{s}_U^{V(k-1)}(n) = \hat{s}_{UD}^{V(k-1)} - s_D^C(n-1) \bmod q \quad \text{[Expression 50]}$$

$$\hat{s}_D^{V(k+1)}(n) = \hat{s}_{UD}^{V(k+1)} - s_C^U(n-1) \bmod q \quad \text{[Expression 51]}$$

By the above-described process (algorithm), node C receives four flows of information (the forward flow of information from node H(k−1), the backward flow of information from node H(k+1), the downward flow of information from node V(k+1) and the upward flow of information from node V(k−1)) transmitted from surrounding nodes.

Finally, node C confirms the destination of receiving signals and in the case that the local node is not the destination node, performs the following relay control.

That is to say, the relay control process in route H is performed based on the following Expression 52 and Expression 53.

$$s_F^C(n+1) \triangleq \hat{s}_F^{H(k-1)}(n) \quad \text{[Expression 52]}$$

$$s_B^C(n+1) \triangleq \hat{s}_B^{H(k+1)}(n) \quad \text{[Expression 53]}$$

Furthermore, the relay control process in route V is performed based on the following Expression 54 and Expression 55.

$$s_U^C(n+1) \triangleq \hat{s}_U^{V(k-1)}(n) \quad \text{[Expression 54]}$$

$$s_D^C(n+1) \triangleq \hat{s}_D^{V(k+1)}(n) \quad \text{[Expression 55]}$$

<6-2> Time Slot (n+1)

As shown in FIG. 13, at time slot (n+1), node C becomes the transmitting node. The transmitting node performs the network coding on signals that are received at time slot n from surrounding nodes. Nodes on route H do not have information about signals on route V and nodes on route V do not have information about signals on route H.

Therefore, at node C, as shown in the following Expression 56 and Expression 57, the network coding is performed on the forward flow and the backward flow, and on the downward flow and the upward flow independently.

That is to say, the network coding process in route H is performed based on the following Expression 56.

$$s_{FB}{}^C = s_F{}^C(n+1) + s_B{}^C(n+1) \bmod q \qquad \text{[Expression 56]}$$

Furthermore, the network coding process in route V is performed based on the following Expression 57.

$$s_{UD}{}^C = s_D{}^C(n+1) + s_U{}^C(n+1) \bmod q \qquad \text{[Expression 57]}$$

Since node C has multiple (four) antennas, it is possible to perform a spatial multiplexing transmission of the network-coded signals on route H and the network-coded signals on route V from two arbitrary antennas.

That is to say, the spatial multiplexing transmission process of two streams is performed based on the following Expression 58.

$$s^C = \begin{bmatrix} s_{FB}^C \\ s_{UD}^C \end{bmatrix} \qquad \text{[Expression 58]}$$

Moreover, at the same time slot, nodes H(k±2) and nodes V(k±2) are transmitting nodes, their network-coded transmitting signals are given by the following Expression 59 and Expression 60.

That is to say, the network coding process in route H is performed based on the following Expression 59.

$$s_{FB}{}^{H(k\pm2)} = s_F{}^{H(k\pm2)}(n+1) + s_B{}^{H(k\pm2)}(n+1) \bmod q \qquad \text{[Expression 59]}$$

Furthermore, the network coding process in route V is performed based on the following Expression 60.

$$s_{UD}{}^{V(k\pm2)} = s_D{}^{V(k\pm2)}(n+1) + s_U{}^{V(k\pm2)}(n+1) \bmod q \qquad \text{[Expression 60]}$$

Receiving signals of nodes H(k±1) (similarly for nodes V(k±1)) are given by the following Expression 61.

That is to say, the receiving signal having three streams is represented by the following Expression 61.

$$y^{H(k\pm1)} = H^{H(k\pm1)} s^{H(k\pm1)} + n^{H(k\pm1)} \qquad \text{[Expression 61]}$$

$$H^{H(k\pm1)} = [H^{H(k\pm1)C} h^{H(k\pm1)H(k\pm2)}] \qquad \text{[Expression 62]}$$

$$s^{H(k\pm1)} = [s_{FB}{}^C s_{UD}{}^C s^{H(k\pm2)}]^T \qquad \text{[Expression 63]}$$

In Expression 61, it is possible to detect the transmitting signal by using the linear receiving weight.

That is to say, the MIMO detecting process is performed based on the following Expression 64.

$$\hat{s}_e{}^{H(k\pm1)} = [\hat{s}_{FB}{}^C \hat{s}_{UD}{}^C \hat{s}^{H(k\pm2)}]^T = (W_r{}^{H(k\pm1)})^H y^{H(k\pm1)} \qquad \text{[Expression 64]}$$

where in the case of using MMSE, $W_r{}^{H(k\pm1)} = \Gamma_{MMSE}(H^{H(k\pm1)})$ holds. And in the case of using ZF, $W_r{}^{H(k\pm1)} = \Gamma_{ZF}(H^{H(k\pm1)})$ holds.

From $\hat{s}_{FB}{}^C$ and $\hat{s}^{H(k\pm2)}$, nodes H(k±1) can decode the desired information of the forward flow and the backward flow.

That is to say, the network decoding process in route H is performed based on the following Expression 65 to Expression 68.

$$\hat{s}_F{}^C(n+1) = \hat{s}_{FB}{}^C - s_B{}^{H(k+1)}(n) \bmod q \qquad \text{[Expression 65]}$$

$$\hat{s}_B{}^{H(k+2)}(n+1) = \hat{s}_{FB}{}^{H(k+2)} - s_F{}^{H(k+1)}(n) \bmod q \qquad \text{[Expression 66]}$$

$$\hat{s}_B{}^C(n+1) = \hat{s}_{FB}{}^C - s_F{}^{H(k-1)}(n) \bmod q \qquad \text{[Expression 67]}$$

$$\hat{s}_F{}^{H(k-2)}(n+1) = \hat{s}_{FB}{}^{H(k-2)} - s_B{}^{H(k-1)}(n) \bmod q \qquad \text{[Expression 68]}$$

Here, since $\hat{s}_{UD}{}^C$ is not a flow on route H, in nodes H(k±1), the decoding process is not performed.

Finally, nodes H(k±1) confirm the destination of receiving signals and in the case that the local node is not the destination node, perform the following relay control.

That is to say, the relay control process in route H is performed based on the following Expression 69 to Expression 72.

$$s_F{}^{H(k+1)}(n+2) \triangleq \hat{s}_F{}^C(n+1) \qquad \text{[Expression 69]}$$

$$s_B{}^{H(k+1)}(n+2) \triangleq \hat{s}_B{}^{H(k+2)}(n+1) \qquad \text{[Expression 70]}$$

$$s_B{}^{H(k-1)}(n+2) \triangleq \hat{s}_B{}^C(n+1) \qquad \text{[Expression 71]}$$

$$s_F{}^{H(k-1)}(n+2) \triangleq \hat{s}_F{}^{H(k-2)}(n+1) \qquad \text{[Expression 72]}$$

Similarly, from $\hat{s}_{UD}{}^C$ and $\hat{s}_{UD}{}^{V(k\pm2)}$, nodes V(k±1) can decode and relay control the desired information of the downward flow and the upward flow.

By repeating the above-described processing with the cycle of an even time slot and an odd time slot, the present invention realizes the multi-hop relay of the two-dimension bi-directional flow with a single channel.

<7> Multi-Hop Wireless Communication System According to the Fourth Embodiment of the Present Invention (Cross Type Two-Dimensional Multi-Hop Communication System Employing Two-Dimensional STBC-MIMO Network Coding (2DSTBCMNC1))

Hereinafter, a multi-hop wireless communication system according to the fourth embodiment of the present invention will be concretely described. The multi-hop wireless communication system according to the fourth embodiment of the present invention is a cross type two-dimensional multi-hop communication system employing two-dimensional STBC-MIMO network coding (2DSTBCMNC1).

That is to say, the cross type two-dimensional multi-hop communication system (2DSTBCMNC1) according to the fourth embodiment of the present invention, can realize a more reliable multi-hop relay by combining the cross type two-dimensional multi-hop communication system (2DMNC1) according to the third embodiment of the present invention and the STBC process (the STBC function).

However, in 2DSTBCMNC1, nodes other than the intersection node and its adjacent nodes, perform one-dimensional STBC-MIMO network coding that is described in the second embodiment in detail.

Figure 18:
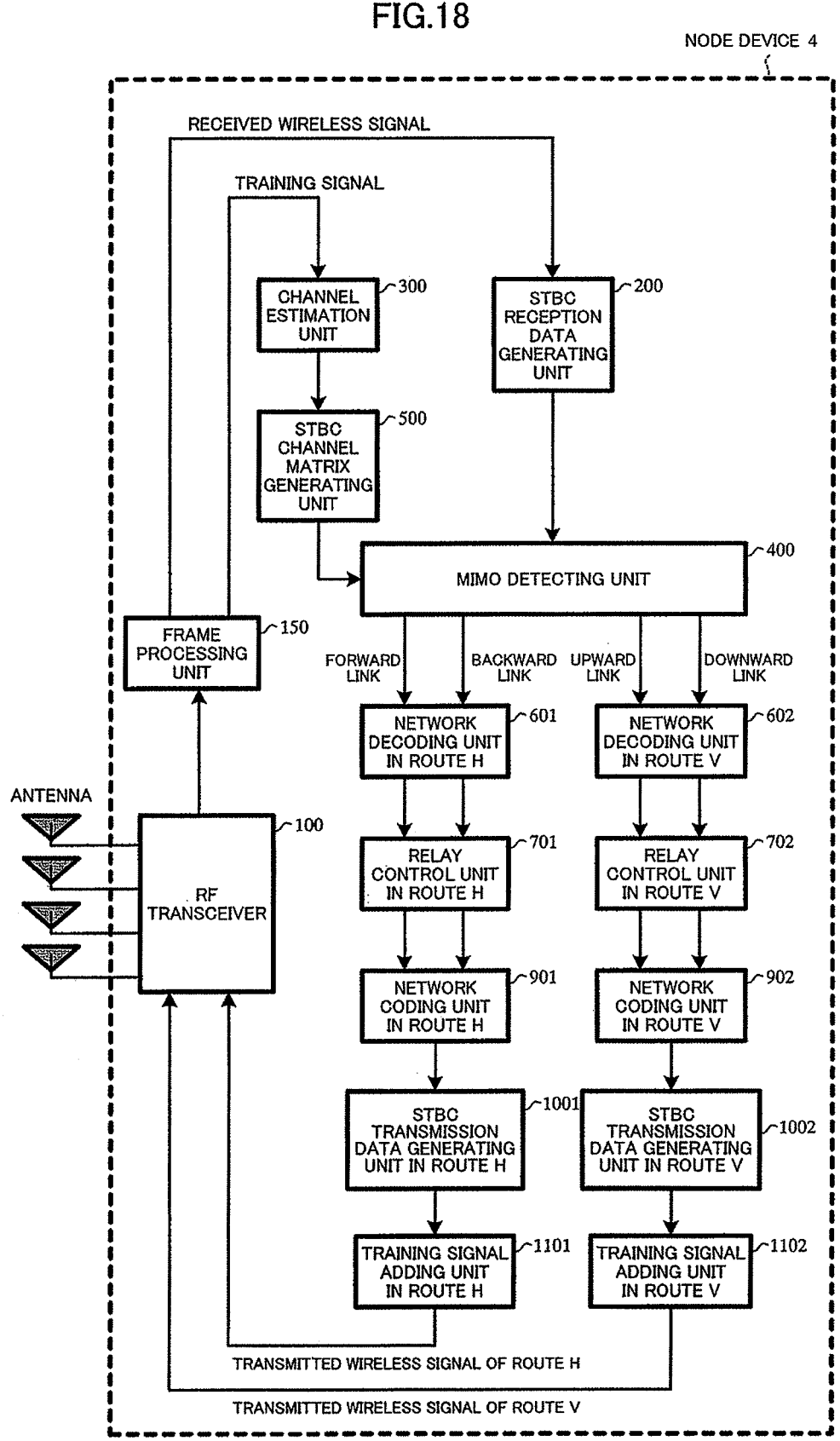
FIG. 18 is a block diagram showing another configuration example of a node device in a two-dimensional multi-hop communication system using two-dimensional MIMO network coding according to the present invention.
Figure 19:
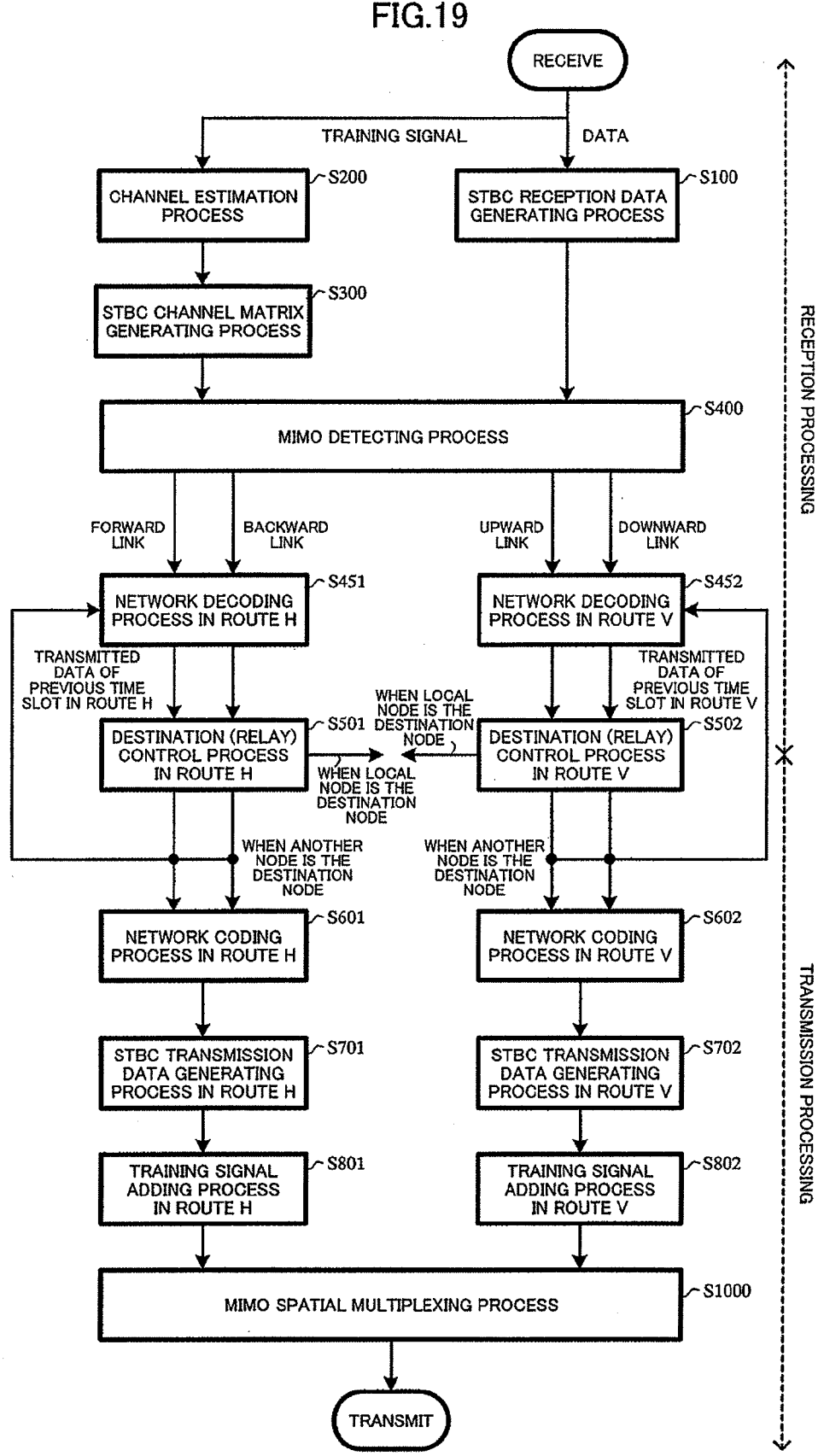
FIG. 19 is a flowchart showing a processing sequence of the node device shown in FIG. 18.

FIG. 18 is a block diagram showing one configuration example of a node device in a two-dimensional multi-hop communication system using two-dimensional MIMO network coding according to the present invention (hereinafter also referred to as "a node device 4"). FIG. 19 is a flowchart showing a processing sequence of the node device 4 shown in FIG. 18.

It is clear by comparison with the node device 3 shown in FIG. 16 that the node device 4 is constituted by adding the STBC function to the node device 3. Except for the STBC function, basically, the configuration and processing of the node device 4 are the same as the node device 3.

Hereinafter, with respect to the cross type multi-hop communication system shown in FIG. 12 and FIG. 13, the transmitting/receiving algorithm (two-dimensional STBC-MIMO network coding) of a node (a node device) in 2DSTBCMNC1 will be concretely described with referent to FIG. 18 and FIG. 19.

As shown in FIG. 18, the node device 4 comprises multiple (four) MIMO antennas, a RF transceiver 100, a frame processing unit 150, a STBC reception data generating unit 200 that performs a STBC reception data generating process (S100), a channel estimation unit 300 that performs a channel estimation process (S200), a STBC channel matrix generating unit 500 that performs a STBC channel matrix generating process (S300), a MIMO detecting unit 400 that performs a MIMO detecting process (S400), a network decoding unit in route H 601 that performs a network decoding process in route H (S451), a relay control unit in route H 701 that performs a destination (relay) control process in route H (S501), a network coding unit in route H 901 that performs a network coding process in route H (S601), a STBC transmission data generating unit in route H 1001 that performs a STBC transmission data generating process in route H (S701), a training signal adding unit in route H 1101 that performs a training signal adding process in route H (S801), a network decoding unit in route V 602 that performs a network decoding process in route V (S452), a relay control unit in route V 702 that performs a destination (relay) control process in route V (S502), a network coding unit in route V 902 that performs a network coding process in route V (S602), a STBC transmission data generating unit in route V 1002 that performs a STBC transmission data generating process in route V (S702) and a training signal adding unit in route V 1102 that performs a training signal adding process in route V (S802). Moreover, although not shown in the figure, the node device 4 comprises a storage means (a memory) for storing data signals etc.

As shown in FIG. 18, the node device 4 wirelessly transmits transmitted wireless signals of route H that are output from the training signal adding unit in route H 1101 and transmitted wireless signals of route V that are output from the training signal adding unit in route V 1102 via the RF transceiver 100 by the MIMO antennas, inputs received wireless signals that are wirelessly received via the RF transceiver 100 and the frame processing unit 150 by the MIMO antennas to the STBC reception data generating unit 200, and inputs training signals that are wirelessly received to the channel estimation unit 300.

As shown in FIG. 18, the RF transceiver 100 has a function that when the node device 4 is in the receiving state, the RF transceiver 10 down-converts analog signals that are received by antennas and outputs the down-converted signals to the reception processing unit (the frame processing unit 150) as digital signals, on the other hand, when the node device 4 is in the transmitting state, the RF transceiver 100 up-converts transmitted digital signals (the transmitted wireless signals of route H that are output from the training signal adding unit in route H 1101 and the transmitted wireless signals of route V that are output from the training signal adding unit in route V 1102), and outputs (transmits) the up-converted signals as analog signals by antennas. Furthermore, from the reception processing unit (the frame processing unit 150), the received wireless signals and the training signals that are digital signal are output.

As shown in FIG. 19, from the received wireless signals (data) that are wirelessly received, the node device 4 performs the STBC reception data generating process to generate the STBC reception data (S100). From the training signals that are wirelessly received, the node device 4 performs the channel estimation process to estimate the channel information (S200). From the channel information that is estimated in S200, the node device 4 performs the STBC channel matrix generating process to generate a STBC equivalent channel matrix (S300).

From the STBC equivalent channel matrix generated in S300 and the STBC reception data generated in S100, the node device 4 performs the MIMO detecting process to estimate estimation symbols (S400).

From the estimation symbols for the forward link and the backward link that are estimated in S400, the node device 4 performs the network decoding process in route H to generate relay signals of route H that are two consecutive symbols to the forward link and the backward link (S451). And then, the node device 4 performs the relay (destination) control process in route H (S501) that determines either the generated relay signals of route H (the network-decoded data) are signals for a local node or the generated relay signals of route H are signals for another node. In the case that the node device 4 determined that the generated relay signals of route H are signals for the local node, that is to say, since the node device 4 itself (the local node) is the destination node, the processing of the node device 4 is finished.

On the other hand, in the case that the node device 4 determined that the relay signals of route H generated in S501 are signals for another node, that is to say, in the case that the local node is a relay node, in order to perform the network decoding process in route H at next time slot, the node device 4 stores the generated relay signals of route H (the network-decoded data) in the memory as the transmitted data of previous time slot in route H.

Furthermore, from the estimation symbols for the upward link and the downward link that are estimated in S400, the node device 4 performs the network decoding process in route V to generate relay signals of route V that are two consecutive symbols to the upward link and the downward link (S452). And then, the node device 4 performs the relay (destination) control process in route V (S502) that determines either the generated relay signals of route V (the network-decoded data) are signals for a local node or the generated relay signals of route V are signals for another node. In the case that the node device 4 determined that the generated relay signals of route V are signals for the local node, that is to say, since the node device 4 itself (the local node) is the destination node, the processing of the node device 4 is finished.

On the other hand, in the case that the node device 4 determined that the relay signals of route V generated in S502 are signals for another node, that is to say, in the case that the local node is a relay node, in order to perform the network decoding process in route V at next time slot, the node device 4 stores the generated relay signals of route V (the network-decoded data) in the memory as the transmitted data of previous time slot in route V.

Next, in the transmission processing, from the relay signals of route H generated in S501, the node device 3 performs the network coding process in route H of two consecutive transmitting symbols to generate two consecutive transmitting signals of route H (S601).

From the transmitting signals of route H (the network-coded transmission data in route H) generated in S601, the node device 4 performs the STBC transmission data generating process in route H to generate the STBC transmission data in route H (S701). The node device 4 adds the training signals for the channel estimation process to the STBC transmission data in route H that is generated in S701, and performs the training signal adding process in route H (S801).

Furthermore, in the transmission processing, from the relay signals of route V generated in S502, the node device 4 performs the network coding process in route V of two consecutive transmitting symbols to generate two consecutive transmitting signals of route V (S602).

From the transmitting signals of route V (the network-coded transmission data in route V) generated in S602, the node device 4 performs the STBC transmission data generating process in route V to generate the STBC transmission data in route V (S702). The node device 4 adds the training signals for the channel estimation process to the STBC transmission data in route V that is generated in S702, and performs the training signal adding process in route V (S802).

Finally, the node device 4 performs a MIMO spatial multiplexing process (S1000) with respect to the STBC transmission data in route H that the training signals are added to in S801 and the STBC transmission data in route V that the training signals are added to in S802, and then transmits as the transmitted wireless signals.

As described above, the node device 4 performs the transmission/reception processing and the relay transmission of data (signals).

<7-1> Time Slot n

As shown in FIG. 12, at time slot n, nodes H(k±1) and nodes V(k±1) become transmitting nodes and node C becomes a receiving node. Two consecutive transmitting symbols of nodes H(k±1) and nodes V(k±1) are represented by the following Expression 73 to Expression 76.

That is to say, the network coding process in route H is performed based on the following Expression 73 and Expression 74.

$$s_{FB1}^{H(k\pm1)} = s_{F1}^{H(k\pm1)}(n) + s_{B1}^{H(k\pm1)}(n) \bmod q \quad \text{[Expression 73]}$$

$$s_{FB2}^{H(k\pm1)} = s_{F2}^{H(k\pm1)}(n) + s_{B2}^{H(k\pm1)}(n) \bmod q \quad \text{[Expression 74]}$$

Furthermore, the network coding process in route V is performed based on the following Expression 75 and Expression 76.

$$s_{UD1}^{V(k\pm1)} = s_{D1}^{V(k\pm1)}(n) + s_{U1}^{V(k\pm1)}(n) \bmod q \quad \text{[Expression 75]}$$

$$s_{UD2}^{V(k\pm1)} = s_{D2}^{V(k\pm1)}(n) + s_{U2}^{V(k\pm1)}(n) \bmod q \quad \text{[Expression 76]}$$

Where $s_{F1}^{H(k\pm1)}, s_{B1}^{H(k\pm1)}$ are the first symbol of the forward flow (the forward link) and the backward flow (the backward link) respectively. $s_{U1}^{H(k\pm1)}, s_{D1}^{H(k\pm1)}$ are the first symbol of the upward flow (the upward link) and the downward flow (the downward link) respectively. Furthermore, $s_{F2}^{H(k\pm1)}, s_{B2}^{H(k\pm1)}$ are the second symbol of the forward flow and the backward flow respectively. $s_{U2}^{H(k\pm1)}, s_{D2}^{H(k\pm1)}$ are the second symbol of the upward flow and the downward flow respectively.

In nodes H(k±1) and nodes V(k±1), transmitting signals that the STBC process is performed, become the following Expression 77 and Expression 78.

That is to say, the STBC transmission data generating process in route H is performed based on the following Expression 77.

$$X^{H(k\pm1)} = \begin{bmatrix} s_{FB1}^{H(k\pm1)} & (s_{FB2}^{H(k\pm1)})^* \\ s_{FB2}^{H(k\pm1)} & -(s_{FB1}^{H(k\pm1)})^* \end{bmatrix} \quad \text{[Expression 77]}$$

Furthermore, the STBC transmission data generating process in route V is performed based on the following Expression 78.

$$X^{V(k\pm1)} = \begin{bmatrix} s_{UD1}^{V(k\pm1)} & (s_{UD2}^{V(k\pm1)})^* \\ s_{UD2}^{V(k\pm1)} & -(s_{UD1}^{V(k\pm1)})^* \end{bmatrix} \quad \text{[Expression 78]}$$

And then, a receiving signal matrix $Y^C$ for two symbols of the receiving node C is represented by the following Expression 79.

That is to say, receiving signals having four streams that the STBC process is performed, is represented by the following Expression 79.

$$Y^C = \Sigma H^{HkH(k\pm1)} X^{H(k\pm1)} + \Sigma H^{HkV(k\pm1)} X^{V(k\pm1)} + N^C \quad \text{[Expression 79]}$$

Next, based on the following Expression 80, the receiving signal matrix is vectorized.

That is to say, the STBC reception data generating process is performed based on the following Expression 80.

$$y_e^C = \begin{bmatrix} (y_1^C)^T & (y_2^C)^T & (y_3^C)^T & (y_4^C)^T \end{bmatrix}^T \quad \text{[Expression 80]}$$

Where $y_i^C = [Y_{i1}^C (Y_{i2}^C)^*]^T$ holds.

By using the STBC equivalent channel matrix $H_e^C$, the receiving signal vector represented by the above Expression 80, can be represented by the following Expression 81.

$$y_e^C = H_e^C s_e^C + n_e^C$$

Where the following Expression 82 to Expression 86 hold.

That is to say, the STBC channel matrix generating process is performed based on the following Expression 82 to Expression 86.

$$H_e^C = \begin{bmatrix} H_{e11}^{CH(k-1)} & H_{e11}^{CH(k+1)} & H_{e11}^{CV(k-1)} & H_{e11}^{CV(k+1)} \\ H_{e21}^{CH(k-1)} & H_{e21}^{CH(k+1)} & H_{e21}^{CV(k-1)} & H_{e21}^{CV(k+1)} \\ H_{e31}^{CH(k-1)} & H_{e31}^{CH(k+1)} & H_{e31}^{CV(k-1)} & H_{e31}^{CV(k+1)} \\ H_{e41}^{CH(k-1)} & H_{e41}^{CH(k+1)} & H_{e41}^{CV(k-1)} & H_{e41}^{CV(k+1)} \end{bmatrix} \quad \text{[Expression 82]}$$

$$H_{eij}^{RT} = \begin{bmatrix} H_{ij}^{RT} & H_{i(j+1)}^{RT} \\ (H_{i(j+1)}^{RT})^* & -(H_{ij}^{RT})^* \end{bmatrix} \quad \text{[Expression 83]}$$

$$s_e^C = \quad \text{[Expression 84]}$$
$$[s_{FB1}^{H(k-1)} s_{FB2}^{H(k-1)} s_{FB1}^{H(k+1)} s_{FB2}^{H(k+1)} s_{UD1}^{V(k-1)} s_{UD2}^{V(k-1)} s_{UD1}^{V(k+1)} s_{UD2}^{V(k+1)}]^T$$

$$n_e^C = [(n_1^C)^T (n_2^C)^T (n_3^C)^T (n_4^C)^T]^T \quad \text{[Expression 85]}$$

$$n_i^C = [N_{i1}^C (N_{i2}^C)^*]^T \quad \text{[Expression 86]}$$

Since node C has eight equivalent antennas owe to the STBC, eight signals for two symbols that are transmitted, can be estimated by the following linear algorithms.

That is to say, the MIMO detecting process is performed based on the following Expression 87.

$$\hat{s}_e^C = [\hat{s}_{FB1}^{H(k-1)} \hat{s}_{FB2}^{H(k-1)} \hat{s}_{FB1}^{H(k+1)} \hat{s}_{FB2}^{H(k+1)} \hat{s}_{UD1}^{V(k-1)} \hat{s}_{UD2}^{V(k-1)} \hat{s}_{UD1}^{V(k+1)} \hat{s}_{UD2}^{V(k+1)}]^T$$
$$= (W_r^C)^H y_e^C$$
[Expression 87]

Where the MMSE receiving weight $W_r^C$ becomes the following Expression 88.

$$W_r^C = \Gamma_{eMMSE}(H_e^C)$$ [Expression 88]

$$\Gamma_{eMMSE}(H) = H\left(H^H H + \frac{2\sigma^2}{P}I\right)^{-1}$$ [Expression 89]

Furthermore, the ZF receiving weight becomes the following Expression 90.

$$W_r^C = \Gamma_{eZF}(H_e^C)$$ [Expression 90]

$$\Gamma_{eZF}(H) = H(H^H H)^{-1}$$ [Expression 91]

Where P is the total transmission power per node. Further, $\sigma^2$ is the noise power per receiving antenna.

Like 2DMNC1, from the estimated symbols, signals of each flow can be decoded.

That is to say, the network decoding process in route H is performed based on the following Expression 92 to Expression 95.

$$\hat{s}_{F1}^{H(k-1)}(n) = \hat{s}_{FB1}^{H(k-1)} - s_{B1}^C(n-1) \bmod q$$ [Expression 92]

$$\hat{s}_{F2}^{H(k-1)}(n) = \hat{s}_{FB2}^{H(k-1)} - s_{B2}^C(n-1) \bmod q$$ [Expression 93]

$$\hat{s}_{B1}^{H(k+1)}(n) = \hat{s}_{FB1}^{H(k+1)} - s_{F1}^C(n-1) \bmod q$$ [Expression 94]

$$\hat{s}_{B2}^{H(k+1)}(n) = \hat{s}_{FB2}^{H(k+1)} - s_{F2}^C(n-1) \bmod q$$ [Expression 95]

Furthermore, the network decoding process in route V is performed based on the following Expression 96 to Expression 99.

$$\hat{s}_{U1}^{V(k-1)}(n) = \hat{s}_{UD1}^{V(k-1)} - s_{D1}^C(n-1) \bmod q$$ [Expression 96]

$$\hat{s}_{U2}^{V(k-1)}(n) = \hat{s}_{UD2}^{V(k-1)} - s_{D2}^C(n-1) \bmod q$$ [Expression 97]

$$\hat{s}_{D1}^{V(k+1)}(n) = \hat{s}_{UD1}^{V(k+1)} - s_{U1}^C(n-1) \bmod q$$ [Expression 98]

$$\hat{s}_{D2}^{V(k+1)}(n) = \hat{s}_{UD2}^{V(k+1)} - s_{U2}^C(n-1) \bmod q$$ [Expression 99]

Finally, node C confirms the destination of receiving signals and in the case that the local node is not the destination node, performs the following relay control.

That is to say, the relay control process in route H is performed based on the following Expression 100 to Expression 103.

$$s_{F1}^C(n+1) \triangleq \hat{s}_{F1}^{H(k-1)}(n)$$ [Expression 100]

$$s_{F2}^C(n+1) \triangleq \hat{s}_{F2}^{H(k-1)}(n)$$ [Expression 101]

$$s_{B1}^C(n+1) \triangleq \hat{s}_{B1}^{H(k+1)}(n)$$ [Expression 102]

$$s_{B2}^C(n+1) \triangleq \hat{s}_{B2}^{H(k+1)}(n)$$ [Expression 103]

Furthermore, the relay control process in route V is performed based on the following Expression 104 to Expression 107.

$$s_{U1}^C(n+1) \triangleq \hat{s}_{U1}^{V(k-1)}(n)$$ [Expression 104]

$$s_{U2}^C(n+1) \triangleq \hat{s}_{U2}^{V(k-1)}(n)$$ [Expression 105]

$$s_{D1}^C(n+1) \triangleq \hat{s}_{D1}^{V(k+1)}(n)$$ [Expression 106]

$$s_{D2}^C(n+1) \triangleq \hat{s}_{D2}^{V(k+1)}(n)$$ [Expression 107]

<7-2> Time Slot (n+1)

As shown in FIG. 13, at time slot (n+1), nodes H(k±2), nodes V(k±2) and node C become transmitting nodes, and nodes H(k±1) and nodes V(k±1) become receiving nodes. At node C, based on the following Expression 108 to Expression 111, the network coding is performed on two consecutive transmitting symbols for the forward flow and the backward flow, and on the downward flow and the upward flow independently.

That is to say, the network coding process in route H is performed based on the following Expression 108 and Expression 109.

$$s_{FB1}^C = s_{F1}^C(n+1) + s_{B1}^C(n+1) \bmod q$$ [Expression 108]

$$s_{FB2}^C = s_{F2}^C(n+1) + s_{B2}^C(n+1) \bmod q$$ [Expression 109]

Furthermore, the network coding process in route V is performed based on the following Expression 110 and Expression 111.

$$s_{UD1}^C = s_{D1}^C(n+1) + s_{U1}^C(n+1) \bmod q$$ [Expression 110]

$$s_{UD2}^C = s_{D2}^C(n+1) + s_{U2}^C(n+1) \bmod q$$ [Expression 111]

Furthermore, based on the following Expression 112 to Expression 115, the network coding is performed on two consecutive transmitting symbols of nodes H(k±2) and nodes V (k±2) independently.

That is to say, the network coding process in route H is performed based on the following Expression 112 and Expression 113.

$$s_{FB1}^{H(k\pm2)} = s_{F1}^{H(k\pm2)}(n+1) + s_{B1}^{H(k\pm2)}(n+1) \bmod q$$ [Expression 112]

$$s_{FB2}^{H(k\pm2)} = s_{F2}^{H(k\pm2)}(n+1) + s_{B2}^{H(k\pm2)}(n+1) \bmod q$$ [Expression 113]

Furthermore, the network coding process in route V is performed based on the following Expression 114 and Expression 115.

$$s_{UD1}^{V(k\pm2)} = s_{D1}^{V(k\pm2)}(n+1) + s_{U1}^{V(k\pm2)}(n+1) \bmod q$$ [Expression 114]

$$s_{UD2}^{V(k\pm2)} = s_{D2}^{V(k\pm2)}(n+1) + s_{U2}^{V(k\pm2)}(n+1) \bmod q$$ [Expression 115]

At node C, based on the following Expression 116 and Expression 117, the STBC process is performed on the network-coded signals on route H and route V.

That is to say, the STBC transmission data generating process in route H is performed based on the following Expression 116.

$$X_{FB}^C = \begin{bmatrix} s_{FB1}^C & (s_{FB2}^C)^* \\ s_{FB2}^C & -(s_{FB1}^C)^* \end{bmatrix}$$ [Expression 116]

Furthermore, the STBC transmission data generating process in route V is performed based on the following Expression 117.

$$X_{UD}^C = \begin{bmatrix} s_{UD1}^C & (s_{UD2}^C)^* \\ s_{UD2}^C & -(s_{FB1}^C)^* \end{bmatrix} \quad \text{[Expression 117]}$$

Node C performs a spatial multiplexing transmission of the signals having two streams on route H and route V that the STBC process is performed with four antennas.

That is to say, the spatial multiplexing transmission process of two streams that the STBC process is performed, is performed based on the following Expression 118.

$$X^C = \begin{bmatrix} X_{FB}^C \\ X_{UD}^C \end{bmatrix} \quad \text{[Expression 118]}$$

Furthermore, at nodes H(k±2) and nodes V(k±2), based on the following Expression 119 and Expression 120, the STBC process is performed respectively.

That is to say, the STBC transmission data generating process in route H is performed based on the following Expression 119.

$$X^{H(k\pm2)} = \begin{bmatrix} s_{FB1}^{H(k\pm2)} & (s_{FB2}^{H(k\pm2)})^* \\ s_{FB2}^{H(k\pm2)} & -(s_{FB1}^{H(k\pm2)})^* \end{bmatrix} \quad \text{[Expression 119]}$$

Furthermore, the STBC transmission data generating process in route V is performed based on the following Expression 120.

$$X^{V(k\pm2)} = \begin{bmatrix} s_{UD1}^{V(k\pm2)} & (s_{UD2}^{V(k\pm2)})^* \\ s_{UD2}^{V(k\pm2)} & -(s_{UD1}^{V(k\pm2)})^* \end{bmatrix} \quad \text{[Expression 120]}$$

The receiving signal matrix for two symbols of the receiving nodes H(k±1) is represented by the following Expression 121. Moreover, nodes V(k±1) are also similarly given.

That is to say, receiving signals having three streams that the STBC process is performed, is represented by the following Expression 121.

$$Y^{H(k\pm1)} = H^{H(k\pm1)C} X^C + H^{(k\pm1)H(k\pm2)} X^{H(k\pm2)} + N^{H(k\pm1)} \quad \text{[Expression 121]}$$

Next, based on the following Expression 122, the receiving signal matrix is vectorized.

That is to say, the STBC reception data generating process is performed based on the following Expression 122.

$$y_e^{H(k\pm1)} = [(y_1^{H(k\pm1)})^T (y_2^{H(k\pm1)})^T (y_3^{H(k\pm1)})^T (y_4^{H(k\pm1)})^T]^T \quad \text{[Expression 122]}$$

Where the following Expression 123 holds.

$$y_i^{H(k\pm1)} = [Y_{i1}^{H(k\pm1)} (Y_{i2}^{H(k\pm1)})^*]^T \quad \text{[Expression 123]}$$

By using the STBC equivalent channel matrix $H_e^{H(k\pm1)}$, the receiving signal vector represented by the above Expression 122, can be represented by the following Expression 124.

$$y_e^{H(k\pm1)} = H_e^{H(k\pm1)} s_e^{H(k\pm1)} + N^{H(k\pm1)} \quad \text{[Expression 124]}$$

Where the following Expression 125 to Expression 129 hold.

That is to say, the STBC channel matrix generating process is performed based on the following Expression 125 to Expression 129.

$$H_e^{H(k\pm1)} = \begin{bmatrix} H_{e11}^{H(k\pm1)C} & H_{e13}^{H(k\pm1)C} & H_{e11}^{H(k\pm1)H(k\pm2)} \\ H_{e21}^{H(k\pm1)C} & H_{e23}^{H(k\pm1)C} & H_{e21}^{H(k\pm1)H(k\pm2)} \\ H_{e31}^{H(k\pm1)C} & H_{e33}^{H(k\pm1)C} & H_{e31}^{H(k\pm1)H(k\pm2)} \\ H_{e41}^{H(k\pm1)C} & H_{e43}^{H(k\pm1)C} & H_{e41}^{H(k\pm1)H(k\pm2)} \end{bmatrix} \quad \text{[Expression 125]}$$

$$H_{eij}^{RT} = \begin{bmatrix} H_{ij}^{RT} & H_{i(j+1)}^{RT} \\ (H_{i(j+1)}^{RT})^* & -(H_{ij}^{RT})^* \end{bmatrix} \quad \text{[Expression 126]}$$

$$s_e^{H(k\pm1)} = [s_{FB1}^C s_{FB2}^C s_{UD1}^C s_{UD2}^C s_{FB1}^{H(k\pm2)} s_{FB2}^{H(k\pm2)}]^T \quad \text{[Expression 127]}$$

$$n_e^{H(k\pm1)} = [(n_1^{H(k\pm1)})^T (n_2^{H(k\pm1)})^T (n_3^{H(k\pm1)})^T (n_4^{H(k\pm1)})^T]^T \quad \text{[Expression 128]}$$

$$n_i^{H(k\pm1)} = [N_{i1}^{H(k\pm1)} (N_{i2}^{H(k\pm1)})^*]^T \quad \text{[Expression 129]}$$

Since nodes H(k±1) have eight equivalent antennas owe to the STBC, six signals for two symbols that are transmitted, can be estimated by the following linear algorithms.

That is to say, the MIMO detecting process is performed based on the following Expression 130.

$$\hat{s}_e^{H(k\pm1)} = [\hat{s}_{FB1}^C \; \hat{s}_{FB2}^C \; \hat{s}_{UD1}^C \; \hat{s}_{UD2}^C \; \hat{s}_{FB1}^{H(k\pm2)} \; \hat{s}_{FB2}^{H(k\pm2)}]^T \quad \text{[Expression 130]}$$
$$= (W_r^{H(k\pm1)})^H y_e^{H(k\pm1)}$$

Where the MMSE receiving weight $W_r^{(k\pm1)}$ becomes the following Expression 131.

$$W_r^{H(k\pm1)} = \Gamma_{eMMSE}(H_e^{H(k\pm1)}) \quad \text{[Expression 131]}$$

Furthermore, the ZF receiving weight becomes the following Expression 132.

$$W_r^{H(k\pm1)} = \Gamma_{eZF}(H_e^{H(k\pm1)}) \quad \text{[Expression 132]}$$

Like 2DMNC1, from the estimated symbols, signals of each flow can be decoded.

That is to say, the network decoding process in route H is performed based on the following Expression 133 to Expression 140.

$$\hat{s}_{F1}^C(n+1) = \hat{s}_{FB1}^C - s_{B1}^{H(k+1)}(n) \bmod q \quad \text{[Expression 133]}$$

$$\hat{s}_{F2}^C(n+1) = \hat{s}_{FB2}^C - s_{B2}^{H(k+1)}(n) \bmod q \quad \text{[Expression 134]}$$

$$\hat{s}_{B1}^{H(k+2)}(n+1) = \hat{s}_{FB1}^{H(k+2)} - s_{F1}^{H(k+1)}(n) \bmod q \quad \text{[Expression 135]}$$

$$\hat{s}_{B2}^{H(k+2)}(n+1) = \hat{s}_{FB2}^{H(k+2)} - s_{F2}^{H(k+1)}(n) \bmod q \quad \text{[Expression 136]}$$

$$\hat{s}_{B1}^C(n+1) = \hat{s}_{FB1}^C - s_{F1}^{H(k-1)}(n) \bmod q \quad \text{[Expression 137]}$$

$$\hat{s}_{B2}^C(n+1) = \hat{s}_{FB2}^C - s_{F2}^{H(k-1)}(n) \bmod q \quad \text{[Expression 138]}$$

$$\hat{s}_{F1}^{H(k-2)}(n+1) = \hat{s}_{FB1}^{H(k-2)} - s_{B1}^{H(k-1)}(n) \bmod q \quad \text{[Expression 139]}$$

$$\hat{s}_{F2}^{H(k-2)}(n+1) = \hat{s}_{FB2}^{H(k-2)} - s_{B2}^{H(k-1)}(n) \bmod q \quad \text{[Expression 140]}$$

Here, since $\hat{s}_{UD1}^C, \hat{s}_{UD2}^C$ is not a flow on route H, in nodes H (k±1), the decoding process is not performed.

Finally, nodes H(k±1) confirm the destination of receiving signals and in the case that the local node is not the destination node, perform the following relay control.

That is to say, the relay control process in route H is performed based on the following Expression 141 to Expression 148.

$$s_{F1}^{H(k+1)}(n+2) \triangleq \hat{s}_{F1}^{C}(n+1) \quad \text{[Expression 141]}$$

$$s_{F2}^{H(k+1)}(n+2) \triangleq \hat{s}_{F2}^{C}(n+1) \quad \text{[Expression 142]}$$

$$s_{B1}^{H(k+1)}(n+2) \triangleq \hat{s}_{B1}^{H(k+2)}(n+1) \quad \text{[Expression 143]}$$

$$s_{B2}^{H(k+1)}(n+2) \triangleq \hat{s}_{B2}^{H(k+2)}(n+1) \quad \text{[Expression 144]}$$

$$s_{B1}^{H(k-1)}(n+2) \triangleq \hat{s}_{B1}^{C}(n+1) \quad \text{[Expression 145]}$$

$$s_{B2}^{H(k-1)}(n+2) \triangleq \hat{s}_{B2}^{C}(n+1) \quad \text{[Expression 146]}$$

$$s_{F1}^{H(k-1)}(n+2) \triangleq \hat{s}_{F1}^{H(k-2)}(n+1) \quad \text{[Expression 147]}$$

$$s_{F2}^{H(k-1)}(n+2) \triangleq \hat{s}_{F2}^{H(k-2)}(n+1) \quad \text{[Expression 148]}$$

Similarly, from and $\hat{s}_{UD1}^{C}, \hat{s}_{UD2}^{C}$ and $\hat{s}_{UD1}^{V(k\pm2)}, \hat{s}_{UD2}^{V(k\pm2)}$ can decode and relay control the desired information of the downward flow and the upward flow.

By repeating the above-described processing with the cycle of an even time slot and an odd time slot, the present invention realizes the multi-hop relay of the two-dimension STBC-processed bi-directional flow with a single channel.

<8> Multi-Hop Wireless Communication System According to the Fifth Embodiment of the Present Invention (Rotary Type Two-Dimensional Multi-Hop Communication System Employing Two-Dimensional MIMO Network Coding (2DMNC2))

Hereinafter, a multi-hop wireless communication system according to the fifth embodiment of the present invention will be concretely described. The multi-hop wireless communication system according to the fifth embodiment of the present invention is a rotary type two-dimensional multi-hop communication system employing two-dimensional MIMO network coding (2DMNC2).

Figure 20:
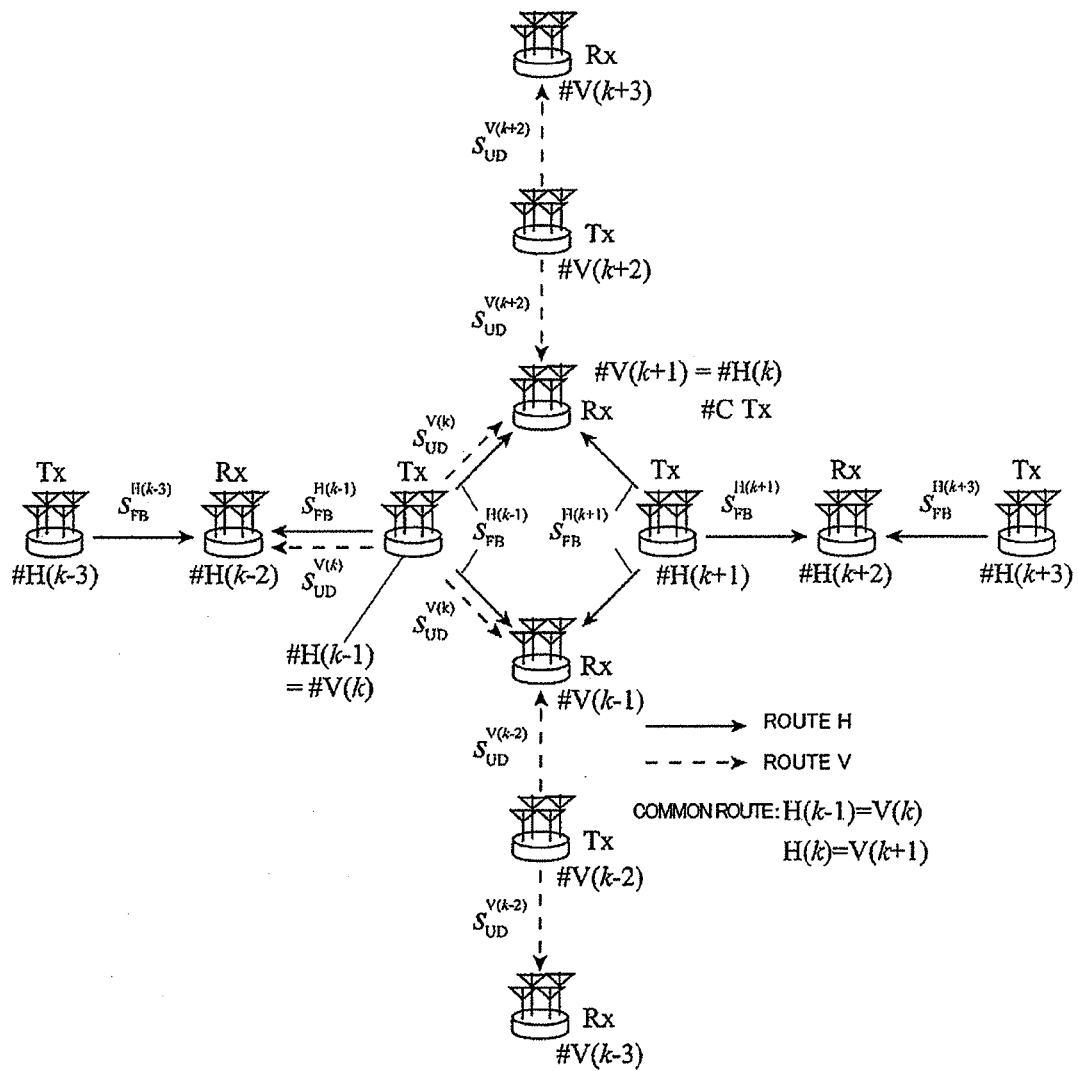
FIG. 20 is a conceptual diagram illustrating information transmission of a multi-hop wireless communication system according to the fifth embodiment of the present invention (i.e., a rotary type two-dimensional multi-hop communication system) at time slot n.
Figure 21:
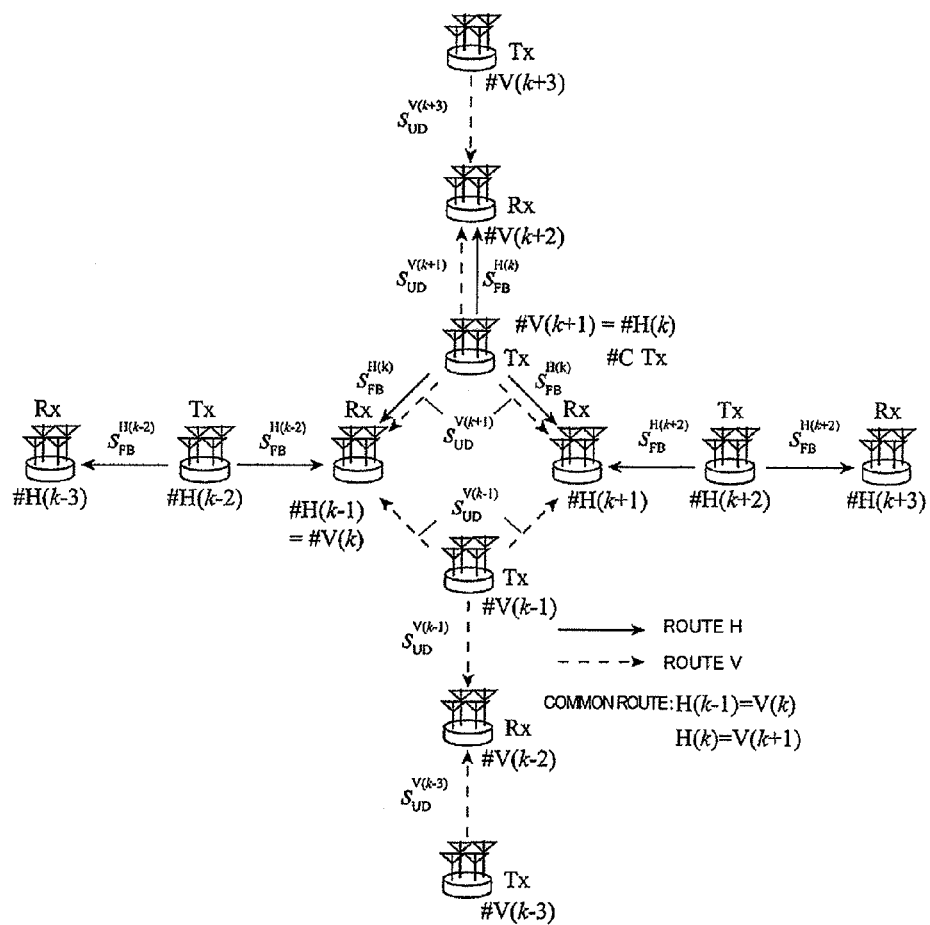
FIG. 21 is a conceptual diagram illustrating information transmission of the multi-hop wireless communication system according to the fifth embodiment of the present invention (i.e., the rotary type two-dimensional multi-hop communication system) at time slot (n+1)

The rotary type two-dimensional multi-hop communication system (2DMNC2) according to the fifth embodiment of the present invention, has a rotary type network topology shown in FIG. 20 and FIG. 21. It is clear from FIG. 20 and FIG. 21 that since the intersection node C does not exist, four surrounding nodes perform the relay of information flow on route H and route V.

For example, node V(k+1) receives information on both route H and route V at time slot n, and broadcasts two streams on route H and route V at time slot (n+1). Also node H(k−1) is similar. Furthermore, in order to relay information flow on route H, it is possible to use one of good quality that is chosen from either node V(k+1) or node V(k−1). Similarly, in order to relay information flow on route V, it is possible to use one of good quality that is chosen from either node H(k+1) or node H(k−1).

Here the case that node V(k+1) and node H(k−1) are used in relay, will be described. The transmission cycle of this case is as follows. As shown in FIG. 20, at time slot n, nodes H(k±1), nodes H (k±3) and nodes V(k±2) are transmitting nodes, and other nodes are receiving nodes.

At the next time slot (n+1), as shown in FIG. 21, transmitting nodes become receiving nodes, and receiving nodes become transmitting nodes.

However, in 2DMNC2, nodes other than rotary nodes and their adjacent nodes, perform one-dimensional MIMO network coding that is described in the first embodiment and the second embodiment in detail.

Hereinafter, the transmitting/receiving algorithm of the rotary nodes and their adjacent nodes in 2DMNC2 (that is, two-dimensional MIMO network coding) will be described.

<8-1> Time Slot n

As shown in FIG. 20, at time slot n, node H(k−1) network-codes the forward flow and the backward flow on route H, and generates a transmitting signal $s_{FB}^{H(k-1)}$. Furthermore, at the same time, node H(k−1) network-codes the upward flow and the downward flow on route V, and generates a transmitting signal $s_{UD}^{V(k)} = s_{UD}^{H(k-1)}$. Next, node H(k−1) performs the spatial multiplexing transmission of the two generated streams $s_{FB}^{H(k-1)}$ and $s_{UD}^{V(k)}$.

At the same time, node H(k+1) network-codes the forward flow and the backward flow on route H, and generates a transmitting signal $s_{FB}^{H(k+1)}$. Similarly, node H(k−3) generates $s_{FB}^{H(k-3)}$ and transmits it. Furthermore, nodes V(k±2) network-code the upward flow and the downward flow respectively, and generate $s_{UD}^{V(k\pm2)}$ and transmit them.

At this time, node V(k+1) receives four streams, i.e. two streams from node H(k−1), one stream from node H(k+1) and one stream from node V(k+2), performs the MIMO detecting process, performs the network decoding process and performs the relay control process so as to generate four flows, i.e. the forward flow, the backward flow, the downward flow and the upward flow at the next time slot.

On the other hand, similarly, node V(k−1) receives four streams, i.e. two streams from node H(k−1), one stream from node H(k+1) and one stream from node V(k−2) and performs the MIMO detecting process. However, node V(k−1) discards signals on route H and performs the network decoding process and the relay control process only on signals on route V so as to generate two flows, i.e. the downward flow and the upward flow at the next time slot.

Furthermore, node H(k−2) receives three streams, i.e. two streams from node H(k−1) and one stream from node H(k−3) and performs the MIMO detecting process. However, node H(k−2) discards signals on route V and performs the network decoding process and the relay control process only on signals on route H so as to generate two flows, i.e. the forward flow and the backward flow at the next time slot.

<8-2> Time Slot (n+1)

As shown in FIG. 21, at time slot (n+1), node V(k+1) network-codes the upward flow and the downward flow on route V, and generates a transmitting signal $s_{UD}^{V(k+1)}$. Furthermore, at the same time, node V(k+1) network-codes the forward flow and the backward flow on route H, and generates a transmitting signal $s_{FB}^{H(k)} = s_{FB}^{V(k+1)}$. Next, node V(k+1) performs the spatial multiplexing transmission of the two generated streams $s_{UD}^{V(k+1)}$ and $s_{FB}^{H(k)}$.

At the same time, node V(k−1) network-codes the upward flow and the downward flow on route V, and generates a transmitting signal $s_{UD}^{V(k-1)}$. Similarly, node V(k+3) generates $s_{UD}^{V(k+3)}$ and transmits it. Furthermore, nodes H(k±2) network-code the forward flow and the backward flow respectively, and generate $s_{FB}^{H(k\pm2)}$ and transmit them.

At this time, node H(k−1) receives four streams, i.e. two streams from node V(k+1), one stream from node V(k−1) and one stream from node H(k−2), performs the MIMO detecting process, performs the network decoding process and performs the relay control process so as to generate four flows, i.e. the forward flow, the backward flow, the downward flow and the upward flow at the next time slot.

On the other hand, similarly, node H(k+1) receives four streams, i.e. two streams from node V(k+1), one stream from node V(k−1) and one stream from node H(k+2) and performs the MIMO detecting process. However, node H(k+1) discards signals on route V and performs the network decoding process and the relay control process only on signals on route H so as to generate two flows, i.e. the forward flow and the backward flow at the next time slot.

Furthermore, node V(k+2) receives three streams, i.e. two streams from node V(k+1) and one stream from node V(k+3) and performs the MIMO detecting process. However, node V(k+2) discards signals on route H and performs the network decoding process and the relay control process only on signals on route V so as to generate two flows, i.e. the upward flow and the downward flow at the next time slot.

By repeating the above-described processing with the cycle of an even time slot and an odd time slot, the present invention realizes the multi-hop relay of the two-dimension rotary type bi-directional flow with a single channel.

Moreover, it goes without saying that it is possible to use the node device 3 shown in FIG. 16 as a node (a node device) in the rotary type two-dimensional multi-hop communication system (2DMNC2) according to the fifth embodiment of the present invention.

<9> Multi-Hop Wireless Communication System According to the Sixth Embodiment of the Present Invention (Rotary Type Two-Dimensional Multi-Hop Communication System Employing Two-Dimensional STBC-MIMO Network Coding (2DSTBCMNC2))

Hereinafter, a multi-hop wireless communication system according to the sixth embodiment of the present invention will be concretely described. The multi-hop wireless communication system according to the sixth embodiment of the present invention is a rotary type two-dimensional multi-hop communication system employing two-dimensional STBC-MIMO network coding (2DSTBCMNC2).

That is to say, the rotary type two-dimensional multi-hop communication system (2DSTBCMNC2) according to the sixth embodiment of the present invention, can realize a more reliable multi-hop relay by combining the rotary type two-dimensional multi-hop communication system (2DMNC2) according to the fifth embodiment of the present invention and the STBC process (the STBC function).

However, in 2DSTBCMNC2, nodes other than rotary nodes and their adjacent nodes, perform one-dimensional STBC-MIMO network coding that is described in the second embodiment in detail.

<9-1> Time Slot n

As shown in FIG. 20, at time slot n, node H(k−1) network-codes two consecutive symbols of the forward flow and the backward flow on route H to compute transmitting signals $s_{FB1}^{H(k-1)}$ and $s_{FB2}^{H(k-1)}$ and generates the STBC transmission data of route H by using the computed $s_{FB1}^{H(k-1)}$ and $s_{FB2}^{H(k-1)}$. Furthermore, at the same time, node H(k−1) network-codes two consecutive symbols of the upward flow and the downward flow on route V to compute transmitting signals $s_{UD1}^{V(k)}=s_{UD1}^{H(k-1)}$ and $s_{UD2}^{V(k)}=s_{UD2}^{H(k-1)}$, and generates the STBC transmission data of route V by using the computed $s_{UD1}^{V(k)}=s_{UD1}^{H(k-1)}$ and $s_{UD2}^{V(k)}=s_{UD2}^{H(k-1)}$. Next, node H(k−1) performs the spatial multiplexing transmission of the two generated STBC transmission data with four antennas.

At the same time, node H(k+1) network-codes two consecutive symbols of the forward flow and the backward flow on route H to compute transmitting signals $s_{FB1}^{H(k+1)}$ and $s_{FB2}^{H(k+1)}$, and generates the STBC transmission data of route H by using the computed $s_{FB1}^{H(k+1)}$ and $s_{FB2}^{H(k+1)}$. Similarly, node H(k−3) computes $s_{FB1}^{H(k-3)}$ and $s_{FB2}^{H(k-3)}$, and generates the STBC transmission data of route H by using the computed $s_{FB1}^{H(k-3)}$ and $s_{FB2}^{H(k-3)}$ and then transmits them. Furthermore, nodes V(k±2) network-code two consecutive symbols of the upward flow and the downward flow respectively to compute $s_{UD1}^{V(k±2)}$ and $s_{UD2}^{V(k±2)}$, and generates the STBC transmission data of route V by using the computed $s_{UD1}^{V(k±2)}$ and $s_{UD2}^{V(k±2)}$ and then transmits them.

At this time, node V(k+1) receives four streams, i.e. two STBC-processed streams from node H(k−1), one STBC-processed stream from node H(k+1) and one STBC-processed stream from node V(k+2), generates the STBC reception data and the STBC channel matrix to perform the MIMO detecting process, performs the network decoding process and performs the relay control process so as to generate two consecutive symbols of four flows, i.e. the forward flow, the backward flow, the downward flow and the upward flow at the next time slot.

On the other hand, similarly, node V(k−1) receives four streams, i.e. two STBC-processed streams from node H(k−1), one STBC-processed stream from node H(k+1) and one STBC-processed stream from node V(k−2) and generates the STBC reception data and the STBC channel matrix to perform the MIMO detecting process. However, node V(k−1) discards signals on route H and performs the network decoding process and the relay control process only on signals on route V so as to generate two consecutive symbols of two flows, i.e. the downward flow and the upward flow at the next time slot.

Furthermore, node H(k−2) receives three streams, i.e. two STBC-processed streams from node H(k−1) and one STBC-processed stream from node H(k−3) and generates the STBC reception data and the STBC channel matrix to perform the MIMO detecting process. However, node H(k−2) discards signals on route V and performs the network decoding process and the relay control process only on signals on route H so as to generate two consecutive symbols two flows, i.e. the forward flow and the backward flow at the next time slot.

<9-2> Time Slot (n+1)

As shown in FIG. 21, at time slot (n+1), node V(k+1) network-codes two consecutive symbols of the upward flow and the downward flow on route V to compute $s_{UD1}^{V(k+1)}$ and $s_{UD2}^{V(k+1)}$, and generates the STBC transmission data of route V by using the computed $s_{UD1}^{V(k+1)}$ and $s_{UD2}^{V(k+1)}$. Furthermore, at the same time, node V(k+1) network-codes two consecutive symbols of the forward flow and the backward flow on route H to compute $s_{FB1}^{H(k)}=s_{FB1}^{V(k+1)}$ and $s_{FB2}^{H(k)}=s_{FB2}^{V(k+1)}$, and generates the STBC transmission data of route H by using the computed $s_{FB1}^{H(k)}=s_{FB1}^{V(k+1)}$ and $s_{FB2}^{H(k)}=s_{FB2}^{V(k+1)}$. Next, node V(k+1) performs the spatial multiplexing transmission of the two generated STBC transmission data with four antennas.

At the same time, node V(k−1) network-codes two consecutive symbols of the upward flow and the downward flow on route V to compute $s_{UD1}^{V(k-1)}$ and $s_{UD2}^{V(k-1)}$ and generates the STBC transmission data of route V by using the computed $s_{UD1}^{V(k-1)}$ and $s_{UD2}^{V(k-1)}$. Similarly, node V(k+3) computes $s_{UD1}^{V(k+3)}$ and $s_{UD2}^{V(k+3)}$, and generates the STBC transmission data of route V by using the computed $s_{UD1}^{V(k+3)}$ and $s_{UD2}^{V(k+3)}$ and then transmits them. Furthermore, nodes H(k±2) network-code two consecutive symbols of the forward flow and the backward flow respectively to compute $s_{FB1}^{H(k±2)}$ and $s_{FB2}^{H(k±2)}$, and generates the STBC transmission data of route H by using the computed $s_{FB1}^{H(k±2)}$ and $s_{FB2}^{H(k±2)}$ then transmits them.

At this time, node H(k−1) receives four streams, i.e. two STBC-processed streams from node V(k+1), one STBC-processed stream from node V(k−1) and one STBC-processed stream from node H(k−2), generates the STBC reception data and the STBC channel matrix to perform the MIMO detecting process, performs the network decoding process and performs the relay control process so as to generate two consecutive symbols of four flows, i.e. the forward flow, the backward flow, the downward flow and the upward flow at the next time slot.

On the other hand, similarly, node H(k+1) receives four streams, i.e. two STBC-processed streams from node V(k+1), one STBC-processed stream from node V(k−1) and one STBC-processed stream from node H(k+2) and generates the STBC reception data and the STBC channel matrix to perform the MIMO detecting process. However, node H(k+1) discards signals on route V and performs the network decoding process and the relay control process only on signals on route H so as to generate two consecutive symbols of two flows, i.e. the forward flow and the backward flow at the next time slot.

Furthermore, node V(k+2) receives three streams, i.e. two STBC-processed streams from node V(k+1) and one STBC-processed stream from node V(k+3) and generates the STBC reception data and the STBC channel matrix to perform the MIMO detecting process. However, node V(k+2) discards signals on route H and performs the network decoding process and the relay control process only on signals on route V so as to generate two consecutive symbols two flows, i.e. the upward flow and the downward flow at the next time slot.

By repeating the above-described processing with the cycle of an even time slot and an odd time slot, the present invention realizes the multi-hop relay of the two-dimension rotary type STBC-processed bi-directional flow with a single channel.

Moreover, it goes without saying that it is possible to use the node device 4 shown in FIG. 18 as a node (a node device) in the rotary type two-dimensional multi-hop communication system (2DSTBCMNC2) according to the sixth embodiment of the present invention.

<10> Multi-Hop Wireless Communication System According to the Seventh Embodiment of the Present Invention (Tree Type MIMO Mesh Network Employing Two-Dimensional MIMO Network Coding (2DMNC3))

Hereinafter, a multi-hop wireless communication system according to the seventh embodiment of the present invention will be concretely described. The multi-hop wireless communication system according to the seventh embodiment of the present invention is a tree type two-dimensional multi-hop communication system employing two-dimensional MIMO network coding (2DMNC3).

Figure 22:
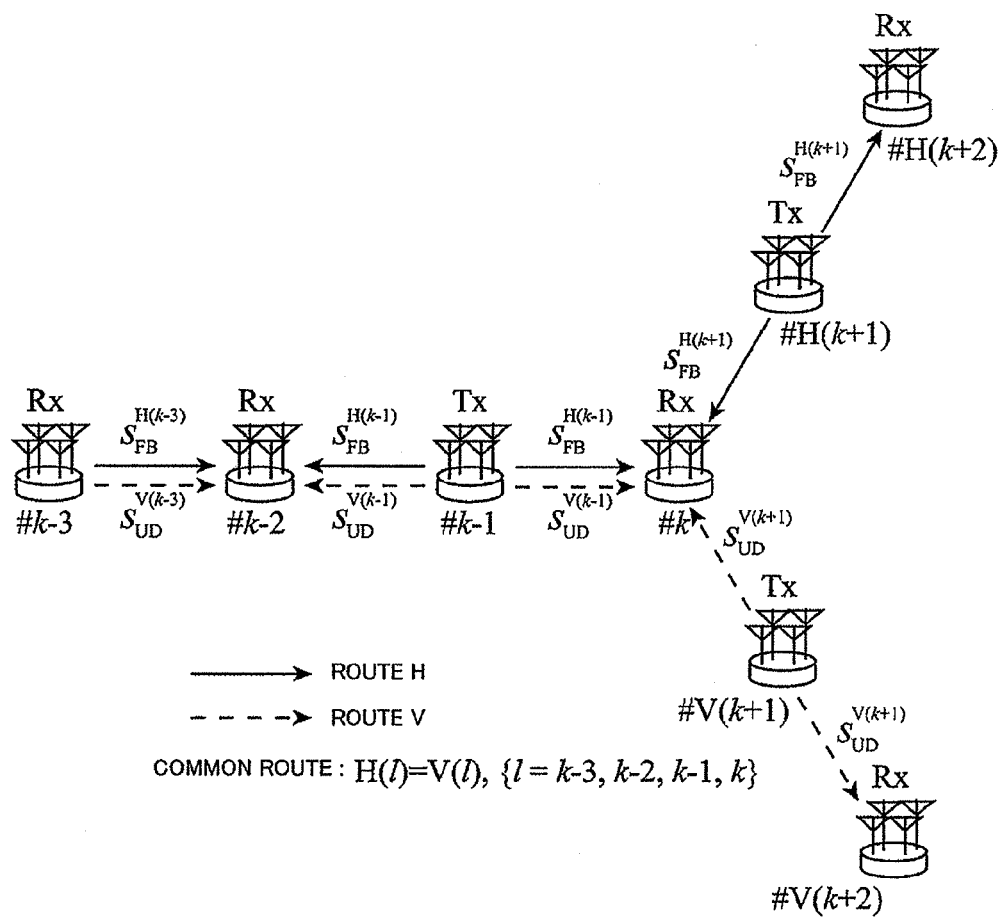
FIG. 22 is a conceptual diagram illustrating information transmission of a multi-hop wireless communication system according to the seventh embodiment of the present invention (i.e., a tree type two-dimensional multi-hop communication system) at time slot n.
Figure 23:
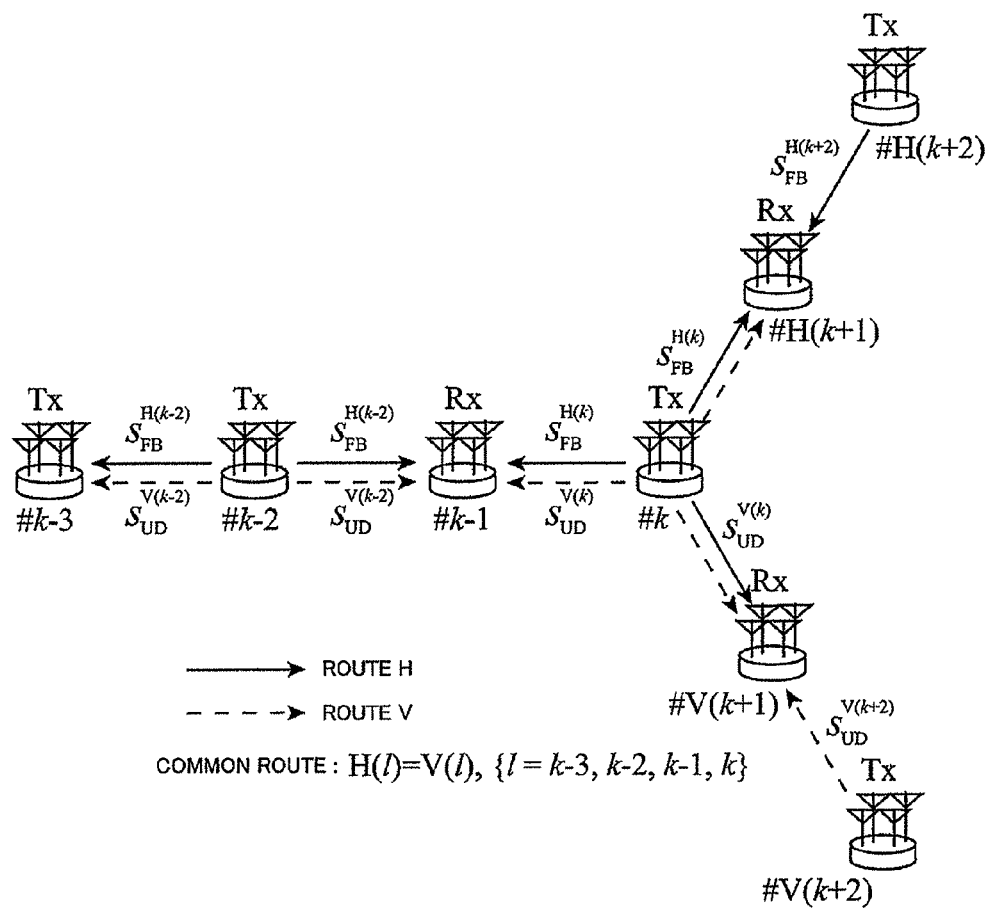
FIG. 23 is a conceptual diagram illustrating information transmission of the multi-hop wireless communication system according to the seventh embodiment of the present invention (i.e., the tree type two-dimensional multi-hop communication system) at time slot (n+1)

The tree type two-dimensional multi-hop communication system (2DMNC3) according to the seventh embodiment of the present invention, has a tree type network topology shown in FIG. 22 and FIG. 23. It is clear from FIG. 22 and FIG. 23 that the tree type topology is a topology that parts of route H and route V of a cross type topology are degenerated into one route.

For example, with respect to node (k−3), node (k−2), node (k−1) and node (k), since node (k−3)=H(k−3)=V(k−3), node (k−2)=H(k−2)=V(k−2), node (k−1)=H(k−1)=V(k−1) and node (k)=H(k)=V(k) hold, from node (k−3) to node (k), there is one route (a common route), and in node (k) it is diverged into route H and route V.

Therefore, node (k−3), node (k−2), node (k−1) and node (k) perform the relay of two routes without distinguishing between route H and route V. That is to say, the common route is the one-dimensional MIMO network coding that two streams are multiplexed. The transmission cycle of this time is as follows.

As shown in FIG. 22, at time slot n, node (k−3), node (k−1), node H(k+1) and node V(k+1) are transmitting nodes, and other nodes are receiving nodes. At the next time slot (n+1), as shown in FIG. 23, transmitting nodes become receiving nodes and receiving nodes become transmitting nodes.

However, in 2DMNC3, nodes other than nodes on the common route and their adjacent nodes, perform one-dimensional MIMO network coding that is described in the first embodiment and the second embodiment in detail.

Hereinafter, the transmitting/receiving algorithm of the nodes on the common route and their adjacent nodes in 2DMNC3 (that is, two-dimensional MIMO network coding) will be described.

<10-1> Time Slot n

As shown in FIG. 22, at time slot n, node (k−1) network-codes the forward flow and the backward flow on route H, and generates the transmitting signal $s_{FB}^{H(k-1)}=s_{FB}^{V(k-1)}$. Furthermore, at the same time, node (k−1) network-codes the upward flow and the downward flow on route V, and generates the transmitting signal $s_{UD}^{V(k-1)}=s_{UD}^{H(k-1)}$.

Next, node (k−1) performs the spatial multiplexing transmission of the two generated streams $s_{FB}^{H(k-1)}$ and $s_{UD}^{V(k-1)}$. Similarly, node (k−3) performs the spatial multiplexing transmission of $s_{FB}^{V(k-3)}$ and $s_{UD}^{V(k-3)}$. However, in the nodes on the common route, since there is no distinction between route H and route V, the combination of network codes are not limited.

At this time, node (k−2) receives four streams, i.e. two streams from node (k−3) and two streams from node (k−1), performs the MIMO detecting process, performs the network decoding process and performs the relay control process so as to generate four flows, i.e. the forward flow, the backward flow, the downward flow and the upward flow at the next time slot. However, the forward flow, the backward flow, the downward flow and the upward flow are transmitted with the common route respectively.

Furthermore, node (k) receives two streams from node (k−1), one stream from node H(k+1) and one stream from node V(k+1), performs the MIMO detecting process, performs the network decoding process and performs the relay control process so as to generate four flows, i.e. the forward flow, the backward flow, the downward flow and the upward flow at the next time slot. However, the backward flow and the downward flow are transmitted with the common route.

<10-2> Time Slot (n+1)

As shown in FIG. 23, at time slot (n+1), node (k−2) network-codes the forward flow and the backward flow on route H, and generates the transmitting signal $s_{FB}^{H(k-2)}=s_{FB}^{V(k-2)}$. Furthermore, at the same time, node (k−2) network-codes the upward flow and the downward flow on route V, and generates the transmitting signal $s_{UD}^{V(k-2)}=s_{UD}^{H(k-2)}$.

Next, node (k−2) performs the spatial multiplexing transmission of the two generated streams $s_{FB}^{H(k-2)}$ and $s_{UD}^{V(k-2)}$. However, in the nodes on the common route, since there is no distinction between route H and route V, the combination of network codes are not limited.

Node (k) network-codes the forward flow and the backward flow on route H, and generates the transmitting signal $s_{FB}^{H(k)}=s_{FB}^{V(k)}$. Furthermore, at the same time, node (k) network-codes the upward flow and the downward flow on route V, and generates the transmitting signal $s_{UD}^{V(k)}=s_{UD}^{H(k)}$. Next, node (k) performs the spatial multiplexing transmission of the two generated streams $s_{FB}^{H(k)}$ and $s_{UD}^{V(k)}$. However, since the flow of route H and the flow of route V are diverged in node (k), the combination of network codes are limited to the forward and the backward, and the upward and the downward.

At this time, node (k−1) receives four streams, i.e. two streams from node (k−2) and two streams from node (k), performs the MIMO detecting process, performs the network decoding process and performs the relay control process so as to generate four flows, i.e. the forward flow, the backward flow, the downward flow and the upward flow at the next time slot. However, the forward flow, the backward flow, the downward flow and the upward flow are transmitted with the common route respectively.

Furthermore, node H(k+1) receives three streams, i.e. two streams from node (k) and one stream from node H(k+2) and performs the MIMO detecting process. However, node H(k+1) discards signals on route V and performs the network decoding process and the relay control process only on signals on route H so as to generate two flows, i.e. the forward flow and the backward flow at the next time slot.

Similarly, node V(k+1) receives three streams, i.e. two streams from node (k) and one stream from node V(k+2) and performs the MIMO detecting process. However, node V(k+1) discards signals on route H and performs the network decoding process and the relay control process only on signals on route V so as to generate two flows, i.e. the upward flow and the downward flow at the next time slot.

By repeating the above-described processing with the cycle of an even time slot and an odd time slot, the present invention realizes the multi-hop relay of the two-dimension tree type bi-directional flow with a single channel.

Moreover, it goes without saying that it is possible to use the node device 3 shown in FIG. 16 as a node (a node device) in the tree type two-dimensional multi-hop communication system (2DMNC3) according to the seventh embodiment of the present invention.

<11> Multi-Hop Wireless Communication System According to the Eighth Embodiment of the Present Invention (Tree Type Two-Dimensional Multi-Hop Communication System Employing Two-Dimensional STBC-MIMO Network Coding (2DSTBCMNC3))

Hereinafter, a multi-hop wireless communication system according to the eighth embodiment of the present invention will be concretely described. The multi-hop wireless communication system according to the eighth embodiment of the present invention is a tree type two-dimensional multi-hop communication system employing two-dimensional STBC-MIMO network coding (2DSTBCMNC3).

That is to say, the tree type two-dimensional multi-hop communication system (2DSTBCMNC3) according to the eighth embodiment of the present invention, can realize a more reliable multi-hop relay by combining the tree type two-dimensional multi-hop communication system (2DMNC3) according to the seventh embodiment of the present invention and the STBC process (the STBC function).

However, in 2DSTBCMNC3, nodes other than the nodes on the common route and their adjacent nodes, perform one-dimensional STBC-MIMO network coding that is described in the second embodiment in detail.

<11-1> Time Slot n

As shown in FIG. 22, at time slot n, node (k−1) network-codes two consecutive symbols of the forward flow and the backward flow on route H to compute transmitting signals $s_{FB1}^{H(k-1)}=s_{FB1}^{V(k-1)}$ and $s_{FB2}^{H(k-1)}=s_{FB2}^{V(k-1)}$, and generates the STBC transmission data of route H by using the computed $s_{FB1}^{H(k-1)}=s_{FB1}^{V(k-1)}$ and $s_{FB2}^{H(k-1)}=s_{FB2}^{V(k-1)}$.

Furthermore, at the same time, node (k−1) network-codes two consecutive symbols of the upward flow and the downward flow on route V to compute transmitting signals $s_{UD1}^{V(k-1)}=s_{UD1}^{H(k-1)}$ and $s_{UD2}^{V(k-1)}=s_{UD2}^{H(k-1)}$, and generates the STBC transmission data of route V by using the computed $s_{UD1}^{V(k-1)}=s_{UD1}^{H(k-1)}$ and $s_{UD2}^{V(k-1)}=s_{UD2}^{H(k-1)}$.

Next, node (k−1) performs the spatial multiplexing transmission of the two generated STBC transmission data with four antennas.

Similarly, node (k−3) computes $s_{FB1}^{H(k-3)}$ and $s_{FB2}^{H(k-3)}$ and $s_{UD1}^{V(k-3)}$ and $s_{UD2}^{V(k-3)}$, generates the STBC transmission data of route H and route V by using the computed $s_{FB1}^{H(k-3)}$ and $s_{FB2}^{H(k-3)}$, and $s_{UD1}^{V(k-3)}$ and $s_{UD2}^{V(k-3)}$, and performs the spatial multiplexing transmission of the two generated STBC transmission data with four antennas. However, in the nodes on the common route, since there is no distinction between route H and route V, the combination of network codes are not limited.

At this time, node (k−2) receives four streams, i.e. two STBC-processed streams from node (k−3) and two STBC-processed streams from node (k−1), generates the STBC reception data and the STBC channel matrix to perform the MIMO detecting process, performs the network decoding process and performs the relay control process so as to generate two consecutive symbols of four flows, i.e. the forward flow, the backward flow, the downward flow and the upward flow at the next time slot. However, the forward flow, the backward flow, the downward flow and the upward flow are transmitted with the common route respectively.

Furthermore, node (k) receives two STBC-processed streams from node (k−1), one STBC-processed stream from node H(k+1) and one STBC-processed stream from node V(k+1), generates the STBC reception data and the STBC channel matrix to perform the MIMO detecting process, performs the network decoding process and performs the relay control process so as to generate two consecutive symbols of four flows, i.e. the forward flow, the backward flow, the downward flow and the upward flow at the next time slot. However, the backward flow and the downward flow are transmitted with the common route.

<11-2> Time Slot (n+1)

As shown in FIG. 23, at time slot (n+1), node (k−2) network-codes two consecutive symbols of the forward flow and the backward flow on route H to compute transmitting signals $s_{FB1}^{H(k-2)}=s_{FB1}^{V(k-2)}$ and $s_{FB2}^{H(k-2)}=s_{FB2}^{V(k-2)}$, and generates the STBC transmission data of route H by using the computed $s_{FB1}^{H(k-2)}=s_{FB1}^{V(k-2)}$ and $s_{FB2}^{H(k-2)}=s_{FB2}^{V(k-2)}$.

Furthermore, at the same time, node (k−2) network-codes two consecutive symbols of the upward flow and the downward flow on route V to compute transmitting signals $s_{UD1}^{V(k-2)}=s_{UD1}^{H(k-2)}$ and $s_{UD2}^{V(k-2)}=s_{UD2}^{H(k-2)}$, and generates the STBC transmission data of route V by using the computed $s_{UD1}^{V(k-2)}=s_{UD1}^{H(k-2)}$ and $s_{UD2}^{V(k-2)}=s_{UD2}^{H(k-2)}$.

Next, node (k−2) performs the spatial multiplexing transmission of the two generated STBC transmission data with four antennas. However, in the nodes on the common route, since there is no distinction between route H and route V, the combination of network codes are not limited.

Node (k) network-codes two consecutive symbols of the forward flow and the backward flow on route H to compute transmitting signals $s_{FB1}^{H(k)}=s_{FB1}^{V(k)}$ and $s_{FB2}^{H(k)}=s_{FB2}^{V(k)}$ and generates the STBC transmission data of route H by using the computed $s_{FB1}^{H(k)}=s_{FB1}^{V(k)}$ and $s_{FB2}^{H(k)}=s_{FB2}^{V(k)}$.

Furthermore, in the same time, node (k) network-codes two consecutive symbols of the upward flow and the downward flow on route V to compute transmitting signals $s_{UD1}^{V(k)}=s_{UD1}^{H(k)}$ and $s_{UD2}^{V(k)}=s_{UD2}^{H(k)}$ and generates the STBC transmission data of route V by using the computed $s_{UD1}^{V(k)}=s_{UD1}^{H(k)}$ and $s_{UD2}^{V(k)}=s_{UD2}^{H(k)}$.

Next, node (k) performs the spatial multiplexing transmission of the two generated STBC transmission data with four antennas. However, since the flow of route H and the flow of route V are diverged in node (k), the combination of network codes are limited to the forward and the backward, and the upward and the downward.

At this time, node (k−1) receives four streams, i.e. two STBC-processed streams from node (k−2) and two STBC-processed streams from node (k), generates the STBC reception data and the STBC channel matrix to perform the MIMO detecting process, performs the network decoding process and performs the relay control process so as to generate two consecutive symbols of four flows, i.e. the forward flow, the backward flow, the downward flow and the upward flow at the next time slot. However, the forward flow, the backward flow, the downward flow and the upward flow are transmitted with the common route respectively.

Furthermore, node H(k+1) receives three streams, i.e. two STBC-processed streams from node (k) and one STBC-processed stream from node H(k+2) and generates the STBC reception data and the STBC channel matrix to perform the MIMO detecting process. However, node H(k+1) discards signals on route V and performs the network decoding process and the relay control process only on signals on route H so as to generate two consecutive symbols two flows, i.e. the forward flow and the backward flow at the next time slot.

Similarly, node V(k+1) receives three streams, i.e. two STBC-processed streams from node (k) and one STBC-processed stream from node V(k+2) and generates the STBC reception data and the STBC channel matrix to perform the MIMO detecting process. However, node V(k+1) discards signals on route H and performs the network decoding process and the relay control process only on signals on route V so as to generate two consecutive symbols two flows, i.e. the upward flow and the downward flow at the next time slot.

By repeating the above-described processing with the cycle of an even time slot and an odd time slot, the present invention realizes the multi-hop relay of the two-dimension tree type STBC-processed bi-directional flow with a single channel.

Moreover, it goes without saying that it is possible to use the node device 4 shown in FIG. 18 as a node (a node device) in the tree type two-dimensional multi-hop communication system (2DSTBCMNC3) according to the eighth embodiment of the present invention.

<12> Cooperative Null Beamforming Considering Interference Occurred in 2DMNC1

Due to the broadcast characteristic of the wireless channel, a receiving node receives not only its desired signal but also interference signals from surrounding transmitting nodes. With respect to a receiving node, the nearer to the interference source, the worse the signal to interference and noise ratio (SINR).

Therefore, inventors of the present invention propose several cooperative null beamforming algorithms that consider interference occurred in a two-dimensional multi-hop communication system having a cross type network topology, that is, interference reduction methods for 2DMNC1 (type A, type B and type C) as follows.

At a receiving node, only signals transmitted from transmitting nodes that are separated by distance d are considered as desired signals, and the other signals are considered as interference signals. In the present invention, the interference from nodes on the same route (the same vertical route or the same horizontal route) is referred to as intra-route interference, the interference other than the intra-route interference is referred to as inter-route interference.

In 2DMNC1, the minimum interference distance for the intra-route interference is 3d, since this interference distance (3d) is the same level as the minimum interference distance of 1DMNC, it is possible to ignore this interference distance (3d). However, especially, when node C is a receiving node, all antennas are used to receive four desired signals from adjacent nodes, since node C receives the interference with interference distance 3d from nodes H(k±3) and nodes V(k±3) in addition to the degradation of diversity order, node C becomes a bottleneck of the network. Furthermore, in 2DMNC1 that is obtained by expanding one-dimension to two-dimension, the minimum interference distance of inter-route interference becomes $\sqrt{5}d$ and is shorter than normal interference distance 3d.

Therefore, in order to improve characteristics of the network, it is necessary to reduce the above-described intra-route interference and inter-route interference. Hereinafter, interference reduction methods for reducing the above-described interferences will be concretely described.

In the present invention, in the case of applying interference reduction methods (type A, type B and type C) to 2DMNC1, it is assumed that the transmitting/receiving node uses all of the four antennas when the transmitting/receiving is performed. With respect to a transmitting node T and its receiving node R, $W_t^T \in C^{m \cdot \tilde{m}_T}$ (in the case of $\tilde{m}_T=1$, $w_T$) represents the transmitting weight of the transmitting node T, $W_r^R \in C^{m \cdot \tilde{m}_R}$ represents the receiving weight of the receiving node R, $H^{RT} \in C^{m \cdot m}$ represents a propagation channel matrix between the transmitting node T and the receiving node R.

Where $\tilde{m}_T$ represents the number of transmission streams of the transmitting node T, and $\tilde{m}_R$ represents the number of desired signals of the receiving node R. Furthermore, in general, the transmitting weight of the transmitting node that does not join the cooperative null beamforming as will hereinafter be described in detail, becomes $W_t^T = I_{m \cdot \tilde{m}_T}$.

<12-1> Type A Interference Reduction Method

Firstly, a type A interference reduction method will be described. The type A interference reduction method is an interference reduction method for reducing the interference with interference distance 3d for node C at time slot n, that is, the minimum eigenvalue beamforming algorithm for reducing the interference with interference distance 3d for node C.

Figure 24:
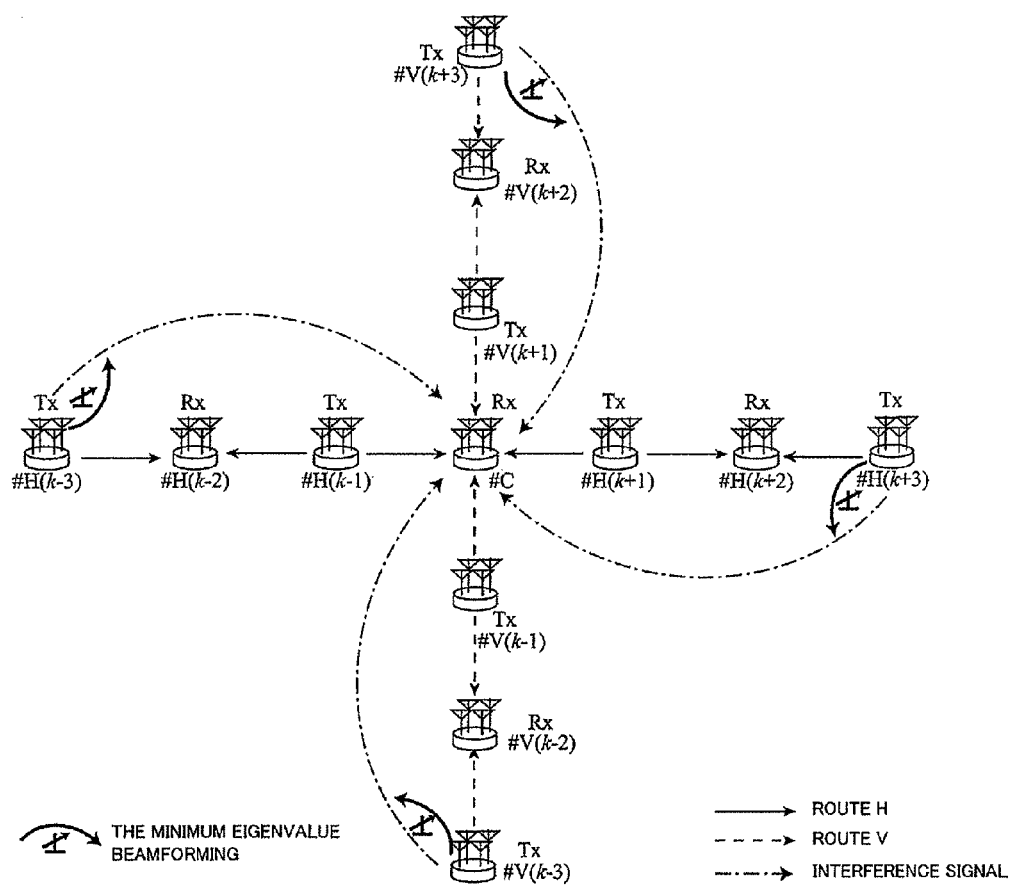
FIG. 24 is a conceptual diagram illustrating type A interference reduction method of the present invention (i.e., the minimum eigenvalue beamforming algorithm)

As shown in FIG. 24, at time slot n, since node C receives four desired signals and at the same time receives four interference signals with interference distance 3d from nodes H(k±3) and nodes V(k±3), node C becomes a bottleneck of the network.

The type A interference reduction method of the present invention (the minimum eigenvalue beamforming algorithm) reduces the interference with interference distance 3d by properly performing transmission beamforming at nodes H(k±3) and nodes V(k±3), i.e. by choosing a proper transmitting weight.

Here, with respect to node H(k−3), a transmission beam choosing method (a transmitting weight computing method) will be described. In addition, since node H(k+3) and nodes V(k±3) can perform the choice of the transmission beam by the same method as node H(k−3), transmission beam choosing methods for these nodes are omitted.

By using the singular value decomposition, an effective propagation channel matrix $\tilde{H}^{CH(k-3)}$ between node C and node H(k−3) including the receiving weight, can be represented by the following Expression 149.

$$\tilde{H}^{CH(k-3)} \triangleq W_r^{CH} H^{CH(k-3)} = U\Sigma V^H \qquad \text{[Expression 149]}$$

Where $\Sigma = \text{diag}\{\sqrt{\lambda_1}, \ldots, \sqrt{\lambda_m}\}$ holds, and $\sqrt{\lambda_i}$ ($\lambda_i \geq \lambda_{i+1}$) is the i-th singular value of $\tilde{H}^{CH(k-3)}$. Furthermore, unitary matrices $U, V \in C^{m,m}$ are the left singular matrix and the right singular matrix of $\tilde{H}^{CH(k-3)}$ respectively.

In the type A interference reduction method, the transmitting weight of node H(k−3) is set as the last column vector of the matrix V. That is to say, $w_t^{H(k-3)} = V^{(m)}$ holds. In this way, the interference power $\delta^{H(k-3)}$ from node H(k−3) to node C, is computed by the following Expression 150.

$$\delta^{H(k-3)} = \|W_r^{CH} H^{CH(k-3)} w_t^{H(k-3)}\|_2^2 = \|U\Sigma V^H V^{(m)}\|_2^2 = \lambda_m \quad \text{[Expression 150]}$$

In the case that $\tilde{H}^{CH(k-3)}$ is a full rank matrix, the interference power $\delta^{H(k-3)}$ is equivalent to square of the smallest singular value of $\tilde{H}^{CH(k-3)}$. On the other hand, in the case that $\tilde{H}^{CH(k-3)}$ is not a full rank matrix, the interference power $\delta^{H(k-3)}$ becomes zero.

<12-2> Type B Interference Reduction Method

Next, a type B interference reduction method will be described. The type B interference reduction method is a cooperative null beamforming algorithm for eliminating the interference with interference distance $\sqrt{5}d$ at time slot (n+1).

Figure 25:
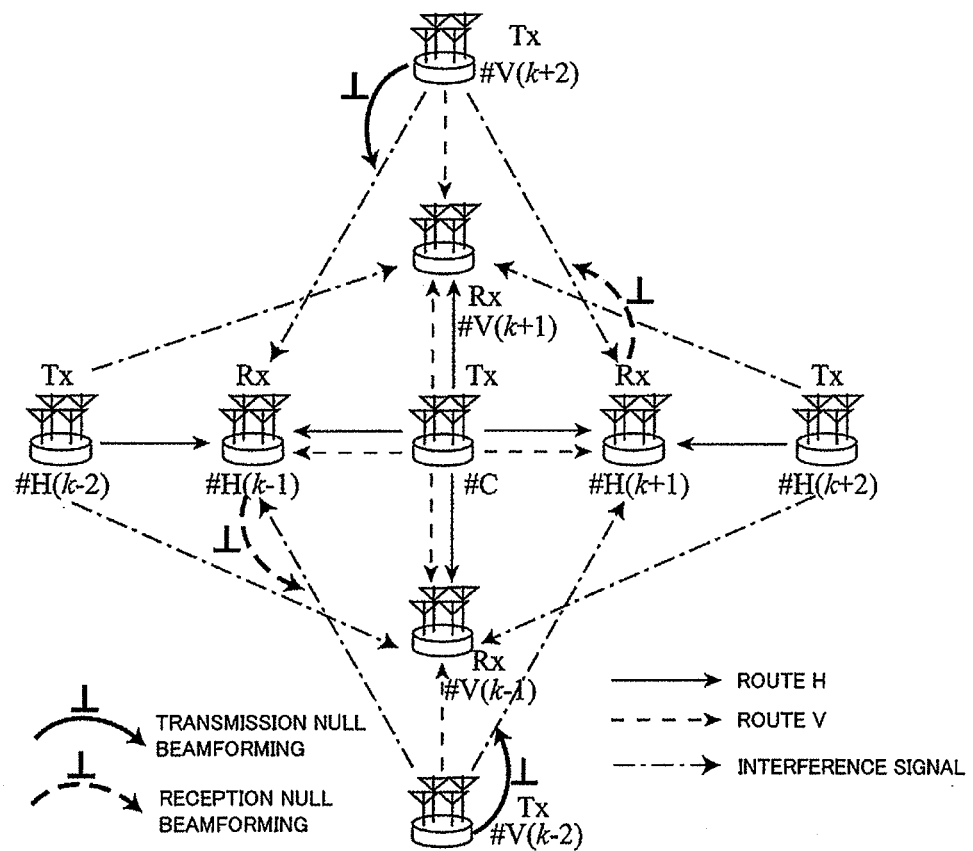
FIG. 25 is a conceptual diagram illustrating type B interference reduction method of the present invention (i.e., type B cooperative null beamforming algorithm)

As shown in FIG. 25, at time slot (n+1), node H(k−1) receives not only three desired signals from node H(k−2) and node C but also two interference signals with interference distance $\sqrt{5}d$ from nodes V(k±2). Node H(k−1) having only four antennas, can not eliminate all interference signals.

Therefore, the type B interference reduction method of the present invention eliminates the interference with interference distance $\sqrt{5}d$ by applying the cooperative null beamforming algorithm of reception null beamforming in node H(k−1) that is for the interference with interference distance $\sqrt{5}d$ from node V(k−2) and transmission null beamforming in node V(k+2) that eliminates the interference with interference distance $\sqrt{5}d$ to node H(k−1).

In addition, it goes with saying that it is possible to apply this type B interference reduction method (the above-described cooperative null beamforming algorithm) to node H(k+1).

Here, since the receiving weight for reception null beamforming in node H(k±1) and the transmitting weight for transmission null beamforming in node V(k±2) affect each other, it is necessary to sequentially obtain the receiving weight and the transmitting weight.

Here, $w_t^{V(k-2)}$ is set as the transmitting weight of node V(k−2) for eliminating the interference to node H(k+1). In this case, in order to partially eliminate the interference from node V(k−2), node H(k−1) computes the MMSE receiving weight $W_r^{H(k-1)}$ base on the following Expression 151.

$$W_r^{H(k-1)} = (E[y^{H(k-1)} y^{H(k-1)H}])^{-1} [H_{(1)}^{H(k-1)C} \quad H_{(2)}^{H(k-1)C} H_{(1)}^{H(k-1)H(k-2)}] \quad \text{[Expression 151]}$$

Where $y^{H(k-1)}$ is the receiving signal vector of node H(k−1) that depends on $w_t^{V(k-2)}$. The MMSE receiving weight computed by the above Expression 151, is the Wiener solution.

Concretely, $[H_{(1)}^{H(k-1)C} H_{(2)}^{H(k-1)C} H_{(1)}^{H(k-1)H(k-2)}]$ the expectation of the desired signals at node H(k−1). Furthermore, $E[y^{H(k-1)} y^{H(k-1)H}]$ is the covariance matrix of the received signal and can be represented by the following interference channel matrix.

$$E[y^{H(k-1)} y^{H(k-1)H}] = P\Sigma_{transmit\ node\ T} H^{H(k-1)T} w_t^T w_t^{TH} H^{H(k-1)TH} + \sigma^2 I \quad \text{[Expression 152]}$$

Next, the transmitting weight $w_t^{V(k+2)}$ of node V(k+2) for eliminating the interference to node H(k−1), is computed by the following Expression 153.

$$w_t^{V(k+2)} = \text{null}(W_r^{H(k-1)H} H^{H(k-1)V(k+2)}) \quad \text{[Expression 153]}$$

By using the computed transmitting weight $w_t^{V(k+2)}$ of node V(k+2), similarly, the MMSE receiving weight $W_r^{H(k+1)}$ of node H(k+1) is computed base on the following Expression 154.

$$W_r^{H(k+1)} = (E[y^{H(k+1)} y^{H(k+1)H}])^{-1} [H_{(1)}^{H(k+1)C} \quad H_{(2)}^{H(k+1)C} H_{(1)}^{H(k+1)H(k+2)}] \quad \text{[Expression 154]}$$

And then, the transmitting weight $w_t^{V(k-2)}$ of node V(k−2) is computed base on the following Expression 155.

$$w_t^{V(k-2)} = \text{null}(W_r^{H(k+1)H} H^{H(k+1)V(k-2)}) \quad \text{[Expression 155]}$$

The type B cooperative null beamforming algorithm of the present invention (the type B interference reduction method), computes the above-described transmitting weight and receiving weight by the sequential step. That is to say, the type B cooperative null beamforming algorithm comprises step B1, step B2, step B3 and step B4.

Step B1 (Initialization Process)

The transmitting weight $w_t^{V(k-2)}$ of node V(k−2) and an initial value of threshold $\Delta$ are set. Where $\Delta$ is a proper threshold for stopping the computation loop (the iterative process).

Step B2 (Cooperative Nulling)

The MMSE receiving weight $W_r^{H(k-1)}$ of node H(k−1), the transmitting weight $w_t^{V(k+2)}$ of node V(k+2), the MMSE receiving weight $W_r^{H(k+1)}$ of node H(k+1) and the transmitting weight $w_t^{V(k-2)}$ of node V(k−2) are computed based on the following expressions respectively.

$$W_r^{H(k-1)} = (E[y^{H(k-1)} y^{H(k-1)H}])^{-1} [H_{(1)}^{H(k-1)C} \quad H_{(2)}^{H(k-1)C} H_{(1)}^{H(k-1)H(k-2)}] \quad \text{[Expression 156]}$$

$$w_t^{V(k+2)} = \text{null}(W_r^{H(k-1)H} H^{H(k-1)V(k+2)}) \quad \text{[Expression 157]}$$

$$W_r^{H(k+1)} = (E[y^{H(k+1)} y^{H(k+1)H}])^{-1} [H_{(1)}^{H(k+1)C} \quad H_{(2)}^{H(k+1)C} H_{(1)}^{H(k+1)H(k+2)}] \quad \text{[Expression 158]}$$

$$w_t^{V(k-2)} = \text{null}(W_r^{H(k+1)H} H^{H(k+1)V(k-2)}) \quad \text{[Expression 159]}$$

Step B3 (Computing the Interference Power)

The interference power $\delta^{H(k-1)}$ from nodes V(k±2) to node H(k−1) and the interference power $\delta^{H(k+1)}$ from nodes V(k±2) to node H(k+1) are computed based on the following expressions respectively.

$$\delta^{H(k-1)} = \|W_r^{H(k-1)H} \Sigma H^{H(k-1)V(k\pm2)} w_t^{V(k\pm2)}\|_2^2 \quad \text{[Expression 160]}$$

$$\delta^{H(k+1)} = \|W_r^{H(k+1)H} \Sigma H^{H(k+1)V(k\pm2)} w_t^{V(k\pm2)}\|_2^2 \quad \text{[Expression 161]}$$

Step B4

The process of step B2 and step B3 is repeated until $\delta^{H(k\pm1)} \leq \Delta$.

In addition, in order to eliminate the interference with interference distance $\sqrt{5}d$ at nodes V(k±1), with respect to nodes H(k±2) and nodes V(k±1), just applying the above-described type B cooperative null beamforming algorithm.

<12-3> Type C Interference Reduction Method

Next, a type C interference reduction method will be described. The type C interference reduction method is a cooperative null beamforming algorithm for eliminating the interference with interference distance $\sqrt{5}d$ at time slot n.

Figure 26:
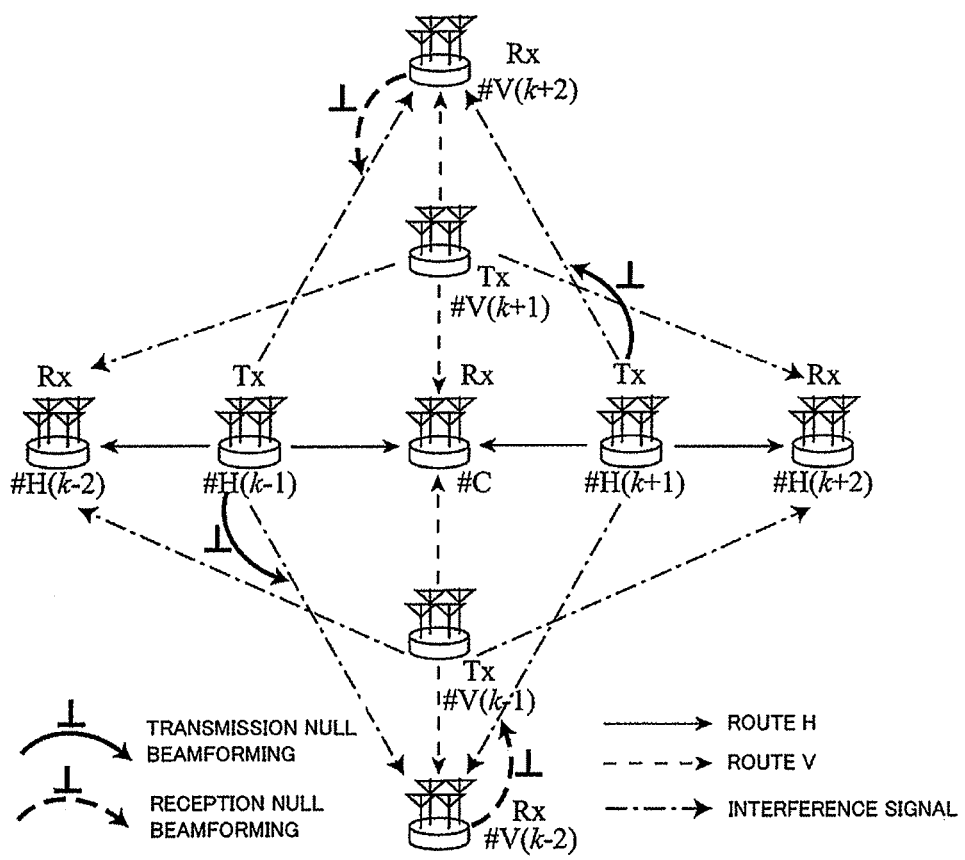
FIG. 26 is a conceptual diagram illustrating type C interference reduction method of the present invention (i.e., type C cooperative null beamforming algorithm)

As shown in FIG. 26, at time slot n, node V(k+2) receives not only desired signals from node V(k+1) and node V(K+3) but also the interference signal with interference distance $\sqrt{5}d$ from node H(k+1). Although node V(k+2) having four antennas can eliminate the interference signal by itself, a problem that the diversity order of the desired signals degrades occurs.

Therefore, the type C interference reduction method of the present invention resolves the above-described degradation problem of the diversity order of the desired signals at node V(k+2) by applying the principle of the above-described type B cooperative null beamforming algorithm to nodes H(k±1) and nodes V(k±2).

The type C cooperative null beamforming algorithm of the present invention (the type C interference reduction method), computes transmitting weights and receiving weights of nodes H(k±1) and nodes V(k±2) by the sequential step. That is to say, the type C cooperative null beamforming algorithm comprises step C1, step C2, step C3 and step C4.

Step C1 (Initialization Process)

The transmitting weight $w_t^{H(k-1)}$ of node H(k−1) and an initial value of threshold $\Delta$ are set. Where $\Delta$ is a proper threshold for stopping the computation loop (the iterative process).

Step C2 (Cooperative Nulling)

The MMSE receiving weight $W_r^{V(k+2)}$ of node V(k+2), the transmitting weight $w_t^{H(k+1)}$ of node H(k+1), the MMSE receiving weight $W_r^{V(k-2)}$ of node V(k−2) and the transmitting weight $w_t^{H(k-1)}$ of node H(k−1) are computed based on the following expressions respectively.

$$W_r^{V(k+2)} = (E[y^{V(k+2)} y^{V(k+2)H}])^{-1} [H_{(1)}^{V(k+2),V(k+1)} H_{(1)}^{(k+2),V(k+3)}]$$ [Expression 162]

$$w_t^{H(k+1)} = \mathrm{null}(W_r^{V(k+2)H} H^{V(k+2),H(k+1)})$$ [Expression 163]

$$W_r^{V(k-2)} = (E[y^{V(k-2)} y^{V(k-2)H}])^{-1} [H_{(1)}^{V(k-2),V(k-1)} H_{(1)}^{(k-2),V(k-3)}]$$ [Expression 164]

$$w_t^{H(k-1)} = \mathrm{null}(W_r^{V(k-2)H} H^{V(k-2),H(k-1)})$$ [Expression 165]

Step C3 (Computing the Interference Power)

The interference power $\delta^{V(k+2)}$ from nodes H(k±1) to node V(k+2) and the interference power $\delta^{V(k-2)}$ from nodes H(k±1) to node V(k−2) are computed based on the following expressions respectively.

$$\delta^{V(k+2)} = \|W_r^{V(k+2)H} \Sigma H^{V(k+2),H(k\pm1)} w_t^{H(k\pm1)}\|_2^2$$ [Expression 166]

$$\delta^{V(k-2)} = \|W_r^{V(k-2)H} \Sigma H^{V(k-2),H(k\pm1)} w_t^{H(k\pm1)}\|_2^2$$ [Expression 167]

Step C4

The process of step C2 and step C3 is repeated until $\delta^{V(k\pm2)} \leq \Delta$.

In addition, in order to resolve the degradation problem of the diversity order of the desired signals at node H(k+2), with respect to nodes V(k±1) and nodes H(k±2), just apply the above-described type C cooperative null beamforming algorithm.

<12-4> Node Device Comprising Cooperative Null Beamforming Function

Here, a node device comprising the cooperative null beamforming function of the present invention that can be used in a two-dimensional multi-hop communication system having a cross type network topology according to the present invention, will be described.

Figure 27:
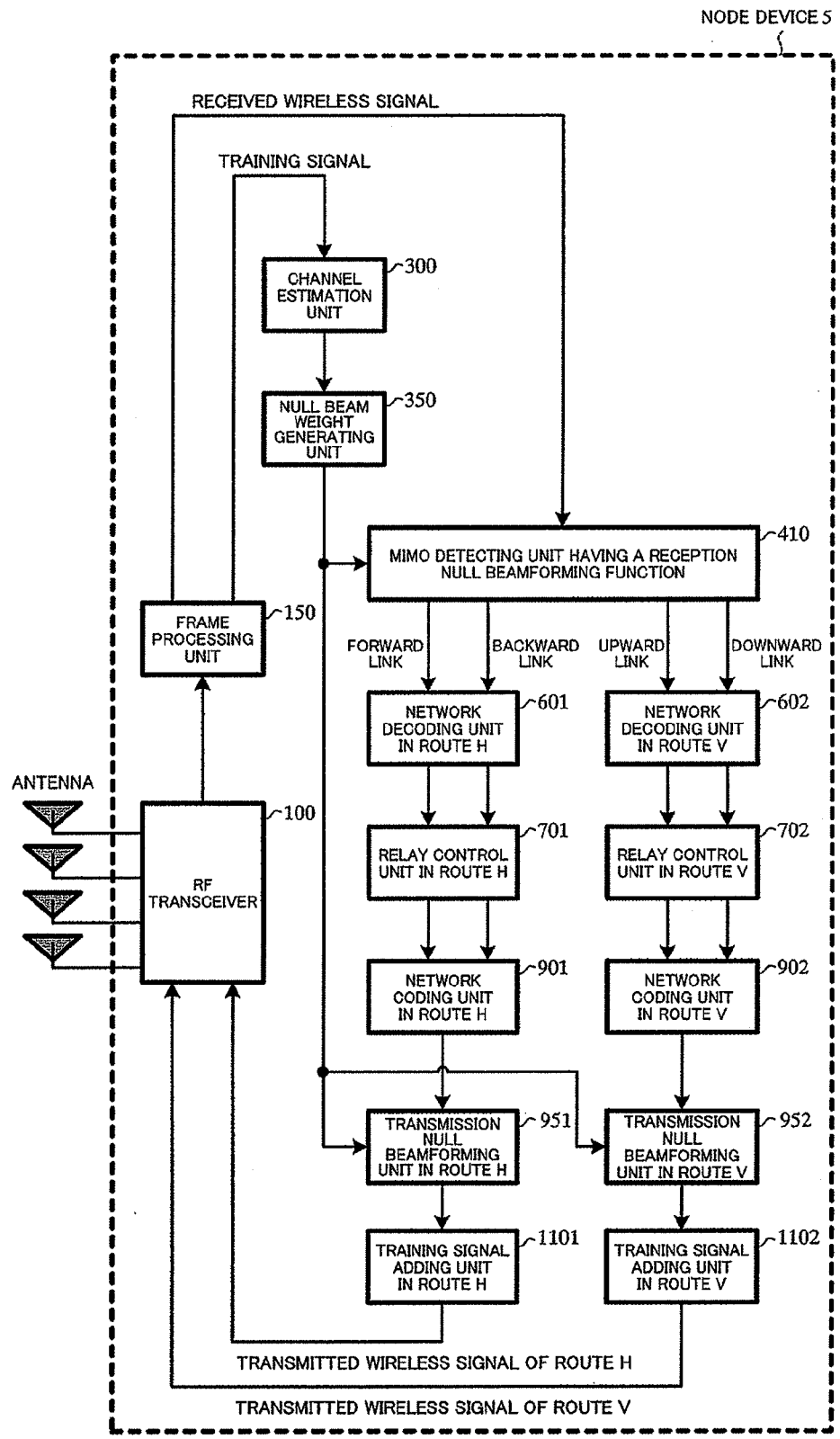
FIG. 27 is a block diagram showing the configuration of a node device that is configured by adding the cooperative null beamforming function to the node device as shown in FIG. 16.
Figure 28:
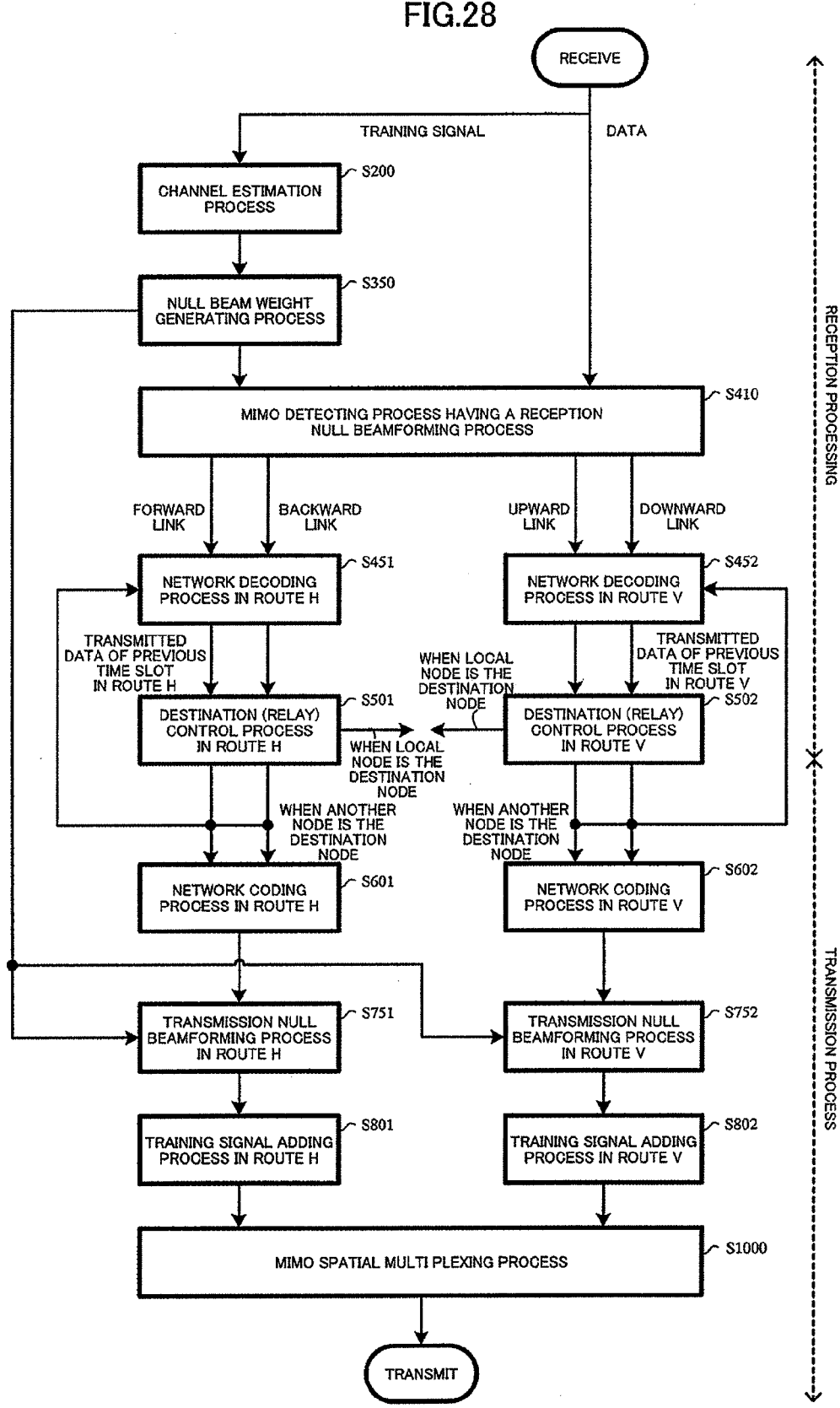
FIG. 28 is a flowchart showing a processing sequence of the node device shown in FIG. 27.

FIG. 27 is a block diagram showing the configuration of a node device that is configured by adding the cooperative null beamforming function of the present invention to the node device shown in FIG. 16. Furthermore, FIG. 28 is a flowchart showing a processing sequence of the node device shown in FIG. 27. The node device 5 shown in FIG. 27, can be used in a two-dimensional multi-hop communication system having a cross type network topology according to the present invention.

The node device 5 is a node device that is configured by adding the cooperative null beamforming function of the present invention described in <12-2> and <12-3> to the node device 3. It is clear by comparison with the node device 3 shown in FIG. 16 that the configuration and processing of the node device 5 is basically the same as the node device 3 except for the cooperative null beamforming function.

The cooperative null beamforming function in the node device 5, that is, the null beam weight generating process, the reception null beamforming process, the transmission null beamforming process in route H and the transmission null beamforming process in route V, are performed based on the above-described type B cooperative null beamforming algorithm or the above-described type C cooperative null beamforming algorithm.

<12-5> Further Discussion of the Cooperative Null Beamforming Algorithm

In the above-described cooperative null beamforming algorithm of the present invention, it is necessary to exchange channel information between nodes, transmitting weights and receiving weights. Realizing these processes in real time, is difficult.

However, in the backbone network, by using a property that the time-variant of propagation channel is not intense and the fast convergence of the sequential transmitting/receiving weight computation that is clear from the simulation results, in order to realize the cooperative null beamforming algorithm, it can be broadly divided into two stages.

<12-5-1> Initial Stage

In the initial stage, in the case of deploying the network, it is assumed that the propagation channel is static. That is to say, during performing the processing that will hereinafter be described, the time-variant of all propagation channels does not occur. Furthermore, in order to establish the transmitting weight and the receiving weight of each node in the initial stage, the transmitting/receiving of only preamble signals for estimating the propagation channel is performed without performing the data transmission. Furthermore, in order to extinguish each node, all preamble signals are orthogonal.

It is assumed that the initial transmitting/receiving state of the network is the time slot n shown in FIG. 26 without loss of generality. The initial transmitting weight of each transmitting node is the first column of the unitary matrix. Here, we pay attention to nodes H(k±1) and nodes V(k±2) and describe. Nodes V(k±2) that receive surrounding signals, estimate the propagation channel form the preamble signal and compute the assumed receiving weight.

At the next time slot (n+1), nodes V(k±1) become transmitting nodes, and add the preamble signal multiplied by the assumed receiving weight and transmit it after its preamble signal. In this case, nodes H(k±1) become receiving nodes, as shown in FIG. 25, even the cooperative null beamforming is realized, node H(k+1) (or node H(k−1)) can receive the signal from node V(k+2) (or node V(k−2)).

From the received preamble signal, as the above Expression 163 (or the above Expression 165), node H(k+1) (or node H(k−1)) updates the transmitting weight so as not to give the interference to node V(k+1) (or node V(k−1)) and multiplies the preamble signal and transmit it. By performing this loop several times, the cooperative null beamforming weight of the transmitting/receiving node is realized.

<12-5-2> Operation Stage

In the operation stage, it is also assumed that the variability of the propagation channel is low. In order to keep the cooperative null beamforming for the tiny variant of the propagation channel, there are two methods.

One method is a method that processing such the initial stage is always performed. However, the transmission data is added in behind the preamble signal. Another method is a method that with respect to the node that joins the cooperative null beamforming, one part of the time slot is used for monitoring the interference and the amount of the interference is fed back to the transmitting node. From the transmitting/receiving periodicity, realizing this feedback is not difficult. The transmitting node performs an adaptive signal processing based on the amount of the feedback, and keeps the quasi-optimal transmitting weight. This technique is referred to as tracking.

<13> Numerical Analysis

The inventors of the present invention conducted numerical simulations and verified the effectiveness of each two-dimensional MIMO network coding scheme according to the present invention. In the simulation, the average signal to noise ratio (SNR) per stream between all adjacent nodes is the same. That is to say, all signal streams are transmitted with equal power.

Furthermore, since the total number of signal streams and the total number of nodes in the network are different, for a fair comparison, the transmitting power $\alpha_i$ of each stream is normalized by the following Expression 168.

$$\alpha_i(\forall i) = \begin{cases} \dfrac{4K+1}{4K+2} & (2DMNC1) \\ \dfrac{4K}{4K+2} & (2DMNC2) \end{cases} \quad \text{[Expression 168]}$$

Where the numerator and denominator of the above Expression 168, represent the number of nodes and the total number of spatial streams transmitted within two time slot cycle, respectively. Furthermore, the propagation channel is assumed to be a flat Rayleigh fading channel. Moreover, the propagation environment is quasi-static, that is to say, is assumed that the propagation channel does not change during a period of one time slot.

As the target of comparison with each two-dimensional MIMO network coding scheme according to the present invention, the following scheme 1, scheme 2 and scheme 3 are discussed.

<Scheme 1>:
a multichannel single directional SISO mesh network using 4 channels in each route ($\beta=\frac{1}{8}$, FIG. 10(*a*), the number of antennas per node is 1), that is, a conventional multichannel SISO (8 channels)

<Scheme 2>:
a multichannel MIMO mesh network using 4 channels in each route ($\beta=\frac{1}{8}$, FIG. 10(*a*), the number of antennas per node is 4), that is, a conventional multichannel link by link MIMO mesh network (8 channels)

<Scheme 3>:
a bi-directional MIMO mesh network using one-dimensional MIMO network coding with single channel in each route ($\beta=\frac{1}{2}$, FIG. 10(*b*), the number of antennas per node is 4), that is, the one-dimensional MIMO network coding 1DMNC of the present invention (2 channels)

Furthermore, as the value used in the evaluation, the end-to-end transmission capacity of the network is used. The end-to-end transmission capacity is computed as follows.

Firstly, an index of a specific desired signal of a receiving node R is set as p. Where, the index p is a global index among signal streams of the whole network at a time slot when the receiving node R becomes a receiving state. From the propagation channel matrix, the transmitting weight of each transmitting node and the receiving weight of the receiving node R itself, it is possible to easily compute the instantaneous transmission capacity $C_p^R$ of the desired signal $s_p$. If node R belongs to $\Omega_{[\square]}$ of Table 1, the global index $p_{[\square]}$ that $s_{p_{[\square]}}$ becomes the desired signal of [$\square$] of node R, exists. Where [$\square$] is a denotation that represents F, B, D and U as a whole.

Therefore, it is possible to compute $C_{p_{[\square]}}^R$. In this way, the end-to-end transmission capacity of the forward flow, the backward flow, the downward flow and the upward flow can be computed by the following Expression 169 to Expression 172.

$$C_F^{e2e} = \min_{R \in \Omega_F} E[C_{p_F}^R] \quad \text{[Expression 169]}$$

$$C_B^{e2e} = \min_{R \in \Omega_B} E[C_{p_B}^R] \quad \text{[Expression 170]}$$

$$C_D^{e2e} = \min_{R \in \Omega_D} E[C_{p_D}^R] \quad \text{[Expression 171]}$$

$$C_U^{e2e} = \min_{R \in \Omega_U} E[C_{p_U}^R] \quad \text{[Expression 172]}$$

That is to say, the end-to-end transmission capacity of a certain flow means the minimum value of the average transmission capacity of nodes on the said certain flow.

Based on the above end-to-end transmission capacity of each flow, the average end-to-end transmission capacity per flow $C^{e2e}$ is computed by the following Expression 173.

$$C^{e2e} = \beta \frac{C_F^{e2e} + C_B^{e2e} + C_D^{e2e} + C_U^{e2e}}{4} \; [bps/\text{Hz/flow}] \quad \text{[Expression 173]}$$

<13-1> In the Case that the Long Distance Interference does not Exist

Figure 29:
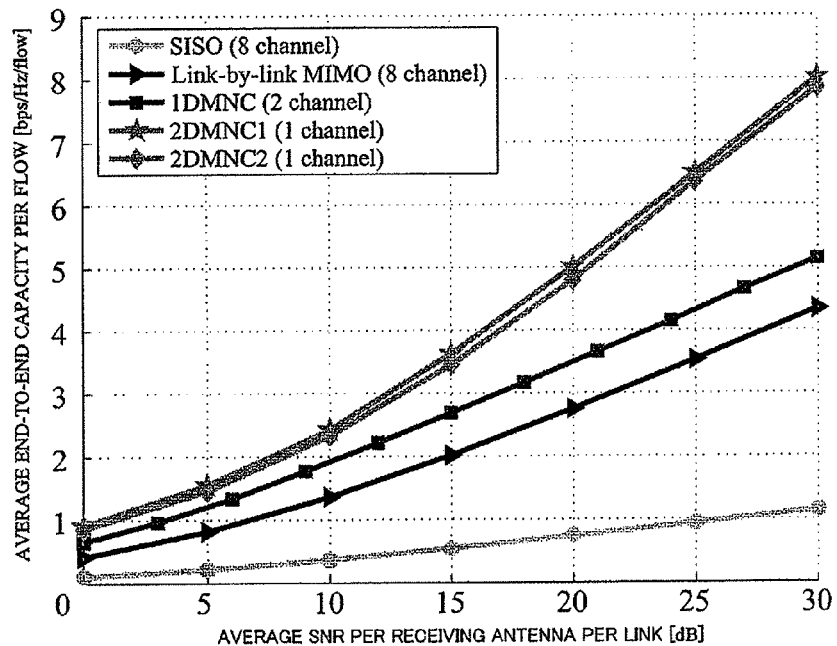
FIG. 29 is a graph showing the relation between the average end-to-end capacity and the SNR in the case that the long distance interference does not exist.

FIG. 29 shows the average end-to-end transmission capacity per flow of each conventional scheme and the present invention. It is clear from FIG. 29 that the performance of the multichannel SISO is the worst due to the inefficiency in usage of time and frequency resources. Furthermore, it is clear from FIG. 29 that this resource inefficiency of the multichannel SISO can be improved by the introduction of MIMO into each link owing to benefit of spatial multiplexing. Overmore, it can be confirmed from FIG. 29 that the characteristic of the multichannel MIMO is improved four times or more in comparison with the multichannel SISO.

The introduction of network coding is also one means that improves the resource efficiency. It is clear from FIG. 29 that the two-dimensional mesh network of the present invention employing one-dimensional MIMO network coding realizes the improvement of 1 bps/Hz per flow than the multichannel MIMO.

And then, it is very obvious from FIG. 29 that the transmission capacity characteristic of each two-dimensional MIMO network coding scheme of the present invention is the best.

Each two-dimensional MIMO network coding scheme of the present invention achieves the transmission capacity improvement of about eight times than the multichannel SISO owe to being able to use space, time and frequency resources efficiently. However, a slight difference of the characteristic between 2DMNC1 and 2DMNC2 is caused by the difference of the normalized power given by the above Expression 168. In the case of considering a system with total bandwidth 5 MHz at SNR=30 dB, the equivalent network transmission capacity are 24 Mbps (the multichannel SISO), 88 Mbps (the multichannel MIMO) and 164 Mbps (the two-dimensional MIMO network coding).

<13-2> In the Case that the Long Distance Interference Exists

Figure 30:
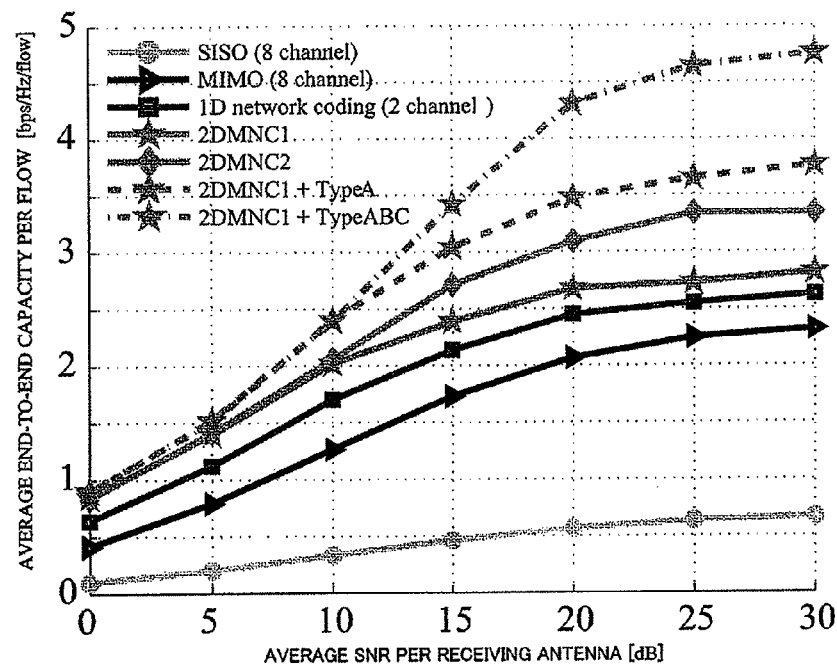
FIG. 30 is a graph showing the relation between the average end-to-end capacity and the SNR in the case that the long distance interference exists.

In some certain propagation environments that lack shadowing obstacles, it is hard to ignore the influence of the long distance interference. FIG. 30 shows the end-to-end transmission capacity characteristic of a propagation environment with an attenuation coefficient $\gamma=3.5$.

It is clear from FIG. 30 that in the case that the influence of the long distance interference can not be ignored, the transmission capacity characteristics of all the schemes degrade. However, even in such an environment, it can be confirmed that the transmission capacity characteristics of the present invention are superior to other schemes.

Base on FIG. 30, results after the introduction of each cooperative null beamforming algorithm with respect to 2DMNC1 will be described.

Firstly, by introducing the minimum eigenvalue beamforming algorithm for reducing the interference with interference distance 3d for node C (the type A interference reduction method), the transmission capacity is improved by 1 bps/Hz/flow at high SNR area.

Furthermore, as the effect of further introducing the cooperative null beamforming algorithm for reducing the interference with interference distance $\sqrt{5}d$ (the type B interference reduction method and the type C interference reduction method), finally, the present invention can increase the end-to-end transmission capacity to 5 bps/Hz/flow.

Although we concretely described the two-dimensional multi-hop communication systems according to the present invention that employ the two-dimensional MIMO network coding as described above by using the above-described multiple embodiments, the present invention is not limited to these embodiments.

In the embodiments of the present invention as described above, with respect to the MIMO detecting process, although the Zero Forcing (ZF) algorithm and the MMSE algorithm are used in MIMO reception as concrete examples, the present invention is not limited to these algorithms, it is also possible to apply any MIMO detecting scheme (any MIMO detecting process) such as a scheme described in Non-Patent Document 10.

Furthermore, in the embodiments of the present invention as described above, although the network coding process is performed based on specific expressions, the network coding process of the present invention is not limited to the arithmetic processing based on these specific expressions, of course it is also possible to apply the network coding process based on other arithmetic processes to the present invention.

Moreover, in the embodiments of the present invention as described above, although the network decoding process is performed based on specific expressions, the network decoding process of the present invention is not limited to the arithmetic processing based on these specific expressions, of course it is also possible to apply the network decoding process based on other arithmetic processes to the present invention.

INDUSTRIAL APPLICABILITY

According to the multi-hop wireless communication system of the present invention that employs the one-dimensional MIMO network coding, a superior advantage that by combining STBC broadcast and MIMO multiple access into network coding, it is possible to easily realize a highly-efficient and highly reliable bi-directional wireless relay transmission that multiplexes a forward link and a backward link in all links, is achieved.

In the one-dimensional MIMO network coding of the present invention, since the transmitting node (in the case that the node is in the transmitting state) performs the transmitting-interference avoidance for signals within the node and the receiving node (in the case that the node is in the receiving state) performs the receiving-interference avoidance between nodes, it is possible to perform communications without interference from adjacent nodes.

That is to say, according to the multi-hop wireless communication system of the present invention that employs the one-dimensional MIMO network coding, a distinguished function effect that the co-channel interference that is the problem of conventional multi-hop wireless networks is avoided and at the same time the bi-directional transmission is realized with two antennas, is achieved.

In order to realize the link multiplexing and the interference avoidance of adjacent nodes, in the MIMO multi-hop/mesh network disclosed in Non-Patent Document 6, as described above, the necessary number of antennas per node is at least three, on the other hand, in the multi-hop wireless communication system of the present invention, two antennas are enough. According to the present invention employing the one-dimensional MIMO network coding, it is possible to reduce the number of antennas.

Furthermore, in the MIMO multi-hop/mesh network disclosed in Non-Patent Document 6, the transmitting node and the receiving node need the channel information, and the feedback of the channel information is necessary, thus the processing becomes complex, on the other hand, in the multi-hop wireless communication system of the present invention, only in the case that the node is in the receiving state, that is, only the receiving node needs the channel information, and the feedback of the channel information is unnecessary, thus the processing does not become complex.

Especially, according to the present invention, a superior advantage that by further applying the space time block coding (STBC) scheme to the network coded received signal at each relay node, both a blind MIMO reception diversity and a large-capacity and highly reliable multi-node communication are realized, is also achieved.

Furthermore, as an achievement of their further research, inventors of the present invention invented the "two-dimensional MIMO network coding" technique that is applied to a wireless mesh network having a two-dimensional mesh topology, by expanding the "one-dimensional MIMO network coding" technique that is applied to a wireless mesh network having a one-dimensional topology.

According to multi-hop wireless communication systems (MIMO wireless mesh networks) that are obtained by applying the two-dimensional MIMO network coding of the present invention to two-dimensional mesh topologies such as cross type topology, rotary type topology and tree type topology, a very superior advantage that by deploying MIMO nodes equipped with 4 or more antenna elements, the highly-efficient two-dimension bi-directional multi-hop network using a single channel is realized, is achieved.

Furthermore, according to the multi-hop wireless communication system (2DMNC1) that is obtained by applying the two-dimensional MIMO network coding of the present invention to cross type topology, the present invention's own and distinguished function effect that by using redundant antennas of the relay node near the intersection, it becomes possible to also apply the cooperative null beamforming that avoids the transmitting interference and the receiving interference between routes and to the intersection, the further improvement of efficiency is realized, is achieved.

In the numerical analysis by simulations, the effectiveness of each two-dimensional MIMO network coding scheme of the present invention is verified. It is very clear from simulation results that according to each two-dimensional MIMO network coding scheme of the present invention, the end-to-end transmission capacity of the network is drastically increased by comparison with conventional schemes.

Furthermore, even in an environment that the influence of the long distance interference can not be ignored, by applying the cooperative null beamforming algorithm of the present invention, it is possible to drastically improve the end-to-end transmission capacity.

THE LIST OF REFERENCES

Non-Patent Document 1

I. F. Akyildiz and Wang Xudong, "A survey on wireless mesh networks", IEEE Communications Magazine, Vol. 43, p. S23-S30, September 2005.

Non-Patent Document 2

E. van der Meulen, "A survey of multi-way channels in information theory: 1961-1976", IEEE Trans. Inf. Theory, Vol. 23, p. 1-37, January 1977.

Non-Patent Document 3

R. Ahlswede, N. Cai, S.-Y. R. Li and R. W. Yeung, "Network information flow", IEEE Trans. Inf. Theory, Vol. 46, p. 1204, July 2000.

Non-Patent Document 4

P. Popovski and H. Yomo, "Physical Network Coding in Two-Way Wireless Relay Channels", IEEE International Conference on Communications (ICC'07), p. 707-712, June 2007.

Non-Patent Document 5

V. Tarokh, H. Jafarkhani and A. R. Calderbank, "Space time block Coding from orthogonal designs", IEEE Trans. Inf. Theory, Vol. 45, No. 5, p. 1456-1467, July 1999.

Non-Patent Document 6

F. Ono and K. Sakaguchi, "MIMO Spatial Spectrum Sharing for High Efficiency Mesh Network, IEICE Transactions, Vol. E91-B, p. 62-69, January 2008.

Non-Patent Document 7

S. M. Alamouti, "A simple transmitter diversity scheme for wireless communications", IEEE Journal on Selected Area in Communications, Vol. 16, p. 1451-1458, October 1998.

Non-Patent Document 8

Hamid Jafarkhani, "A Quasi-Orthogonal Space-Time Block Code", IEEE TRANSACTIONS ON COMMUNICATIONS, Vol. 49, No. 1, p. 1-4, January 2001.

Non-Patent Document 9

Ning Yang and Masoud Salehi, "A New Full Rate Space Time Block Code for Three Transmit Antenna Systems", Vehicular Technology Conference, 2006. VTC-2006 Fall 2006 IEEE 64th, p. 1-5, September 2006.

Non-Patent Document 10

Arqvaswami Paulraj, Rohit Nabar and Ghananjay Gore, "Introduction to Space-Time Wireless Communications", Cambridge University Press, 2003.

What is claimed is:

1. A two-dimensional multi-hop wireless communication system comprising:
multiple node devices, each node device of the multiple node devices including multiple input multiple output (MIMO) antennas, such that each of the node devices is capable of performing a relay function via the MIMO antennas, so as to form the two-dimensional multi-hop wireless communication system from wireless links between the node devices,
wherein the two-dimensional multi-hop wireless communication system applies a multiple input multiple output (MIMO) scheme to a transmission/reception scheme of network coding,
wherein the two-dimensional multi-hop wireless communication system applies a space time block coding (STBC) scheme by combining a STBC broadcast and MIMO multiple access into the network coding, so as to create a bi-directional wireless relay transmission that multiplexes a forward link and a backward link in all of the wireless links formed by the node devices,
wherein each of the node devices performs transmission/reception processing and a relay transmission of data, and
wherein a multi-hop relay of a two-dimension bi-directional flow with a single channel is created by applying the network coding to the multiple node devices.

2. A two-dimensional multi-hop wireless communication system comprising:
multiple node devices, each node device of the multiple node devices including multiple input multiple output (MIMO) antennas, such that each of the node devices is capable of performing a relay function via the MIMO antennas, so as to form the two-dimensional multi-hop wireless communication system from wireless links between the node devices,
wherein the two-dimensional multi-hop wireless communication system applies a multiple input multiple output (MIMO) scheme to a transmission/reception scheme of network coding, so as to create a bi-directional wireless relay transmission that multiplexes a forward link and a backward link in all of the wireless links formed by the node devices,
wherein each of the node devices performs transmission/reception processing and a relay transmission of data, and
wherein a multi-hop relay of a two-dimension bi-directional flow with a single channel is created by applying the network coding to the multiple node devices.

3. A multi-hop wireless communication system comprising:
multiple node devices, each node device of the multiple node devices including multiple input multiple output (MIMO) antennas, such that each of the node devices is capable of performing a relay function via the MIMO antennas, so as to form the multi-hop wireless communication system from forward links and backward links between the node devices,
wherein the multi-hop wireless communication system applies a multiple input multiple output (MIMO) scheme to a transmission/reception scheme of network coding,
wherein the multi-hop wireless communication system applies a space time block coding (STBC) scheme,
wherein each of the node devices comprises:
a STBC reception data generating unit configured to perform a STBC reception data generating process to generate STBC reception data from received wireless signals wirelessly received via the MIMO antennas;

a STBC channel matrix generating unit configured to perform a STBC channel matrix generating process to generate a STBC equivalent channel matrix from channel information estimated from training signals wirelessly received via the MIMO antennas;

a MIMO detecting unit configured to perform a MIMO detecting process to estimate estimation symbols from the generated STBC equivalent channel matrix and the generated STBC reception data;

a network decoding unit configured to perform a network decoding process to generate relay signals, which are two consecutive symbols to the forward link and the backward link, from the estimated estimation symbols;

a relay control unit configured to perform a destination control process;

a network coding unit configured to perform a network coding process of two consecutive transmitting symbols to generate two consecutive transmitting signals from the generated relay signals;

a STBC transmission data generating unit configured to perform a STBC transmission data generating process to generate STBC transmission data from the transmitting signals generated by the network coding unit; and a training signal adding unit configured to add the training signals to the generated STBC transmission data and to perform a training signal adding process, wherein the STBC transmission data, to which the training signals are added is transmitted as transmitted wireless signals, wherein the relay control unit performs the destination control process that determines that either the generated relay signals are signals for a local node device or that the generated relay signals are signals for another node device, wherein, in a case where the relay control unit determines that the generated relay signals are signals for the local node device, the processing of the node device is finished, wherein, in a case where the relay control unit determines that the relay signals are signals for the another node device, in order to perform a network decoding process at a next time slot, the relay control unit stores the generated relay signals as the transmitted data of a previous time slot, wherein the MIMO detecting process uses a ZF algorithm or a MMSE algorithm in MIMO reception, wherein, with respect to the node devices of the multi-hop wireless communication system, in a case where a (k−1)-th node and a (k+1)-th node are transmitting nodes, two consecutive transmitting signals $s_1^{k-1}, s_2^{k-1}$ of the (k−1)-th node are modeled respectively by using the following two expressions, $$s_1^{k-1} = s_{F1}^{k-1} + s_{B1}^{k-1} \mod q$$

$$s_2^{k-1} = s_{F2}^{k-1} + s_{B2}^{k-1} \mod q, \text{ and}$$

wherein, two consecutive transmitting signals $s_1^{k+1}, s_2^{k+1}$ of the (k+1)-th node are modeled respectively by using the following two expressions, $$s_1^{k+1} = s_{F1}^{k+1} + s_{B1}^{k+1} \mod q$$

$$s_2^{k+1} = s_{F2}^{k+1} + s_{B2}^{k+1} \mod q,$$

where $s_{F1}^{k-1}, s_{F2}^{k-1}$ are two consecutive transmitting symbols for the forward link of the (k−1)-th node, $s_{B1}^{k-1}, s_{B2}^{k-1}$ are two consecutive transmitting symbols for the backward link of the (k−1)-th node, $s_{F1}^{k+1}, s_{F2}^{k+1}$ are two consecutive transmitting symbols for the forward link of the (k+1)-th node, $s_{B1}^{k+1}, s_{B2}^{k+1}$ are two consecutive transmitting symbols (transmitting signal) for the backward link of the (k+1)-th node, and q is a lattice size of lattice coding.

4. The multi-hop wireless communication system according to claim 3, wherein in the STBC transmission data generating unit, with respect to the (k−1)-th node, by using two consecutive transmitting signals $s_1^{k-1}, s_2^{k-1}$, based on $$X^{k-1} = \begin{bmatrix} s_1^{k-1} & -(s_2^{k-1})^* \\ s_2^{k-1} & (s_1^{k-1})^* \end{bmatrix},$$

STBC transmission data (a transmitting signal matrix $X^{k-1}$ for a first time slot and a second time slot) including four transmitting symbols for two time slots is generated, and with respect to the (k+1)-th node, by using two consecutive transmitting signals $s_1^{k+1}, s_2^{k+1}$, based on $$X^{k+1} = \begin{bmatrix} s_1^{k+1} & -(s_2^{k+1})^* \\ s_2^{k+1} & (s_1^{k+1})^* \end{bmatrix},$$

STBC transmission data (a transmitting signal matrix $X^{k+1}$ for the first time slot and the second time slot) including four transmitting symbols for two time slots is generated.

5. The multi-hop wireless communication system according to claim 4, wherein, in a case where the k-th node is a receiving node, the STBC reception data generating unit receives STBC transmission data of the (k−1)-th node and the (k+1)-th node via the MIMO antennas, and generates STBC reception data based on $y = H_e s + n$, where $y \in C^4$ is an equivalent receiving signal vector of the k-th node for the first time slot and the second time slot and represented by $y = [y_{11}, y_{12}^*, y_{21}, y_{22}^*]^T$, $s \in C^4$ is a transmitting signal vector and represented by $s = [s_1^{k-1}, s_2^{k-1}, s_1^{k+1}, s_2^{k+1}]^T$, $n \in C^4$ is an equivalent additive noises vector for the first time slot and the second time slot and represented by $n = [n_{11}, n_{12}^*, n_{21}, n_{22}^*]^T$, and $H_e \in C^{4 \times 4}$ is a STBC equivalent channel matrix of the k-th node that is a block orthogonal matrix.

6. The multi-hop wireless communication system according to claim 5, wherein the MIMO detecting unit performs the MIMO detecting process that estimates an estimation symbol $\hat{s}$ by MIMO reception based on $\hat{s} = [\hat{s}_1^{k-1}, \hat{s}_2^{k-1}, \hat{s}_1^{k+1}, \hat{s}_2^{k+1}]^T = W_k^H y$ with respect to the k-th node, wherein $W_k \in C^{4 \times 4}$ is a receiving weight matrix of the k-th node, and y is the STBC reception data of the k-th node, wherein, in a case of using the ZF algorithm in MIMO reception, the receiving weight matrix $W_k$ of the k-th node is computed based on $W_k = H_e (H_e^H H_e)^{-1}$, wherein $H_e$ is the STBC equivalent channel matrix of the k-th node, wherein, in a case of using the MMSE algorithm in MIMO reception, the receiving weight matrix $W_k$ of the k-th node is computed based on $$W_k = H_e \left( H_e^H H_e + \frac{2\sigma^2}{P} I \right)^{-1},$$

and wherein P is a total transmission power per node, $\sigma^2$ is a noise power per receiving antenna.

7. A two-dimensional multi-hop wireless communication system comprising:

multiple node devices, each node device of the multiple node devices including multiple input multiple output (MIMO) antennas, such that each of the node devices is capable of performing a relay function via the MIMO antennas, so as to form the two-dimensional multi-hop wireless communication system from forward links and backward links between the node devices, wherein each of the node devices of the two-dimensional multi-hop wireless communication system comprises:

a MIMO detecting unit configured to perform a MIMO detecting process to estimate estimation symbols from channel information estimated from training signals wirelessly received via the MIMO antennas and received wireless signals wirelessly received via the MIMO antennas;

a network decoding unit configured to perform a network decoding process to generate relay signals from the estimated estimation symbols;

a relay control unit configured to perform a destination control process;

a network coding unit configured to perform a network coding process to generate transmitting signals from the generated relay signals; and a training signal adding unit configured to add the training signals to the transmitting signals generated by the network coding unit and to perform a training signal adding process, wherein the transmitting signals to which the training signals are added are transmitted as transmitted wireless signals, and wherein a multi-hop relay of a two-dimension bi-directional flow with a single channel is created by applying the network coding to the multiple node devices.

8. The two-dimensional multi-hop wireless communication system according to claim 7, wherein the relay control unit performs the destination control process that determines that the generated relay signals are signals for a local node device or that the generated relay signals are signals for another node device, wherein, in a case where the relay control unit determines that the generated relay signals are signals for the local node device, the processing of the node device is finished, wherein, in a case where the relay control unit determines that the relay signals are signals for the another node device, in order to perform a network decoding process at a next time slot, the relay control unit stores the generated relay signals as the transmitted data of a previous time slot.

9. The two-dimensional multi-hop wireless communication system according to claim 8, wherein the MIMO detecting process uses a ZF algorithm or a MMSE algorithm in MIMO reception.

10. A two-dimensional multi-hop wireless communication system with a cross-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the cross-type topology where two routes intersect at one of the node devices from wireless links between the node devices, wherein each of the node devices of the two-dimensional multi-hop wireless communication system repeats a receiving state and a transmitting state alternately, and performs transmission/reception processing and a relay transmission of data, and wherein a multi-hop relay of a two-dimension bi-directional flow with a single channel is created by applying two-dimension MIMO network coding to an intersection node device and adjacent node devices adjacent to the intersection node device.

11. A two-dimensional multi-hop wireless communication system with a rotary-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the rotary-type topology where two routes intersect via four of the node devices from wireless links between the node devices, wherein each of the node devices of the two-dimensional multi-hop wireless communication system repeats a receiving state and a transmitting state alternately, and performs transmission/reception processing and a relay transmission of data, and wherein, a multi-hop relay of a two-dimension rotary-type bi-directional flow with a single channel is created by applying two-dimension MIMO network coding to rotary node devices and adjacent node devices adjacent to the rotary node devices.

12. A two-dimensional multi-hop wireless communication system with a tree-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the tree-type topology where two routes are partially combined and the partially-combined route configures a common route from wireless links between the node devices, wherein each of the node devices of the two-dimensional multi-hop wireless communication system repeats a receiving state and a transmitting state alternately, and performs transmission/reception processing and a relay transmission of data, and wherein, a multi-hop relay of a two-dimension tree-type bi-directional flow with a single channel is created by applying two-dimension MIMO network coding to node devices on the common route and adjacent node devices adjacent to the node devices on the common route.

13. The two-dimensional multi-hop wireless communication system according to claim 10, wherein the two routes are route H and route V, wherein a node device, of the node devices, to which the two-dimension MIMO network coding is applied, comprises:

a MIMO detecting unit configured to perform a MIMO detecting process to estimate estimation symbols from channel information estimated from training signals wirelessly received via the MIMO antennas and received wireless signals wirelessly received via the MIMO antennas;

a network decoding unit in route H configured to perform a network decoding process in route H to generate relay signals of route H from the estimation symbols for the forward link and the backward link that are estimated by the MIMO detecting unit;

a relay control unit in route H configured to perform a destination control process in route H;

a network coding unit in route H configured to perform a network coding process in route H to generate transmitting signals of route H from the generated relay signals of route H;

a training signal adding unit in route H configured to add training signals of route H to the transmitting signals of route H generated by the network coding unit in route H and to perform a training signal adding process in route H;

a network decoding unit in route V configured to perform a network decoding process in route V to generate relay signals of route V from the estimation symbols for the upward link and the downward link that are estimated by the MIMO detecting unit;

a relay control unit in route V configured to perform a destination control process in route V;

a network coding unit in route V configured to perform a network coding process in route V to generate transmitting signals of route V from the generated relay signals of route V; and a training signal adding unit in route V configured to add training signals of route V to the transmitting signals of route V generated by the network coding unit in route V and to perform a training signal adding process in route V, and wherein the node device performs a MIMO spatial multiplexing process with respect to the network-coded transmission data in route H, to which the training signals of route H are added, and the network-coded transmission data in route V, to which the training signals of route V are added, and then transmits the transmitted wireless signals.

14. The two-dimensional multi-hop wireless communication system according to claim 13, wherein the relay control unit in route H performs the destination control process in route H that determines that either the generated relay signals of route H are signals for a local node device or that the generated relay signals of route H are signals for another node device, wherein, in a case where the relay control unit in route H determines that the generated relay signals of route H are signals for the local node device, the processing of the node device is finished, wherein, in a case where the relay control unit in route H determines that the relay signals of route H are signals for the another node device, in order to perform a network decoding process in route H at a next time slot, the relay control unit in route H stores the generated relay signals of route H as the transmitted data of a previous time slot in route H, wherein the relay control unit in route V performs the destination control process in route V that determines that either the generated relay signals of route V are signals for a local node device or that the generated relay signals of route V are signals for another node device, wherein, in a case where the relay control unit in route V determines that the generated relay signals of route V are signals for the local node device, the processing of the node device is finished, and wherein, in a case where the relay control unit in route V determines that the relay signals of route V are signals for the another node device, in order to perform a network decoding process in route V at the next time slot, the relay control unit in route V stores the generated relay signals of route V as the transmitted data of the previous time slot in route V.

15. The two-dimensional multi-hop wireless communication system according to claim 14, wherein the MIMO detecting process uses a ZF algorithm or a MMSE algorithm in MIMO reception.

16. The two-dimensional multi-hop wireless communication system according to claim 10, wherein, with respect to remaining node devices, except node devices to which the two-dimension MIMO network coding is applied from the multiple node devices, one-dimension MIMO network coding is applied.

17. A two-dimensional multi-hop wireless communication system with a cross-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the cross-type topology where two routes intersect at one of the node devices from wireless links between the node devices, wherein each of the node devices of the two-dimensional multi-hop wireless communication system repeats a receiving state and a transmitting state alternately, and performs transmission/reception processing and a relay transmission of data, and wherein, a multi-hop relay of a two-dimension STBC-processed bi-directional flow with a single channel is created by applying two-dimension STBC-MIMO network coding to an intersection node device and adjacent node devices adjacent to the intersection node device.

18. A two-dimensional multi-hop wireless communication system with a rotary-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the rotary-type topology where two routes intersect via four of the node devices from up wireless links between the node devices, wherein each of the node devices of the two-dimensional multi-hop wireless communication system repeats a receiving state and a transmitting state alternately, and performs transmission/reception processing and a relay transmission of data, and wherein, a multi-hop relay of a two-dimension rotary-type STBC-processed bi-directional flow with a single channel is created by applying two-dimension STBC-MIMO network coding to rotary node devices and adjacent node devices adjacent to the rotary node devices.

19. A two-dimensional multi-hop wireless communication system with a tree-type topology comprising:

multiple node devices, each node device of the multiple node devices including multiple input multiple output (MIMO) antennas, such that each of the node devices is capable of performing a relay function via the MIMO antennas, so as to form the two-dimensional multi-hop communication system with the tree-type topology where two routes are partially combined and the partially-combined route configures a common route from wireless links between the node devices, wherein each of the node devices of the two-dimensional multi-hop wireless communication system repeats a receiving state and a transmitting state alternately, and performs transmission/reception processing and a relay transmission of data, and wherein, a multi-hop relay of a two-dimension tree-type STBC-processed bi-directional flow with a single channel is created by applying two-dimension STBC-MIMO network coding to node devices on the common route and adjacent node devices adjacent to the node devices on the common route.

20. The two-dimensional multi-hop wireless communication system according to claim 17, wherein the two routes are route H and route V, wherein one of the node devices, to which the two-dimension STBC-MIMO network coding is applied, comprises:

a STBC reception data generating unit configured to perform a STBC reception data generating process to generate STBC reception data from received wireless signals wirelessly received via the MIMO antennas;

a STBC channel matrix generating unit configured to perform a STBC channel matrix generating process to generate a STBC equivalent channel matrix from channel information estimated from training signals wirelessly received via the MIMO antennas;

a MIMO detecting unit configured to perform a MIMO detecting process to estimate estimation symbols from the generated STBC equivalent channel matrix and the generated STBC reception data;

a network decoding unit in route H configured to perform a network decoding process in route H to generate relay signals of route H that are two consecutive symbols to the forward link and the backward link from the estimation symbols for the forward link and the backward link that are estimated by the MIMO detecting unit;

a relay control unit in route H configured to perform a destination control process in route H;

a network coding unit in route H configured to perform a network coding process in route H of two consecutive transmitting symbols to generate two consecutive transmitting signals of route H from the generated relay signals of route H;

a STBC transmission data generating unit in route H configured to perform a STBC transmission data generating process in route H to generate STBC transmission data in route H from the transmitting signals of route H generated by the network coding unit in route H;

a training signal adding unit in route H configured to add training signals of route H to the generated STBC transmission data in route H and to perform a training signal adding process in route H;

a network decoding unit in route V configured to perform a network decoding process in route V to generate relay signals of route V that are two consecutive symbols to the upward link and the downward link from the estimation symbols for the upward link and the downward link that are estimated by the MIMO detecting unit;

a relay control unit in route V configured to perform a destination control process in route V;

a network coding unit in route V configured to perform a network coding process in route V of two consecutive transmitting symbols to generate two consecutive transmitting signals of route V from the generated relay signals of route V;

a STBC transmission data generating unit in route V configured to perform a STBC transmission data generating process in route V to generate STBC transmission data in route V from the transmitting signals of route V generated by the network coding unit in route V; and a training signal adding unit in route V configured to add training signals of route V to the generated STBC transmission data in route V and to perform a training signal adding process in route V, and wherein the node device performs a MIMO spatial multiplexing process with respect to the STBC transmission data in route H to which the training signals of route H are added and the STBC transmission data in route V to which the training signals of route V are added, and then transmits the transmitted wireless signals.

21. The two-dimensional multi-hop wireless communication system according to claim 20, wherein the relay control unit in route H performs the destination control process in route H that determines that either the generated relay signals of route H are signals for a local node device or that the generated relay signals of route H are signals for another node device, wherein, in a case where the relay control unit in route H determines that the generated relay signals of route H are signals for the local node device, the processing of the node device is finished, wherein, in a case where the relay control unit in route H determines that the relay signals of route H are signals for the another node device, in order to perform a network decoding process in route H at a next time slot, the relay control unit in route H stores the generated relay signals of route H as the transmitted data of a previous time slot in route H, wherein the relay control unit in route V performs the destination control process in route V that determines that either the generated relay signals of route V are signals for a local node device or that the generated relay signals of route V are signals for another node device, wherein, in a case where the relay control unit in route V determines that the generated relay signals of route V are signals for the local node device, the processing of the node device is finished, and wherein, in a case where the relay control unit in route V determines that the relay signals of route V are signals for the another node device, in order to perform a network decoding process in route V at a next time slot, the relay control unit in route V stores the generated relay signals of route V as the transmitted data of a previous time slot in route V.

22. The two-dimensional multi-hop wireless communication system according to claim 21, wherein the MIMO detecting process uses a ZF algorithm or a MMSE algorithm in MIMO reception.

23. The two-dimensional multi-hop wireless communication system according to claim 17, wherein, with respect to remaining node devices, except node devices to which the two-dimension STBC-MIMO network coding is applied from the multiple node devices, one-dimension STBC-MIMO network coding is applied.

24. The two-dimensional multi-hop wireless communication system according to claim 11,
wherein the two routes are route H and route V,
wherein a node device, of the node devices, to which the two-dimension MIMO network coding is applied, comprises:
  a MIMO detecting unit configured to perform a MIMO detecting process to estimate estimation symbols from channel information estimated from training signals wirelessly received via the MIMO antennas and received wireless signals wirelessly received via the MIMO antennas;
  a network decoding unit in route H configured to perform a network decoding process in route H to generate relay signals of route H from the estimation symbols for the forward link and the backward link that are estimated by the MIMO detecting unit;
  a relay control unit in route H configured to perform a destination control process in route H;
  a network coding unit in route H configured to perform a network coding process in route H to generate transmitting signals of route H from the generated relay signals of route H;
  a training signal adding unit in route H configured to add training signals of route H to the transmitting signals of route H generated by the network coding unit in route H and to perform a training signal adding process in route H;
  a network decoding unit in route V configured to perform a network decoding process in route V to generate relay signals of route V from the estimation symbols for the upward link and the downward link that are estimated by the MIMO detecting unit;
  a relay control unit in route V configured to perform a destination control process in route V;
  a network coding unit in route V configured to perform a network coding process in route V to generate transmitting signals of route V from the generated relay signals of route V; and
  a training signal adding unit in route V configured to add training signals of route V to the transmitting signals of route V generated by the network coding unit in route V and to perform a training signal adding process in route V, and
wherein the node device performs a MIMO spatial multiplexing process with respect to the network-coded transmission data in route H to which the training signals of route H are added and the network-coded transmission data in route V to which the training signals of route V are added, and then transmits the transmitted wireless signals.

25. The two-dimensional multi-hop wireless communication system according to claim 12,
wherein the two routes are route H and route V,
wherein a node device, of the node devices, to which the two-dimension MIMO network coding is applied, comprises:
  a MIMO detecting unit configured to perform a MIMO detecting process to estimate estimation symbols from channel information estimated from training signals wirelessly received via the MIMO antennas and received wireless signals wirelessly received via the MIMO antennas;
  a network decoding unit in route H configured to perform a network decoding process in route H to generate relay signals of route H from the estimation symbols for the forward link and the backward link that are estimated by the MIMO detecting unit;
  a relay control unit in route H configured to perform a destination control process in route H;
  a network coding unit in route H configured to perform a network coding process in route H to generate transmitting signals of route H from the generated relay signals of route H;
  a training signal adding unit in route H configured to add training signals of route H to the transmitting signals of route H generated by the network coding unit in route H and to perform a training signal adding process in route H;
  a network decoding unit in route V configured to perform a network decoding process in route V to generate relay signals of route V from the estimation symbols for the upward link and the downward link that are estimated by the MIMO detecting unit;
  a relay control unit in route V configured to perform a destination control process in route V;
  a network coding unit in route V configured to perform a network coding process in route V to generate transmitting signals of route V from the generated relay signals of route V; and
  a training signal adding unit in route V configured to add training signals of route V to the transmitting signals of route V generated by the network coding unit in route V and to perform a training signal adding process in route V, and
wherein the node device performs a MIMO spatial multiplexing process with respect to the network-coded transmission data in route H to which the training signals of route H are added and the network-coded transmission data in route V to which the training signals of route V are added, and then transmits the transmitted wireless signals.

26. The two-dimensional multi-hop wireless communication system according to claim 11, wherein, with respect to remaining node devices, except node devices to which the two-dimension MIMO network coding is applied from the multiple node devices, one-dimension MIMO network coding is applied.

27. The two-dimensional multi-hop wireless communication system according to claim 12, wherein, with respect to remaining node devices, except node devices to which the two-dimension MIMO network coding is applied from the multiple node devices, one-dimension MIMO network coding is applied.

28. The two-dimensional multi-hop wireless communication system according to claim 18,
wherein the two routes are route H and route V,
wherein a node device, of the node devices, to which the two-dimension STBC-MIMO network coding is applied, comprises:
  a STBC reception data generating unit configured to perform a STBC reception data generating process to generate STBC reception data from received wireless signals wirelessly received via the MIMO antennas;
  a STBC channel matrix generating unit configured to perform a STBC channel matrix generating process to generate a STBC equivalent channel matrix from channel information estimated from training signals wirelessly received via the MIMO antennas;

a MIMO detecting unit configured to perform a MIMO detecting process to estimate estimation symbols from the generated STBC equivalent channel matrix and the generated STBC reception data;

a network decoding unit in route H configured to perform a network decoding process in route H to generate relay signals of route H that are two consecutive symbols to the forward link and the backward link from the estimation symbols for the forward link and the backward link that are estimated by the MIMO detecting unit;

a relay control unit in route H configured to perform a destination control process in route H;

a network coding unit in route H configured to perform a network coding process in route H of two consecutive transmitting symbols to generate two consecutive transmitting signals of route H from the generated relay signals of route H;

a STBC transmission data generating unit in route H configured to perform a STBC transmission data generating process in route H to generate STBC transmission data in route H from the transmitting signals of route H generated by the network coding unit in route H;

a training signal adding unit in route H configured to perform training signals of route H to the generated STBC transmission data in route H and performing a training signal adding process in route H;

a network decoding unit in route V configured to perform a network decoding process in route V to generate relay signals of route V that are two consecutive symbols to the upward link and the downward link from the estimation symbols for the upward link and the downward link that are estimated by the MIMO detecting unit;

a relay control unit in route V configured to perform a destination control process in route V;

a network coding unit in route V configured to perform a network coding process in route V of two consecutive transmitting symbols to generate two consecutive transmitting signals of route V from the generated relay signals of route V;

a STBC transmission data generating unit in route V configured to perform a STBC transmission data generating process in route V to generate STBC transmission data in route V from the transmitting signals of route V generated by the network coding unit in route V; and a training signal adding unit in route V configured to add training signals of route V to the generated STBC transmission data in route V and perform a training signal adding process in route V, and wherein the node device performs a MIMO spatial multiplexing process with respect to the STBC transmission data in route H to which the training signals of route H are added and the STBC transmission data in route V to which the training signals of route V are added, and then transmits the transmitted wireless signals.

29. The two-dimensional multi-hop wireless communication system according to claim 19, wherein the two routes are route H and route V, wherein a node device, of the node devices, to which the two-dimension STBC-MIMO network coding is applied, comprises:

a STBC reception data generating unit configured to perform a STBC reception data generating process to generate STBC reception data from received wireless signals wirelessly received via the MIMO antennas;

a STBC channel matrix generating unit configured to perform a STBC channel matrix generating process to generate a STBC equivalent channel matrix from channel information estimated from training signals wirelessly received via the MIMO antennas;

a MIMO detecting unit configured to perform a MIMO detecting process to estimate estimation symbols from the generated STBC equivalent channel matrix and the generated STBC reception data;

a network decoding unit in route H configured to perform a network decoding process in route H to generate relay signals of route H that are two consecutive symbols to the forward link and the backward link from the estimation symbols for the forward link and the backward link that are estimated by the MIMO detecting unit;

a relay control unit in route H configured to perform a destination control process in route H;

a network coding unit in route H configured to perform a network coding process in route H of two consecutive transmitting symbols to generate two consecutive transmitting signals of route H from the generated relay signals of route H;

a STBC transmission data generating unit in route H configured to perform a STBC transmission data generating process in route H to generate STBC transmission data in route H from the transmitting signals of route H generated by the network coding unit in route H;

a training signal adding unit in route H configured to add training signals of route H to the generated STBC transmission data in route H and to perform a training signal adding process in route H;

a network decoding unit in route V configured to perform a network decoding process in route V to generate relay signals of route V that are two consecutive symbols to the upward link and the downward link from the estimation symbols for the upward link and the downward link that are estimated by the MIMO detecting unit;

a relay control unit in route V configured to perform a destination control process in route V;

a network coding unit in route V configured to perform a network coding process in route V of two consecutive transmitting symbols to generate two consecutive transmitting signals of route V from the generated relay signals of route V;

a STBC transmission data generating unit in route V configured to perform a STBC transmission data generating process in route V to generate STBC transmission data in route V from the transmitting signals of route V generated by the network coding unit in route V;

a training signal adding unit in route V configured to add training signals of route V to the generated STBC transmission data in route V and to perform a training signal adding process in route V, and wherein the node device performs a MIMO spatial multiplexing process with respect to the STBC transmission data in route H to which the training signals of route H are added and the STBC transmission data in route V to which the training signals of route V are added, and then transmits the transmitted wireless signals.

30. The multi-hop wireless communication system according to claim 18, wherein, with respect to remaining node devices, except node devices to which the two-dimension STBC-MIMO network coding is applied from the multiple node devices, one-dimension STBC-MIMO network coding is applied.

31. The multi-hop wireless communication system according to claim 19, wherein, with respect to remaining node devices, except node devices to which the two-dimension STBC-MIMO network coding is applied from the multiple node devices, one-dimension STBC-MIMO network coding is applied.

* * * * *